United States Patent
Fujiyama et al.

(10) Patent No.: US 9,577,477 B2
(45) Date of Patent: Feb. 21, 2017

(54) POWER TRANSMISSION APPARATUS AND METHOD, AND RESONANCE DEVICE USED THEREIN

(71) Applicant: UBE INDUSTRIES, LTD., Yamaguchi (JP)

(72) Inventors: Yoshiaki Fujiyama, Yamaguchi (JP); Nobuhiro Harada, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 348 days.

(21) Appl. No.: 14/389,748

(22) PCT Filed: Mar. 21, 2013

(86) PCT No.: PCT/JP2013/057962
§ 371 (c)(1),
(2) Date: Sep. 30, 2014

(87) PCT Pub. No.: WO2013/146494
PCT Pub. Date: Oct. 3, 2013

(65) Prior Publication Data
US 2015/0048692 A1 Feb. 19, 2015

(30) Foreign Application Priority Data

Mar. 30, 2012 (JP) ................................ 2012-082365
Sep. 11, 2012 (JP) ................................ 2012-199469

(51) Int. Cl.
*H01F 27/42* (2006.01)
*H01F 37/00* (2006.01)
(Continued)

(52) U.S. Cl.
CPC ................ *H02J 17/00* (2013.01); *H01P 7/10* (2013.01); *H02J 50/00* (2016.02); *H02J 50/20* (2016.02)

(58) Field of Classification Search
CPC .. H02J 17/00; H02J 5/005; H02J 7/025; H02J 50/00; H02J 50/20; H01F 38/14; H01P 7/10
(Continued)

(56) References Cited

U.S. PATENT DOCUMENTS 6,084,356 A * 7/2000 Seki ................. H01J 37/32192
118/723 MA
2007/0222542 A1 9/2007 Joannopoulos et al.
2009/0153273 A1 6/2009 Chen et al.

FOREIGN PATENT DOCUMENTS

JP 58-219802 12/1983
JP 01-208001 8/1989
(Continued)

OTHER PUBLICATIONS

Takehiro Imura et al., "Proposal of antenna for wireless power transfer via magnetic resonant coupling in kHz MHz-GHz", University of Tokyo, The Institute of Electronics, Information and Communication Engineers, BS-9-5, 2010.
(Continued)

*Primary Examiner* — Carlos Amaya
(74) *Attorney, Agent, or Firm* — Young & Thompson

(57) ABSTRACT

A resonance device includes a waveguide, a dielectric resonator disposed coaxial with the waveguide, an excitation structure thereof. One end of the waveguide is open and the other is short-circuited. The dielectric resonator has two end surfaces disposed on opposite sides to each other, is insulated from the waveguide in the vicinity of the open end of the waveguide, and is disposed within the waveguide, such that a thickness being a distance between the two end surfaces is constant, regardless of a radial position of the dielectric resonator. In a power transmission apparatus, the two resonance devices are provided. The open end of the waveguide of one resonance device and the open end of the waveguide of the other resonance device are disposed opposite each other. Power, which is input to an excitation
(Continued)

structure of one resonance device, is output from an excitation structure of the other resonance device.

17 Claims, 53 Drawing Sheets

(51) Int. Cl.
   *H01F 38/00* (2006.01)
   *H02J 17/00* (2006.01)
   *H01P 7/10* (2006.01)

(58) Field of Classification Search
   USPC ........................................................ 307/104
   See application file for complete search history.

(56) References Cited

FOREIGN PATENT DOCUMENTS

| JP | 2000-031727 | 1/2000 |
|----|-------------|--------|
| JP | 2009-501510 | 1/2009 |
| JP | 2010-148273 | 7/2010 |

OTHER PUBLICATIONS

Andre Kurs et al., "Wireless power transfer via strongly coupled magnetic resonances", Science, vol. 317, No. 5834, pp. 83-86, Jul. 6, 2007, www.sciencemag.org.

International Search Report PCT/JP2013/057962 dated May 28, 2013.

Kenta Nishikawa et al., "Microwave-Band Wireless Power Transfer System Using Ceramic Dielectric Resonators", 2012 Nen Proceedings of the Society Conference of IEICE, The Institute of Electronics, Information and Communication Engineers, Aug. 28, 2012, C-2-71.

Yoshiaki Fujiyama, "Wireless power transmission using a microwave dielectric resonator", 2012 Nen Proceedings of the Society Conference of IEICE, The Institute of Electronics, Information and Communication Engineers, Aug. 28, 2012, B-1-55.

* cited by examiner

FIG. 9
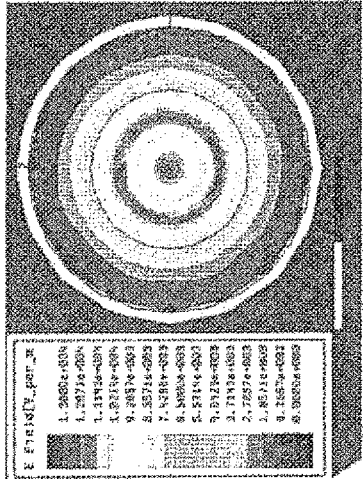
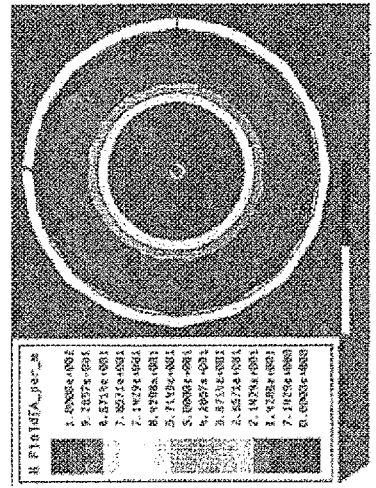
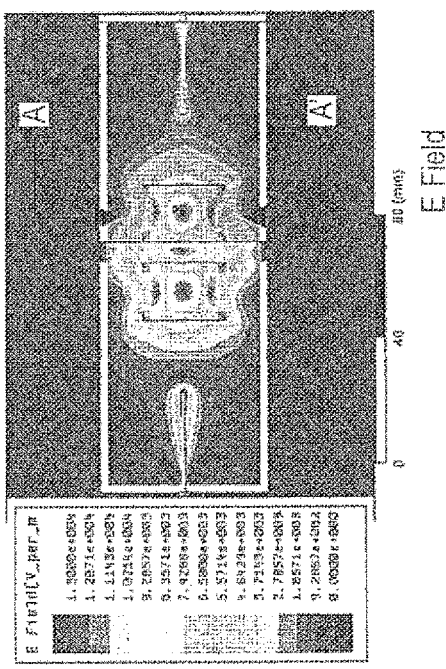
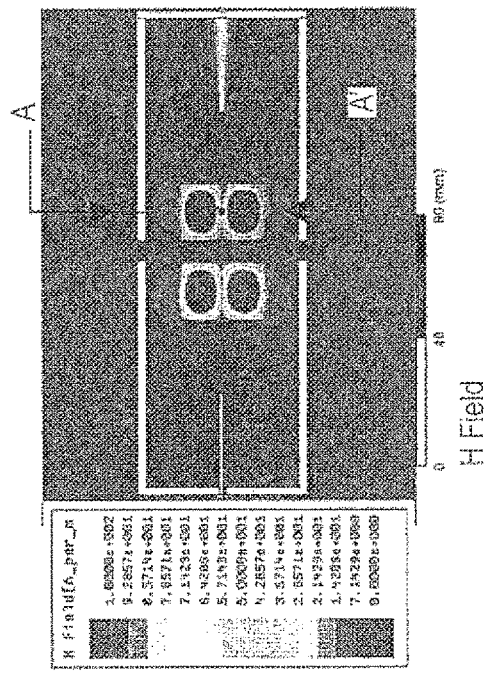

FIG. 20
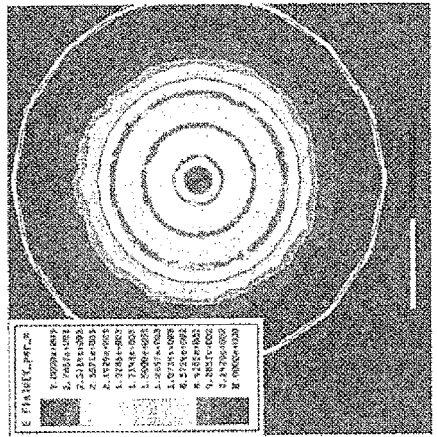
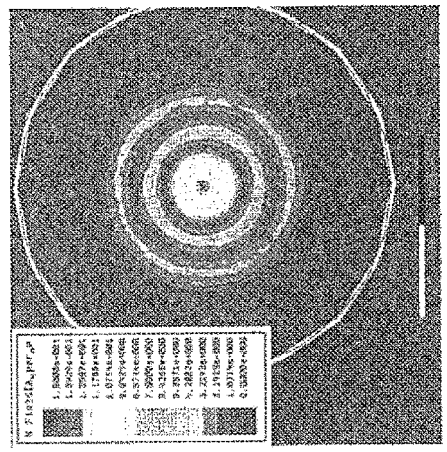
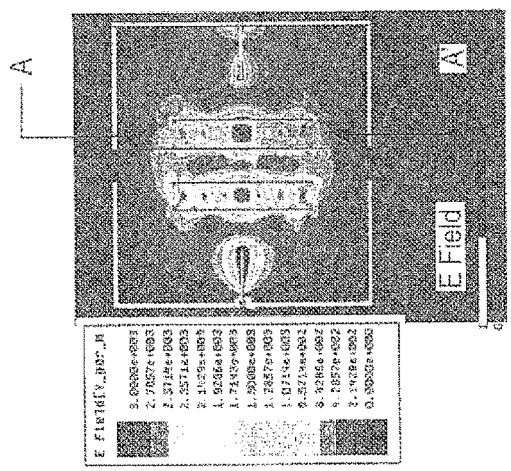
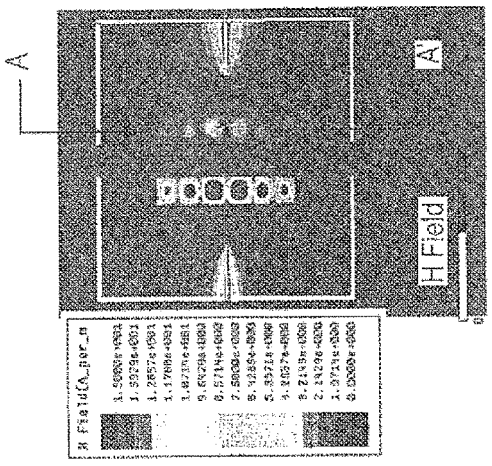

FIG. 24
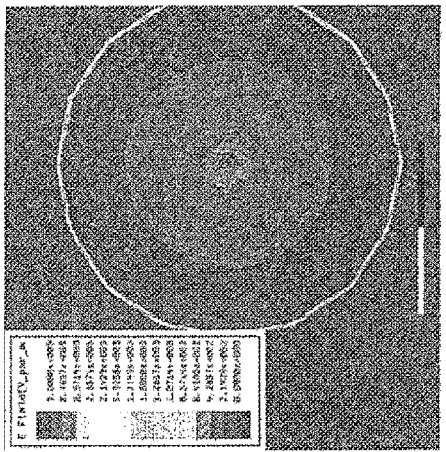
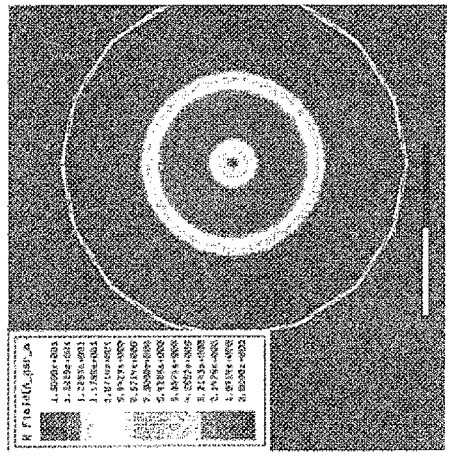
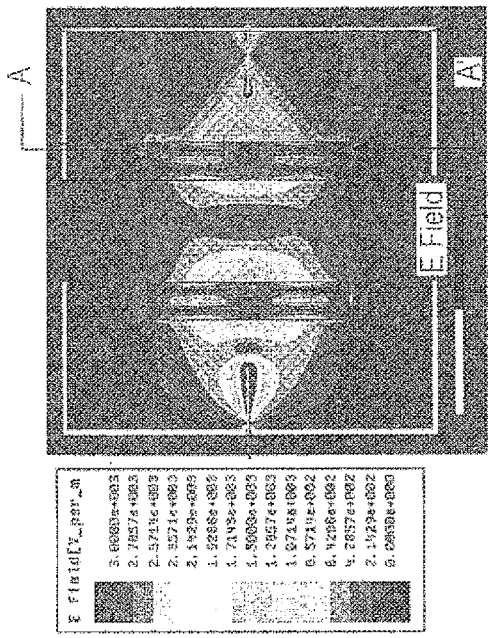
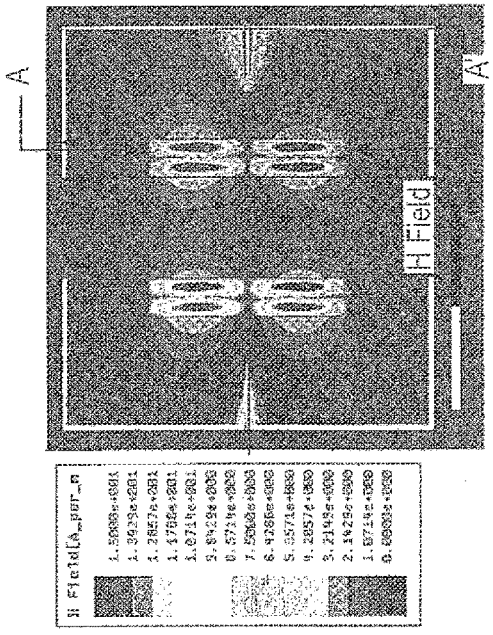

TRIANGULAR-PRISM-SHAPED DIELECTRIC RESONATOR

HEXAGONAL-PRISM-SHAPED DIELECTRIC RESONATOR

PENTAGONAL-PRISM-SHAPED DIELECTRIC RESONATOR

HEXAGONAL-PRISM-SHAPED DIELECTRIC RESONATOR

FIG. 30
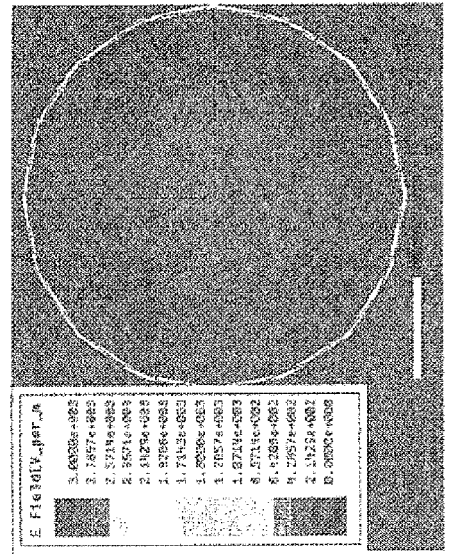
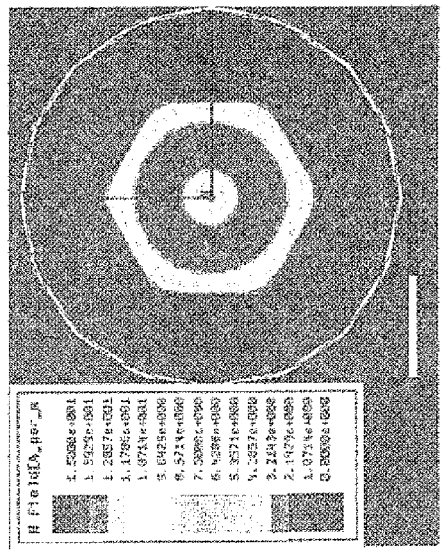
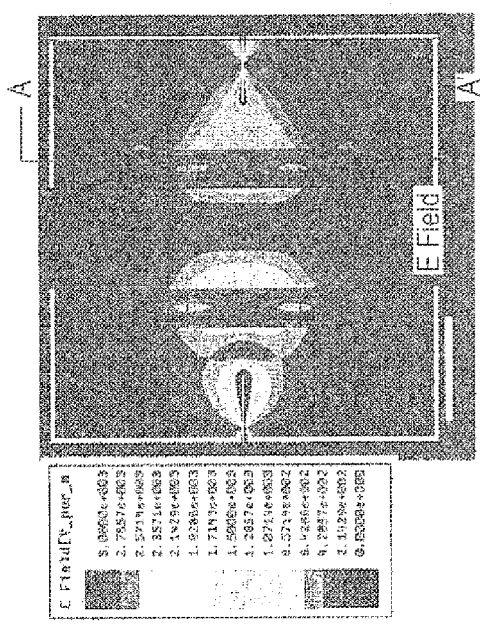
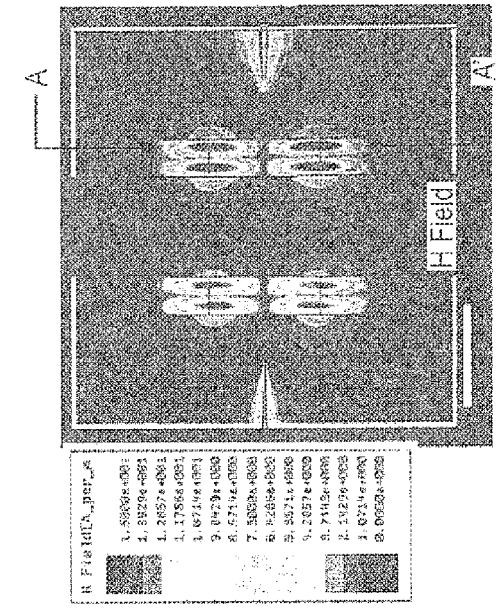

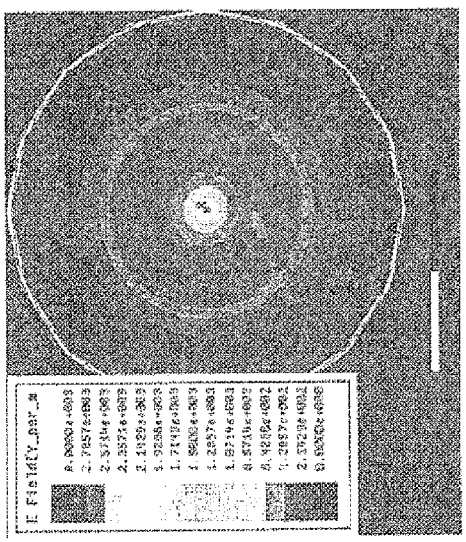
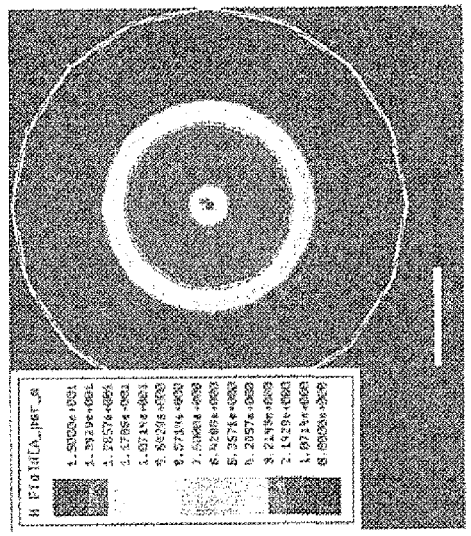
FIG. 32
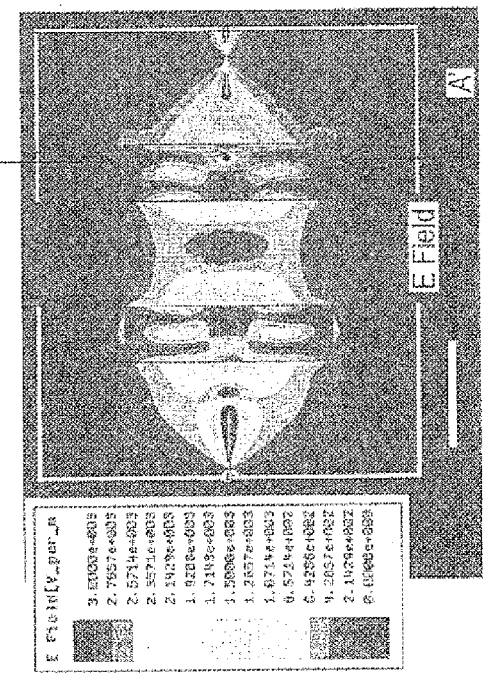
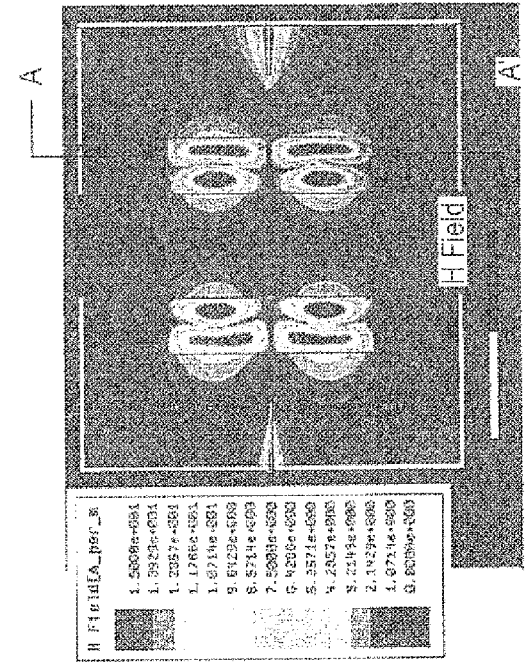

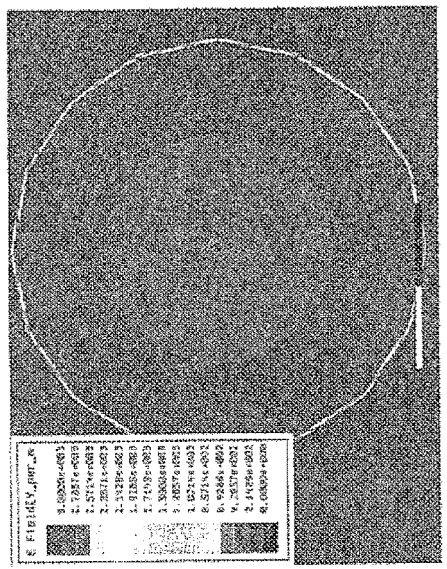 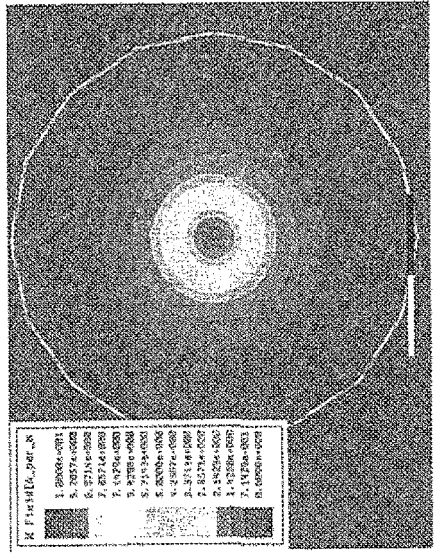
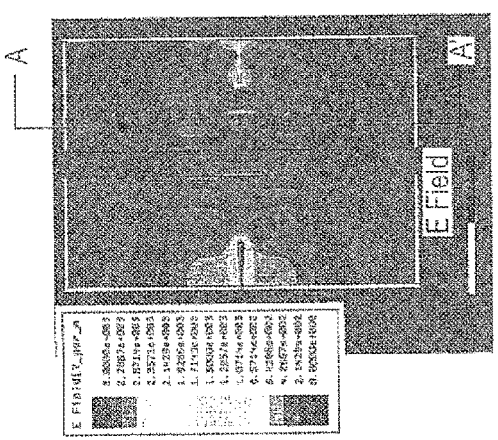 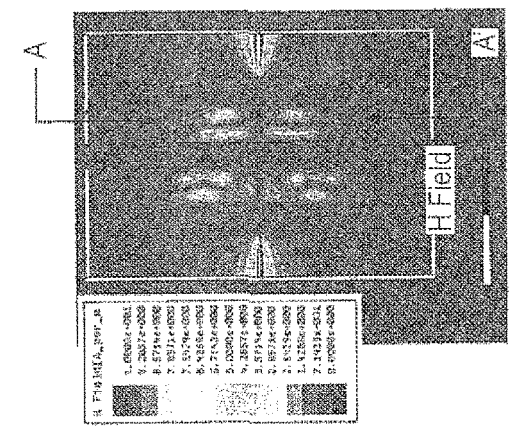
FIG. 33

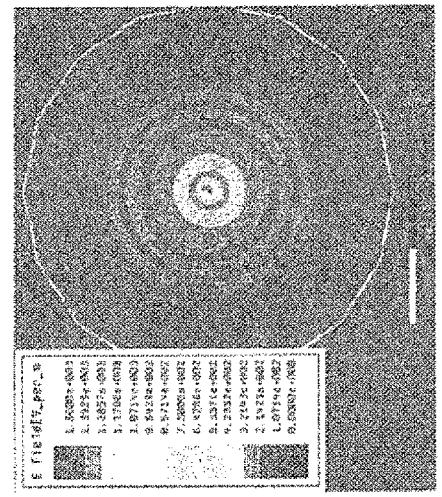
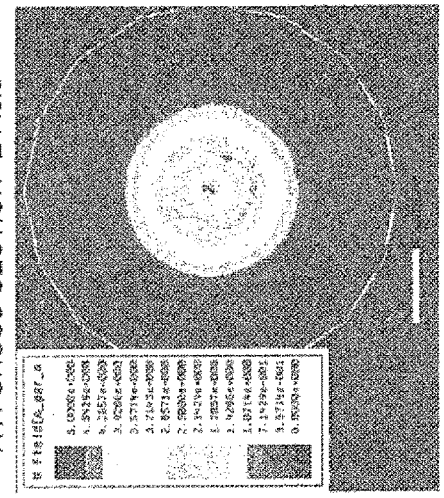
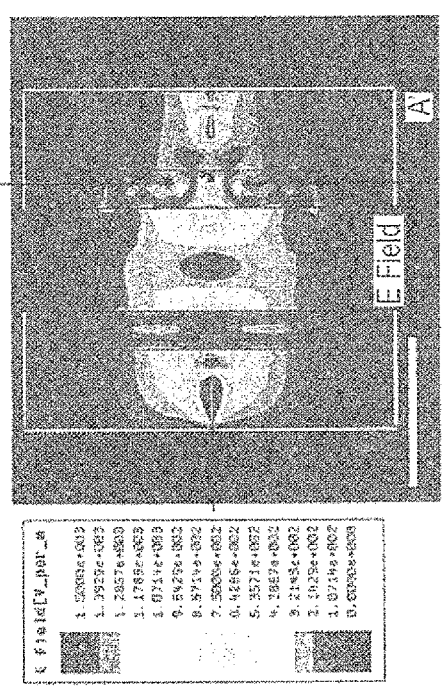
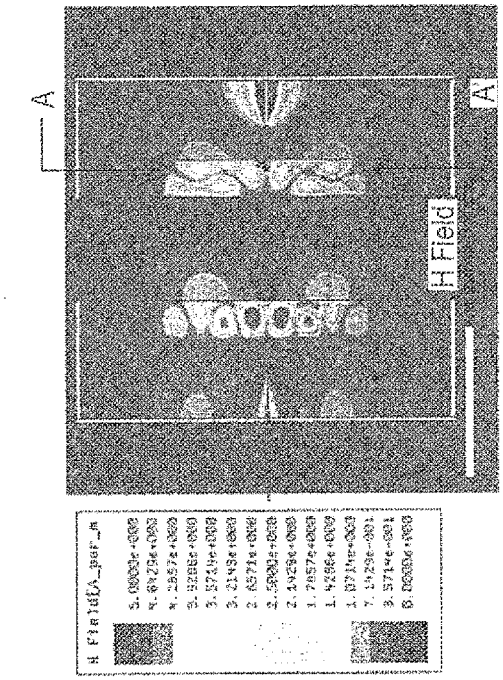
FIG. 34

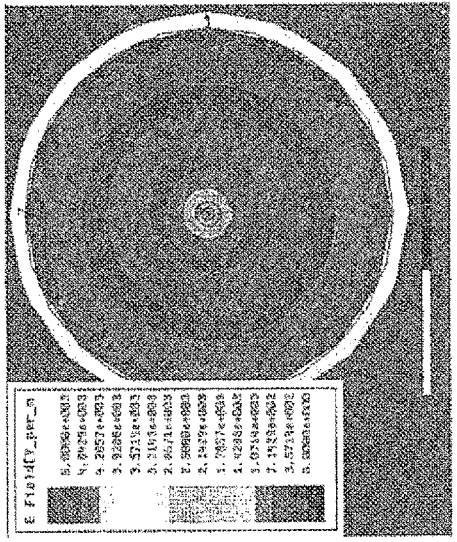
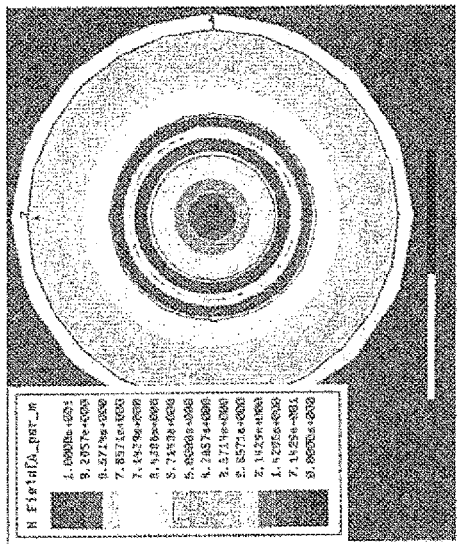
FIG. 38
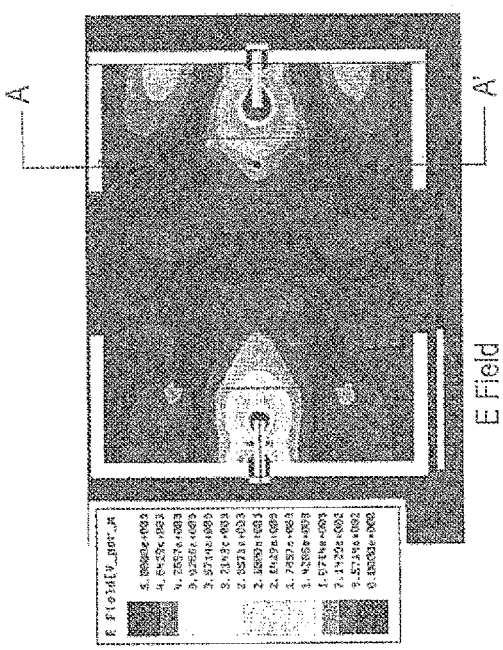
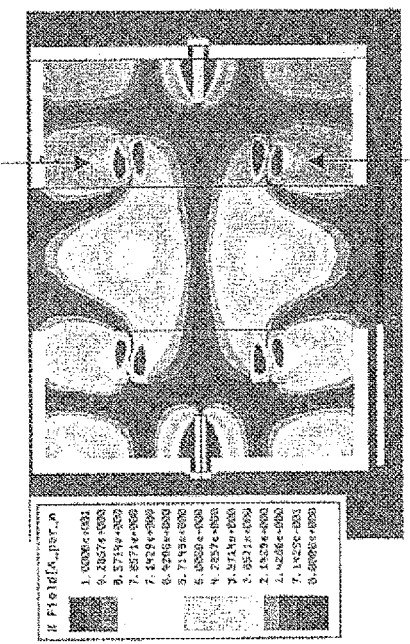

CYLINDRICAL WAVEGUIDE
ALFORD ANTENNA
ALFORD ANTENNA
COAXIAL CABLE
COAXIAL CABLE
DIELECTRIC RESONATOR
DIELECTRIC RESONATOR

OUTER CONDUCTOR CONNECTION TERMINAL
ANTENNA WIRE
TEFLON SUBSTRATE
ANTENNA WIRE
COAXIAL CABLE
INNER CONDUCTOR
ANTENNA WIRE
ANTENNA WIRE

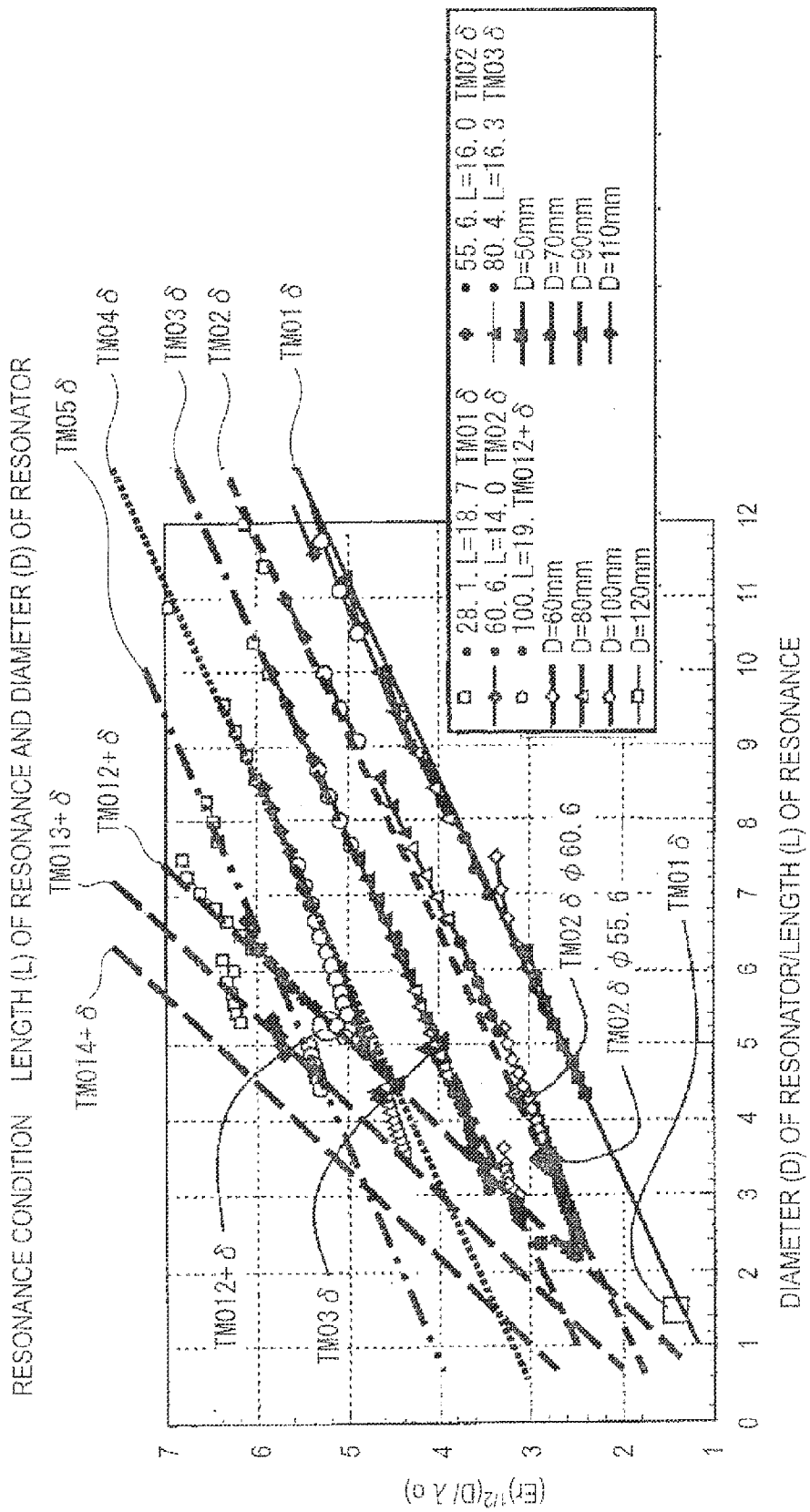

CONICAL DISH

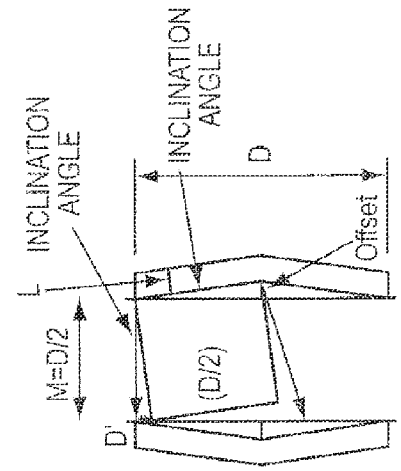
FIG. 52C
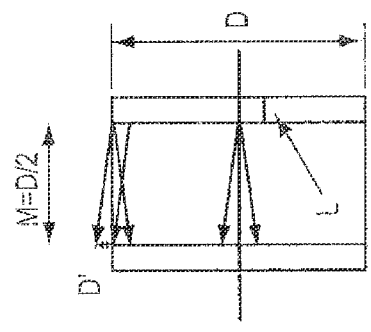
FIG. 52B
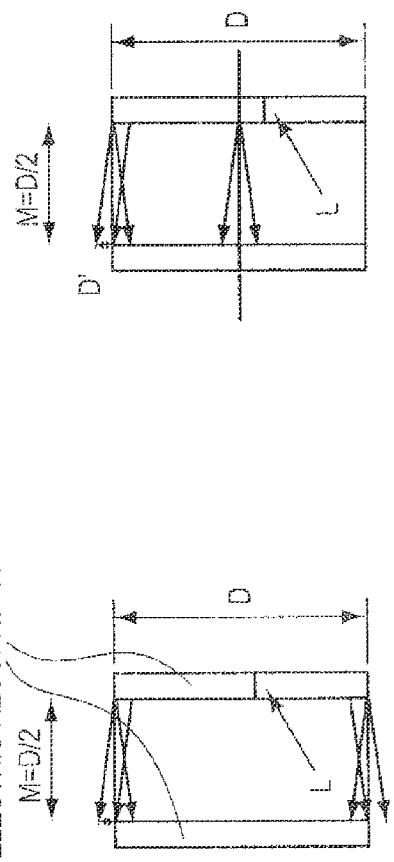
FIG. 52A
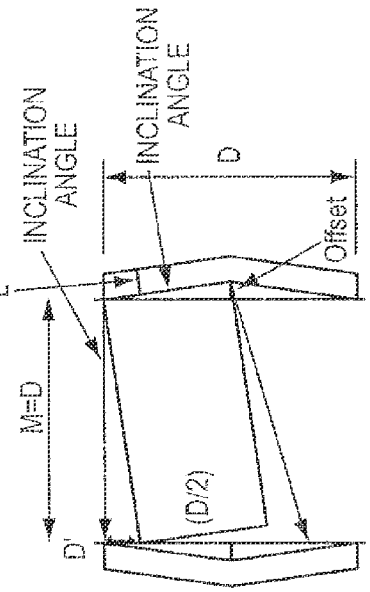
FIG. 52E
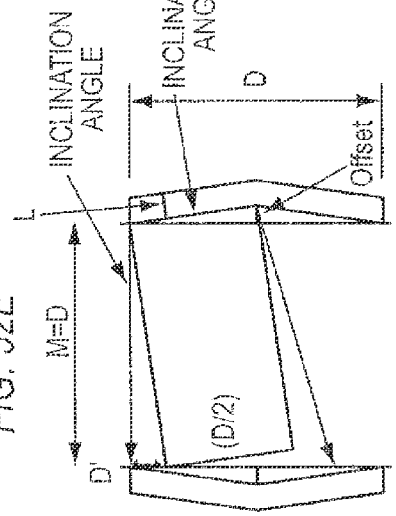
FIG. 52D
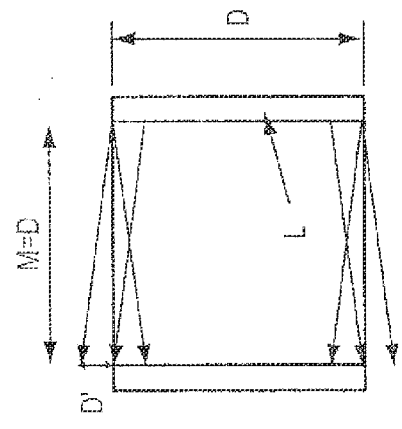

POWER TRANSMISSION APPARATUS AND METHOD, AND RESONANCE DEVICE USED THEREIN

TECHNICAL FIELD

The present invention relates to a power transmission apparatus and method for wirelessly transmitting power by a high-frequency electromagnetic wave such as a microwave, and a resonance device used therein.

BACKGROUND ART

Regarding wireless power transmission technologies, various methods have been proposed according to a frequency band of an electromagnetic wave that is a transmission medium, and a transmission efficiency or a transmission distance is different according to a transmission method and a transmission apparatus used therein.

In a case where a frequency band of an electromagnetic wave is as low as several MHz at most, an electromagnetic induction type wireless power transmission is mainly used. In this method, a pair of coils is disposed adjacent to each other, and a magnetic field line generated at one coil passes through the other coil. In order to increase the transmission efficiency, it is necessary to make a pair of coils as close as possible and reduce an axis shift as much as possible, such that a magnetic field line passes through the other coil as many as possible. This method has already been put to practical use because the transmission efficiency is high and the miniaturization of the apparatus can be achieved.

In a case where a frequency band of an electromagnetic wave is about 100 KHz to several hundreds of MHz, an electromagnetic field resonance method is suitable. In NPL 1, two spiral antenna resonators, of which both ends are opened, are disposed opposite to each other, and perform power transmission mostly by magnetic coupling. Herein, experiments have been conducted by using three types of spiral antennas, of which resonance frequencies are 122 KHz, 13.56 MHz, and 1.49 GHz, and relationships between a transmission distance and a transmission efficiency at each resonance frequency have been compared. In the experiment of 122-KHz resonance frequency, perhaps because a Q value of a resonator constituting a coil is low, the transmission efficiency is 90% or less even when the transmission distance is 100 mm. The transmission efficiency is reduced up to 50% when the transmission distance is 1,000 mm. Furthermore, when the transmission distance is increased, the transmission efficiency is rapidly reduced. In the experiment of 13.56-MHz resonance frequency, the transmission efficiency of 90% or more is maintained when the transmission distance is up to 220 mm. Furthermore, when the transmission distance is increased, the transmission efficiency is rapidly reduced. The transmission distance at which the transmission efficiency is 50% is about 300 mm. Also, in the experiment of 1.49-GHz resonance frequency, perhaps because a Q value of a resonator constituting a coil is low or a radiation occurs, the transmission efficiency is 90% or less. The transmission efficiency is rapidly reduced when the transmission distance is 3 mm or more. The transmission distance at which the transmission efficiency is 50% is about 4 mm. It can be seen from these experiments that in the resonance-based power transmission using the coil, the transmission efficiency is highest at the frequency band around ten to twenty MHz. Also, since this method is relatively tolerant to the shift of two coil resonators in an axial direction, the accuracy as high as the electromagnetic induction method is not required in the arrangement of the coil resonators.

The two methods as described above transmit power to a region corresponding to a distance before a generated electromagnetic field, called a near field (short-distance field), is still formed as an electromagnetic wave that is a radio wave. Also, a far field (long-distance field) corresponding to a region farther than the near field is a region in which an electromagnetic wave is radiated as a radio wave. The near field corresponds to a region in which a distance is about $\lambda/(2\pi)=\lambda \times 0.16$ or less, where $\lambda$ is a wavelength of an electromagnetic wave. In the experiments described in NPL 1, the transmission distance at which the transmission efficiency is around 50% is $\lambda \times 1/2460$ when the resonance frequency is 122 KHz, $\lambda \times 0.014$ when the resonance frequency is 13.56 MHz, and $\lambda \times 0.02$ when the resonance frequency is 1.49 GHz, and power is all transmitted within the range of the near field.

As described in NPL 2, in the wireless power transmission experiment by Massachusetts Institute of Technology (MIT), which was announced in 2007, power to turn on a 60-W bulb was transmitted at the transmission distance of 2 m. However, the resonance frequency at that time was 9.90 MHz. Therefore, the transmission distance is only $\lambda \times 0.066$, and this is also power transmission within the near field.

Also, PTL 1 proposes a method that transmits energy by using a spherical dielectric resonator. In this method, energy transmission is performed by configuring and arranging two spherical dielectric resonators in the region of the near field such that one is coupled under a condition of a radiation caustic surface of the other.

On the other hand, as the method that transmits power to the region of the far field by using the radio wave, a method using a microwave of several hundreds of MHz or more and a rectenna antenna has been developed. As represented by a space solar power satellite (SPS), a radio wave generated by converting high power obtained by solar power generation in space into a microwave is formed in a beam shape by using an antenna array, is transmitted to the earth from a position located 3,600 Km away, and is received by a rectenna antenna. A system for carrying out this method requires a plurality of antennas and needs to control a phase of power supplied to the respective antennas. This is large-scale and expensive. Research has been conducted to apply this technology to a system for charging a battery of a parked electric vehicle, but this is also expensive as in the SPS.

Also, PTL 2 discloses a resonator device in which a dielectric resonator is disposed within a cutoff waveguide such that an axis of the dielectric resonator is matched with a propagation direction of electromagnetic energy in the cutoff waveguide.

On the other hand, in order to improve the efficiency of power transmission between two resonators, it is preferable that electromagnetic energy generated from one resonator is received to the other resonator while leaking out as little as possible. However, since an electromagnetic field generated from one resonator tends to diverge in, in particular, an outer peripheral portion, an electromagnetic field passing through the other resonator is reduced as much. Therefore, when attempting to increase the distance between the two resonators, in particular, so as to increase the transmission distance, the influence of the electromagnetic field divergence is increased as described above, which tends to be an obstacle to the improvement in the power transmission efficiency. As described in PTL 3 and PTL 4, a radio wave lens or a dielectric lens, which is made of a dielectric material, is generally disposed so as to suppress the divergence of an electromagnetic wave.

CITATION LIST

Patent Literature

{PTL 1} JP-W-2009-501510
{PTL 2} JP-A-H1-208001
{PTL 3} JP-A-S58-219802
{PTL 4} JP-A-2000-31727

Non Patent Literature

{NPL 1} "Proposal of antenna for wireless power transfer via magnetic resonant coupling in kHz-MHz-GHz", Takehiro Imura, et al., University of Tokyo, The institute of Electronics, Information and Communication Engineers, BS-9-5, 2010
{NPL 2} "Wireless power transfer via strongly coupled magnetic resonances", Science, vol. 317, no. 5834, pp. 83-86, 2007: A. Kurs.

SUMMARY OF INVENTION

Technical Problem

In a 2.45-GHz microwave, which is an industry-science-medical (ISM) band, (wavelength: 122.5 mm)×0.16=19.5 mm. Therefore, the transmission distance of the microwave in the near field is maximally about 19 mm. In the method described in NPL 1, it is only possible to obtain the transmission distance of about 2 mm, which is about tenth part of 19 mm. Furthermore, in a 5.8-GHz microwave, which is an ISM band with a high frequency, (wavelength: 51.7 mm)× 0.16=8.2 mm. Therefore, the transmission distance of the microwave in the near field is maximally about 8 mm. In the method described in NPL 1, it is only possible to obtain the transmission distance of about 1 mm, which is about tenth part of 8 mm.

By the way, assuming that Q of the first resonator is Q1, Q of the second resonator is Q2, and the coupling coefficient of the first resonator and the second resonator is K, it is said that the maximum transmission efficiency between the first resonator and the second resonator is expressed as follows:

$$[2+K \times Q1 \times Q2 - 2 \times (1+K^2 \times Q1 \times Q2)^{1/2}]/[K^2 \times Q1 \times Q2]$$

When Q1 and Q2 are equal to Q, this formula indicates that the transmission efficiency is increased by increasing K×Q (or KQ). When KQ=2.83, the transmission efficiency is 50%, when KQ=8.95, the transmission efficiency is 80%, when KQ=19.0, the transmission efficiency is 90%, and when KQ=39.35, the transmission efficiency is 95%.

Generally, the coupling coefficient K tends to be reduced when the distance between two resonators is increased. Therefore, in order to increase the transmission distance, it is suitable to use the resonator with a high Q value. In the electromagnetic field resonance method, in a case where the Q value of the coil is about 10 to 100, the coupling coefficient K is required to be 0.9 to 0.1 so as to obtain the transmission efficiency of 80% or more. In a case where the Q value of the coil is about 1,000 to 2,000, the coupling coefficient K is required to be 0.08 to 0.04 so as to obtain the transmission efficiency of 80% or more.

From these, in the power transmission using the near field, the coupling coefficient K is reduced when attempting to increase the transmission distance. Thus, there is a need to increase the transmission efficiency. To this end, it is necessary to increase the Q value of the resonator. The Q value can be increased by increasing the cross-sectional area of the coil. However, in that case, as an actual problem, there is a limit such as an increase in a weight of the coil and a material cost, resulting in an increase in a price.

Also, in order to rapidly increase the transmission distance, it must be possible to transmit power continuously from the near field to the far field. However, in the past, there is no apparatus that can transmit power over a wide range from the near field to the far field. Also, even PTL 2 does not suggest the transmission of power over a wide range from the near field to the far field. Also, PTL 1 describes that "a method based on resonance with respect to wireless non-radiation type energy transmission is provided." PTL 1 also describes that "in the case of the non-radiation type, the near field region has to be used, and the size of the region is roughly set by the wavelength λ." Also, PTL 1 describes that "the attenuation occurs before the tail becomes oscillatory (radioactive) over a sufficiently long distance. A limiting surface (place where a change in the behavior of the electromagnetic wave occurs) is called a "radiation caustic surface". To the end that the wireless energy transmission method is based on the near field . . . , the distance between the objects to be coupled must be set such that one is present within the other radiation caustic surface." The distance of the "near field" and the "radiation caustic surface" is unclear, but it relates to the power transmission in a region before being "radioactive" according to "coupling mode principle".

On the other hand, as described in PTL 3 and PTL 4, in a case where the radio wave lens or the dielectric lens is disposed so as to suppress the electromagnetic wave divergence, there is a drawback in that an actual transmission distance is reduced due to the intervention of the radio wave lens or the dielectric lens. Furthermore, since the radio wave lens or the dielectric lens is added as a separate component, there is a drawback in that the number of components is increased and the configuration is complicated.

The present invention has been made in view of the above circumstances, and an object of the present invention is to provide a power transmission apparatus and method capable of transmitting power, with a high transmission efficiency, over a wide range from a near field to a far field through a simple configuration, and a resonance device used therein.

Solution to Problem

According to the present invention, for achieving the object above, there is provided a power transmission apparatus, which wirelessly transmits power from a first resonance device to a second resonance device, wherein the first resonance device includes a first waveguide, a first dielectric resonator disposed coaxial with the first waveguide, and a first excitation structure for exciting the first dielectric resonator, one end of the first waveguide is an open end and the other end of the first waveguide is a short-circuited end, the first dielectric resonator has two first end surfaces disposed on opposite sides to each other, is insulated from the first waveguide in the vicinity of the open end of the first waveguide, and is disposed within the first waveguide, such that a thickness being a distance between the two first end surfaces is constant, regardless of a radial position of the first dielectric resonator, the second resonance device includes a second waveguide, a second dielectric resonator disposed coaxial with the second waveguide, and a second excitation structure for exciting the second dielectric resonator, one end of the second waveguide is an open end and the other end of the second waveguide is a short-circuited end, the second dielectric resonator has two first end surfaces disposed on opposite sides to each other, is insulated from the second waveguide in the vicinity of the open end of the second waveguide, and is disposed within the second waveguide, such that a thickness being a distance between the two second end surfaces is constant, regardless of a radial position of the second dielectric resonator, and the first resonance device and the second resonance device are disposed such that the open end of the first waveguide and the open end of the second waveguide are opposite to each other, and power input to the first excitation structure is output from the second excitation structure.

In an aspect of the present invention, the two first end surfaces or the two second end surfaces are made of planes parallel to each other and substantially perpendicular to a wave guiding direction of the first waveguide or a wave guiding direction of the second waveguide.

In an aspect of the present invention, the two first end surfaces or the two second end surfaces are located such that a central portion is farther from the second dielectric resonator or the first dielectric resonator than an outer peripheral portion. In an aspect of the present invention, at least one of the two first end surfaces or at least one of the two second end surfaces is made of at least a part of a conical surface, a pyramid surface, a spherical surface, a parabolic surface, or an elliptical surface, which has a symmetrical axis coaxial with the first waveguide or the second waveguide in at least the outer peripheral portion.

In an aspect of the present invention, a shape of the first dielectric resonator or the second dielectric resonator is a polygonal prism, a polygonal cylinder, a cylindrical prism, or a circular cylinder, which has the first end surface or the second end surface as both end surfaces. In an aspect of the present invention, a cross-sectional shape of the first waveguide or the second waveguide is a polygonal cylinder or a circular cylinder. In an aspect of the present invention, the first waveguide or the second waveguide has a tapered shape such that a cross-sectional area is gradually reduced from the open end to the short-circuited end.

In an aspect of the present invention, the first excitation structure or the second excitation structure is disposed to be insulated from the first waveguide or the second waveguide in the short-circuited end of the first waveguide or the short-circuited end of the second waveguide, and includes a conductor extending in a wave guiding direction within the first waveguide or the second waveguide.

Further, according to the present invention, for achieving the object above, there is provided a power transmission method, which wirelessly transmits power from a first resonance device to a second resonance device by using the power transmission apparatus above, the power transmission method comprising:

disposing the first resonance device and the second resonance device so that the open end of the first waveguide and the open end of the second waveguide are opposite to each other;

inputting power to the first excitation structure; and
outputting the power from the second excitation structure.

Further, according to the present invention, for achieving the object above, there is provided a resonance device, which is used to constitute the power transmission apparatus above or to perform the power transmission method above, the resonance device comprising:

a waveguide;

a dielectric resonator disposed coaxial with the waveguide; and an excitation structure for exciting the dielectric resonator, wherein one end of the waveguide is an open end and the other end of the waveguide is a short-circuited end, and the dielectric resonator has two first end surfaces disposed on opposite sides to each other, is insulated from the waveguide in the vicinity of the open end of the waveguide, and is disposed within the waveguide, such that a thickness being a distance between the two end surfaces is constant, regardless of a radial position of the dielectric resonator.

Advantages Effects of the Invention

According to the present invention, there are provided a power transmission apparatus capable of transmitting power, with a high transmission efficiency, over a wide range from a near field to a far field through a simple configuration.

BRIEF DESCRIPTION OF DRAWINGS

FIG. 9 A figure illustrates the result of electromagnetic field analysis by electromagnetic field simulation in embodiment 1.

FIG. 20 A figure illustrates the result of electromagnetic field analysis by electromagnetic field simulation of a TM03δ mode in embodiment 3.

FIG. 24 A figure illustrates the result of electromagnetic field analysis by electromagnetic field simulation in embodiment 4.

FIG. 30 A figure illustrates the result of electromagnetic field analysis in electromagnetic field simulation for a dielectric resonator having a hexagonal prism shape in embodiment 5.

FIG. 32 A figure illustrates the result of electromagnetic field analysis by electromagnetic field simulation in embodiment 6.

FIG. 33 A figure illustrates the result of electromagnetic field analysis by electromagnetic field simulation in embodiment 6.

FIG. 34 A figure illustrates the result of electromagnetic field analysis by electromagnetic field simulation in embodiment 6.

FIG. 38 A figure illustrates the result of electromagnetic field analysis by electromagnetic field simulation in embodiment 7.

FIG. 49 A figure illustrates a graph of an example of a relationship between a diameter and a length of the dielectric resonator and a frequency and a resonance mode of the dielectric resonator in the power transmission apparatus according to the present invention.

FIG. 52 Figures illustrate explanatory diagrams of an operation and a function of embodiment 1A.

DESCRIPTION OF EMBODIMENTS

Figure 1:
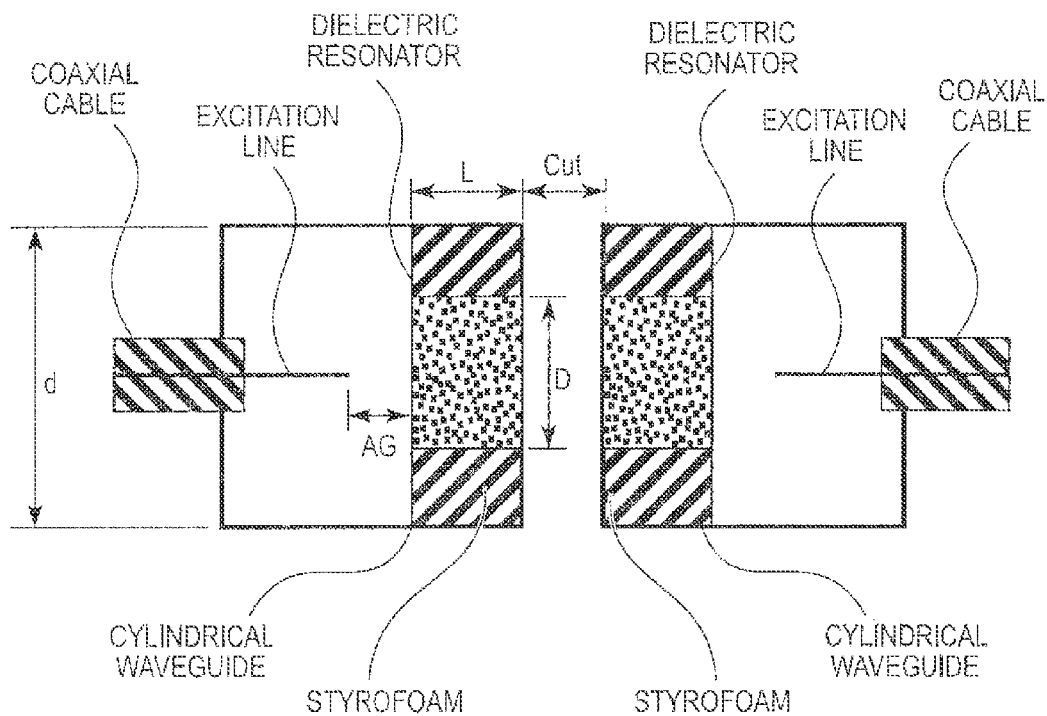
FIG. 1 A figure illustrates a schematic sectional view of embodiment 1 of a power transmission apparatus according to the present invention.

In the past, in an electromagnetic field resonance method, a coil or an antenna has been used in a resonator. However, in the present invention, a power transmission apparatus, which further increases a transmission distance, is provided by using a parallel-plate type dielectric resonator having the highest Q value or a dielectric resonator similar thereto. Herein, the dielectric resonator similar to the parallel-plate type dielectric resonator doesn't mean the parallel-plate type dielectric resonator but means a dielectric resonator shaped such that a thickness being a distance between two end surfaces is constant, regardless of a radial position of the dielectric resonator. In the following description, the parallel-plate type dielectric resonator is mainly described, but the same is also true of the dielectric resonator similar to the parallel-plate type dielectric resonator.

When the dielectric resonator is simply placed in a space, an electromagnetic field easily leaks out and a Q value is lowered. Therefore, in the present invention, in order to realize a required electromagnetic shield, only a surface opposite to a parallel end surface of the other parallel-plate type dielectric resonator among parallel end surfaces of respective parallel-plate type dielectric resonators is opened, and the other surface is covered with a waveguide.

According to the present invention, since a resonator having a high Q value is provided, it is possible to maintain K×Q (or KQ), which is an index of a transmission efficiency, to be large, and maintain a high transmission efficiency, even when a coupling coefficient K is small. Furthermore, according to the present invention, since various resonance modes exist in the parallel-plate type dielectric resonator, it is possible to further widen a facing area more than a coil or an antenna, increase a coupling coefficient K, and further increase KQ. Thus, according to the present invention, there is provided a power transmission apparatus in which a transmission efficiency is not reduced even when a transmission distance is further increased.

Also, according to the present invention, there is provided a power transmission apparatus in which a Q value of a resonance system can be increased by a configuration that radiates an electromagnetic wave in one direction, and thus, even when a coupling coefficient K is extremely small, an electromagnetic wave radiated from one dielectric resonator can be efficiently received by the other dielectric resonator, thereby transmitting power to a far field at a high transmission efficiency.

Furthermore, according to the present invention, since there is no need to use a plurality of antennas requiring phase control as in a conventional power transmission apparatus of a far field by a microwave, it is possible to provide a practical power transmission apparatus capable of transmitting power to a far field with a small number of components and at a low cost.

In particular, two first end surfaces or two end surfaces are located such that a central portion is farther from a second dielectric resonator or a first dielectric resonator than an outer peripheral portion. For example, at least one of the two first end surfaces or at least one of the two second end surfaces is made of at least a part of a conical surface, a pyramid surface, a spherical surface, a parabolic surface, or an elliptical surface, which has a symmetrical axis coaxial with a first waveguide or a second waveguide in at least the outer peripheral portion. Since an electromagnetic field to be diverged from the outer peripheral portion of one dielectric resonator can be concentrated in a required direction and be directed toward the other dielectric resonator, a transmission distance can be extended without increasing transmission loss.

Hereinafter, specific embodiments of the present invention will be described with reference to the drawings. Also, some of numerical values related to the embodiments are shown in Table 1, which is to be described below.

Embodiment 1

FIG. 1 illustrates a schematic sectional view of embodiment 1. A power transmission apparatus of the present embodiment is a power transmission apparatus that transmits power wirelessly from a first resonance device (disposed on the left side of FIG. 1) to a second resonance device (disposed on the right side of FIG. 1).

The first resonance device includes a first waveguide (cylindrical waveguide of a cylindrical cross-sectional shape located on the left side in FIG. 1 (also referred to as "circular waveguide")), a first dielectric resonator (dielectric resonator of a cylindrical shape located on the left side in FIG. 1), and a first excitation structure for exciting the first dielectric resonator (excitation line made of a center conductor of a coaxial cable disposed on the left side in FIG. 1). The first waveguide, the first dielectric resonator, and the first excitation structure are coaxially disposed. Also, in the present invention, the term "coaxial" means a state of being disposed to "share an axis". In the first waveguide, one end (right end in FIG. 1) is an open terminal, and the other end (left end in FIG. 1) is a short-circuited end. The first dielectric resonator includes two first parallel ends located in parallel to each other on sides opposite to each other (both end surfaces located on the left side and the right side in FIG. 1). Since the first parallel ends are substantially perpendicular to a wave guiding direction of the first waveguide (horizontal direction in FIG. 1), the first dielectric resonator is insulated from the first waveguide in the vicinity of the open end of the first waveguide (by interposing a cylindrical Styrofoam located on the left side in FIG. 1) and is disposed within the first waveguide.

The second resonance device has the same configuration as the first resonance device but is disposed in a direction opposite to the first resonance device. That is, the second resonance device includes a second waveguide (cylindrical waveguide of a cylindrical cross-sectional shape located on the right side in FIG. 1), a second dielectric resonator (dielectric resonator of a cylindrical shape located on the right side in FIG. 1), and a second excitation structure for exciting the second dielectric resonator (excitation line made of a center conductor of a coaxial cable located on the right side in FIG. 1). The second waveguide, the second dielectric resonator, and the second excitation structure are coaxially disposed. In the second waveguide, one end (left end in FIG. 1) is an open terminal, and the other end (right end in FIG. 1) is a short-circuited end. The second dielectric resonator includes two second parallel ends located in parallel to each other on sides opposite to each other (both end surfaces located on the left side and the right side in FIG. 1). Since the first parallel ends are substantially perpendicular to a wave guiding direction of the second waveguide (horizontal direction in FIG. 1), the second dielectric resonator is insulated from the second waveguide in the vicinity of the open end of the second waveguide (by interposing a cylindrical Styrofoam located on the right side in FIG. 1) and is disposed within the second waveguide.

The first resonance device and the second resonance device are coaxially disposed such that the open end of the first waveguide and the open end of the second waveguide are opposite to each other, and power input to the first excitation structure is output from the second excitation structure.

In embodiment 1, a resonance frequency is set to around 2.45 GHz and a TM01δ mode is used. In the cylindrical dielectric resonator, a dielectric ceramic material, of which a relative dielectric constant (Er) is 38, was used, a diameter D of the resonator was set to be 28.1 mm, a length L of the resonator was set to be 18.7 mm, and a diameter d of the cylindrical waveguide was set to be 50.6 mm, resulting in d/D=1.8. In the present embodiment, since the resonator is a parallel-plate type dielectric resonator, a thickness thereof is equal to an axial dimension, namely a length L of the resonator. One end of the cylindrical waveguide is short-circuited. In the vicinity of the open end of the waveguide, the cylindrical dielectric resonator is fixed to be coaxial with each other with respect to the cylindrical waveguide through a low-dielectric-loss insulator having a low relative dielectric constant and a low dielectric loss tangent, such as Styrofoam or Teflon (registered trademark). A coaxial cable, in which a center conductor having a length of about ¼ wavelength (about 30.6 mm at 2.45 GHz) (that is, a center conductor in which a length of the excitation line is about 30.6 mm) is exposed, is inserted into the short-circuited end of the cylindrical waveguide so as to be coaxial with the cylindrical waveguide and the cylindrical dielectric resonator. An external conductor of the coaxial cable is connected to the short-circuited end of the waveguide. A distance (gap) AG between the front end of the center conductor of the coaxial cable and the dielectric resonator is maintained and fixed to 23.0 mm. This is set as a unit (resonance device). Two units are manufactured. The open ends of the cylindrical waveguides are opposite to each other to have a coaxial shape, and an arbitrary distance is maintained. Power of around 2.45 GHz is supplied to the coaxial cable of one unit (first resonance device), and power is taken out from the coaxial cable of the other unit (second resonance device).

A transmission distance (M) is a distance between two resonance devices, and in particular, a minimum distance among distances between the first waveguide or the first dielectric resonator of the first resonance device and the second waveguide or the second dielectric resonator of the second resonance device. Typically, the transmission distance (M) is the smaller distance of the distance Cut between two waveguides opposite to each other and the distance between two dielectric resonators opposite to each other. In the present embodiment, typically, the distance Cut between the two cylindrical waveguides opposite to each other is equal to the distance between the two dielectric resonators opposite to each other.

Figure 2:
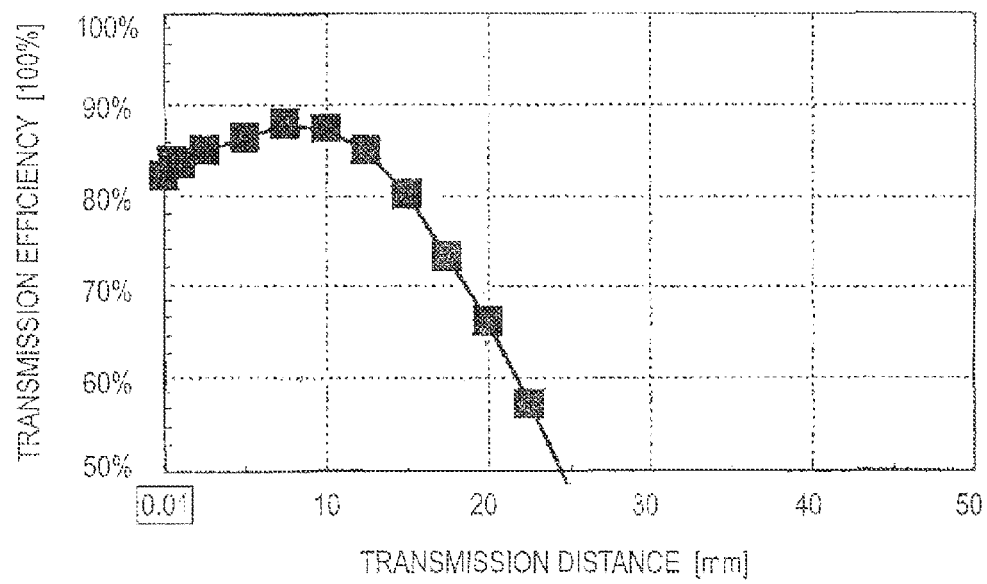
FIG. 2 A figure illustrates a relationship between a transmission distance and a transmission efficiency in embodiment 1.
Figure 3:
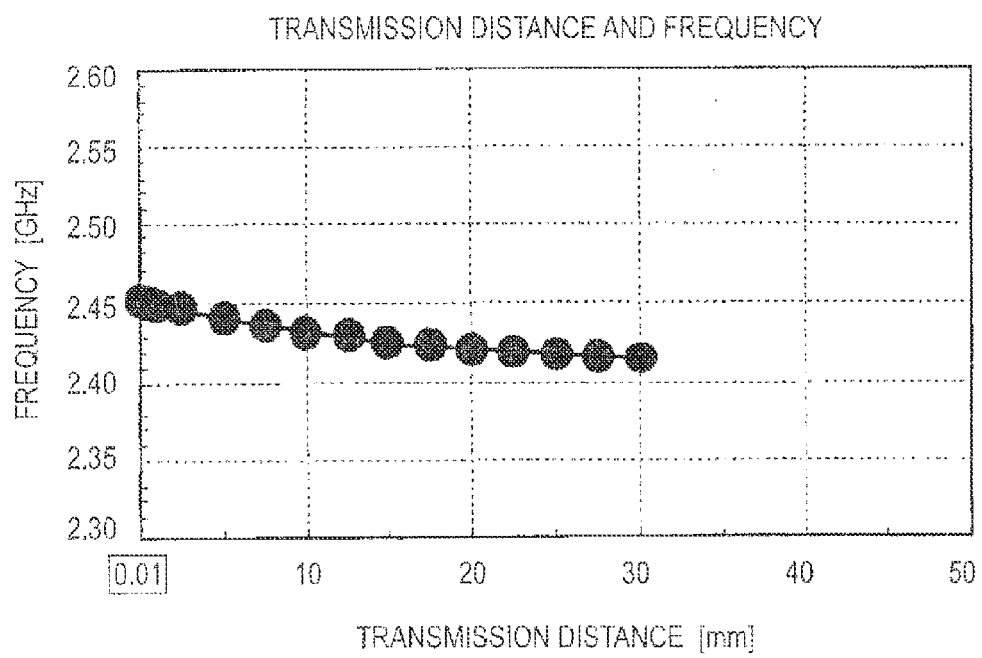
FIG. 3 A figure illustrates a relationship between a transmission distance and a frequency at which a transmission efficiency is maximum in embodiment 1.

FIG. 2 illustrates a transmission characteristic measured by setting a ratio of output power to input power as a transmission efficiency (relationship between a transmission distance and a transmission efficiency). The transmission efficiency becomes maximum, about 88%, at a transmission distance of around 7.5 mm, and the transmission efficiency is reduced even when closer or farther than that. A transmission distance at which the transmission efficiency is 50% is around about 25 mm. It can be seen that the transmission distance is 0.20 times as long as the wavelength λ (in Table 1, how many times as long as the wavelength λ is shown in a column of "wavelength (λ)"), is over 0.16 times as long as the wavelength λ that is the limit of the near field, and reaches up to the far field. FIG. 3 illustrates a relationship between a transmission distance and a frequency at which a transmission efficiency is maximum. It can be seen that a resonance frequency change is smaller than 40 MHz.

Figure 4:
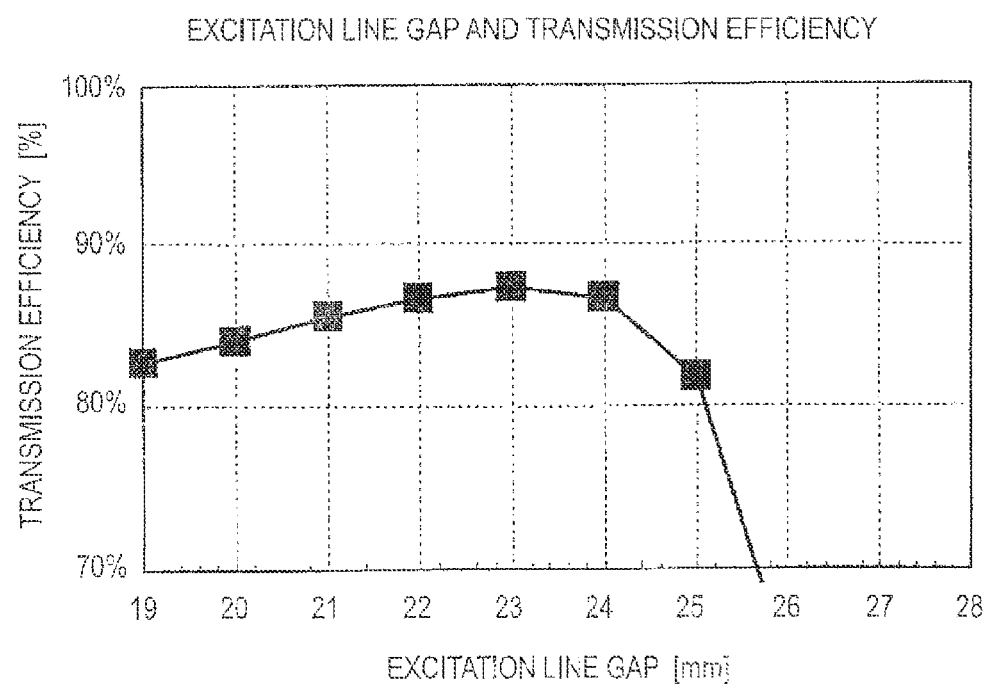
FIG. 4 A figure illustrates a relationship between an excitation line gap and a transmission efficiency when the excitation line is changed in embodiment 1.

FIG. 4 illustrates a transmission characteristic (relationship between the excitation line gap and the transmission efficiency) when a gap between the excitation line and the dielectric resonator (axial distance:excitation line gap) is changed. The transmission efficiency is almost maximized when the gap is around 23 mm.

Figure 5:
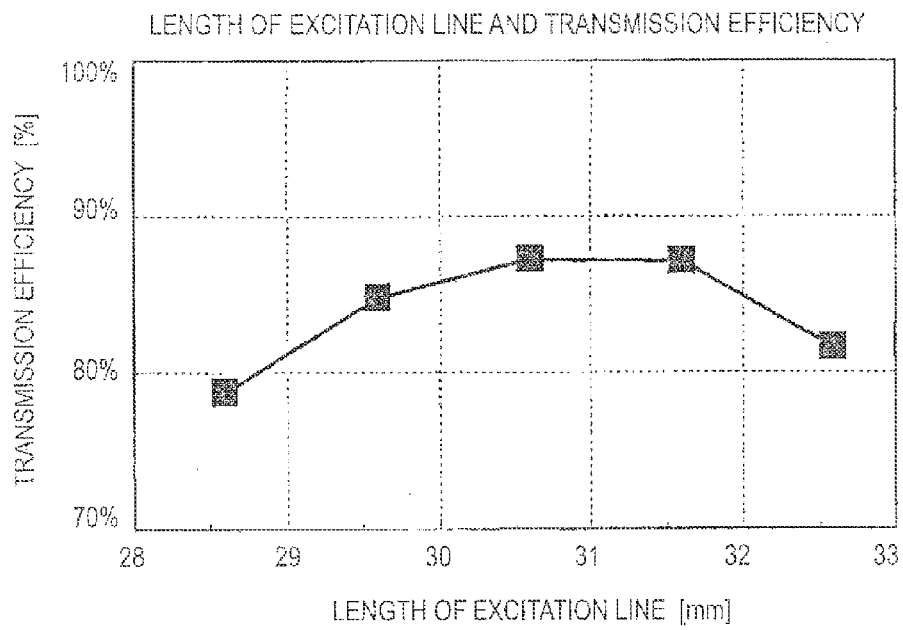
FIG. 5 A figure illustrates a relationship between a length of an excitation line and a transmission efficiency when a transmission distance is 7.5 mm in embodiment 1.

FIG. 5 illustrates a relationship between the length of the excitation line and the transmission efficiency when the transmission distance is 7.5 mm. Since an actual frequency is lower than 2.45 GHz, the transmission efficiency is almost maximized when the length of the excitation line is around 30.6 mm.

Figure 6:
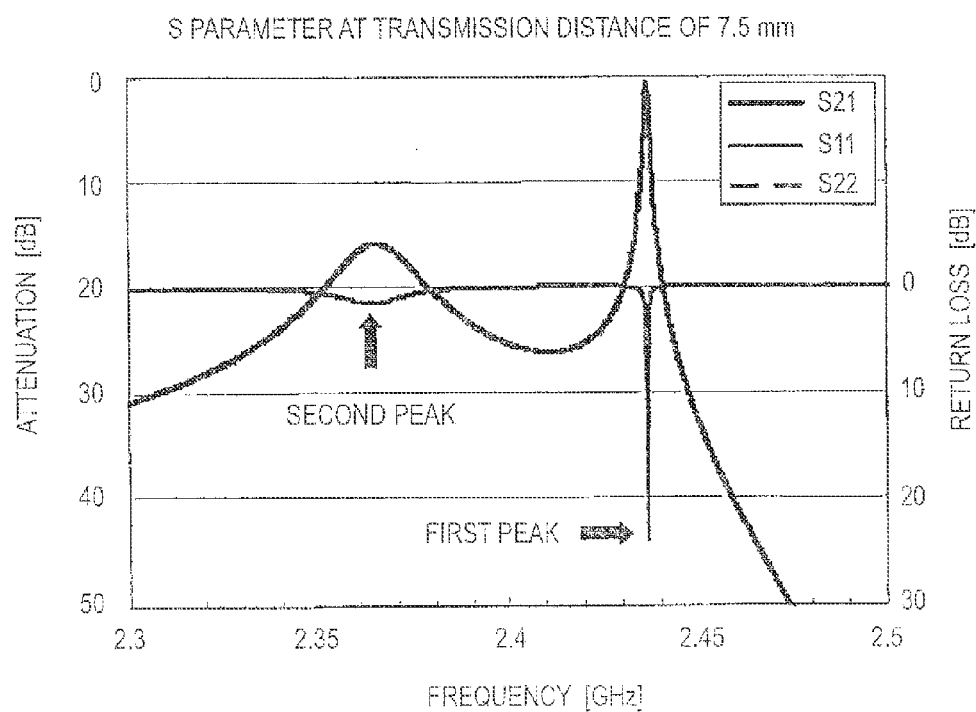
FIG. 6 A figure illustrates an S parameter when a transmission distance is 7.5 mm in embodiment 1.

FIG. 6 illustrates an S parameter when the transmission distance is 7.5 mm. At a first peak, a frequency is 2.437 GHz, an attenuation of S21 is 0.56 dB, and a return loss of S11 is 24 dB. At a second peak, a frequency is 2.364 GHz, S21 is 16 dB, and S11 is 1.5 dB. The two dielectric resonators opposite to each other are electric-field-coupled, and a coupling coefficient K is 0.030. An unloaded Q value of the dielectric resonator is about 10,000, K×Q=304, and (K×Q)²=92,500.

Figure 7:
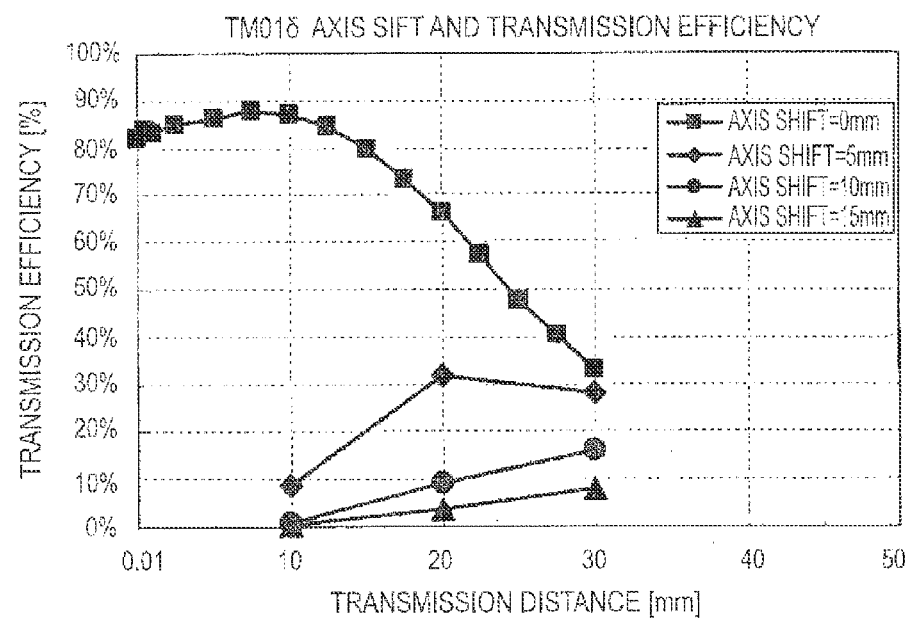
FIG. 7 A figure illustrates a relationship between a transmission distance and a transmission efficiency when axes of two units are shifted in embodiment 1.

FIG. 7 illustrates a relationship between a transmission distance and a transmission efficiency when two units are changed to the center distance of 5 mm, 10 mm, and 15 mm from the coaxial shape (that is, by shifting the axes). When the axis is shifted by 5 mm, the transmission efficiency is rapidly lowered and becomes smaller than 50%.

Figure 8:
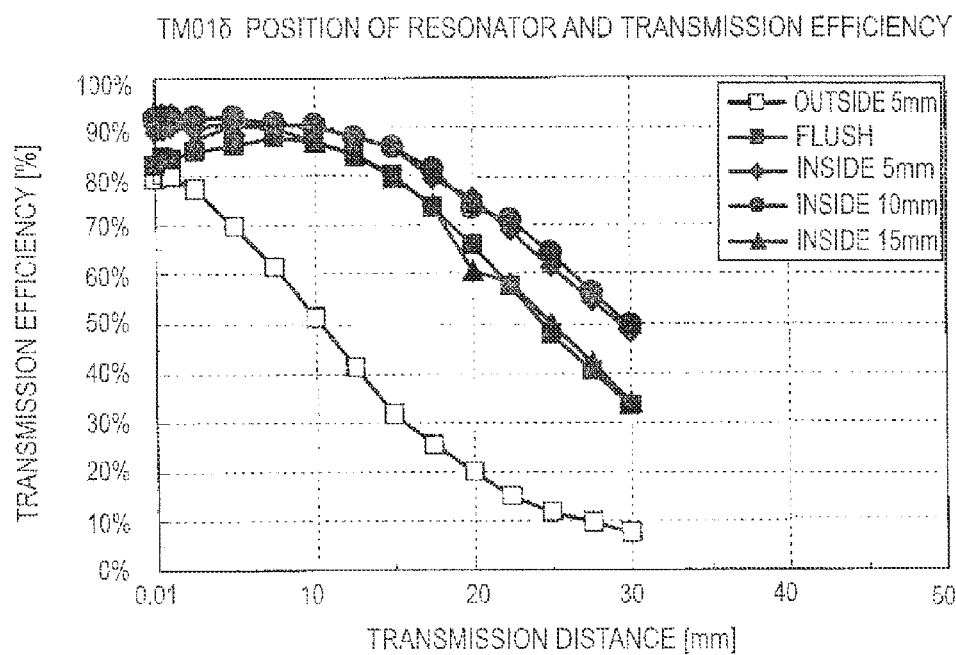
FIG. 8 A figure illustrates a relationship between a transmission distance and a transmission efficiency when an axial position of a dielectric resonator is set to the inside or the outside of a cylindrical waveguide from the flush with respect to the cylindrical waveguide in embodiment 1.

In the above description, regarding the axial position of the dielectric resonator with respect to the cylindrical waveguide in each unit, the end surface of the dielectric resonator of the side opposite to the other unit is flush (same position) with the open end of the cylindrical waveguide. FIG. 8 illustrates a relationship between a transmission distance and a transmission efficiency when an axial position is set to the inside or the outside of the cylindrical waveguide from the flush. When the dielectric resonator is drawn 5 mm on the outside of the cylindrical waveguide, the transmission efficiency is reduced and the transmission distance is also rapidly reduced. When the dielectric resonator is put into about 5 to 10 mm inside of the cylindrical waveguide from the flush, the transmission efficiency is increased and the transmission distance is also increased. However, when the dielectric resonator is put into 15 mm inside of the cylindrical resonator from the flush, the transmission efficiency is increased until the transmission distance becomes about 7.5 mm, but when beyond that, the transmission efficiency is almost the same as the case of the flush.

FIG. 9 illustrates the result obtained when electromagnetic field analysis has been performed in electromagnetic field simulation. The mode of the dielectric resonator can be confirmed as being a TE01δ mode because there is no electromagnetic field change in a circumferential direction, there is one electromagnetic field change in a radial direction, and there is one electromagnetic field change in an axial direction. Also, since an electric field between the waveguides is strong, the dielectric resonators can be confirmed as being mostly coupled by the electric field.

In PTL 2, the dielectric resonator is inserted into the cutoff waveguide. However, in embodiment 1 of the present invention, a diameter of the cylindrical waveguide is 50.6 mm, a cutoff frequency of a TM01 mode of the cylindrical waveguide is 4.54 GHz, a cutoff frequency of a TM11 mode is 7.23 GHz, a cutoff frequency of a TM02 mode is 10.40 GHz, a cutoff frequency of a TE11 mode is 3.47 GHz, and a cutoff frequency of a TE21 mode is 5.77 GHz, and a cutoff frequency of a TE01 mode is 7.23 GHz. Therefore, it is a condition of a cutoff frequency or less.

Embodiment 2

Figure 10A:
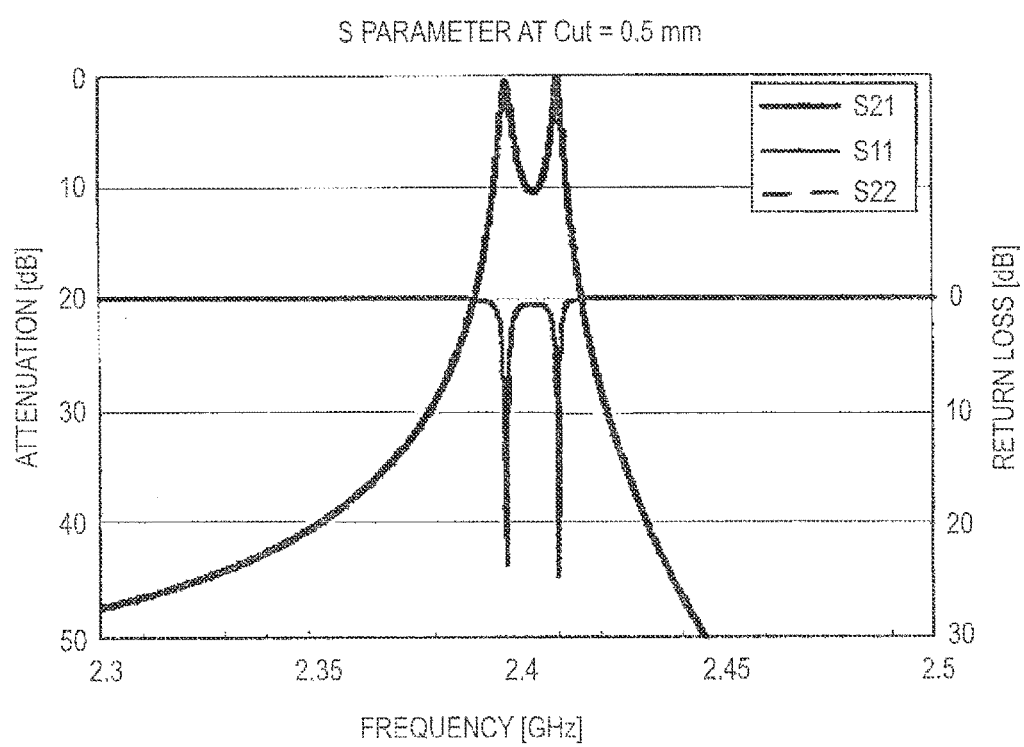
FIG. 10A A figure illustrates an S parameter in embodiment 2.
Figure 10B:
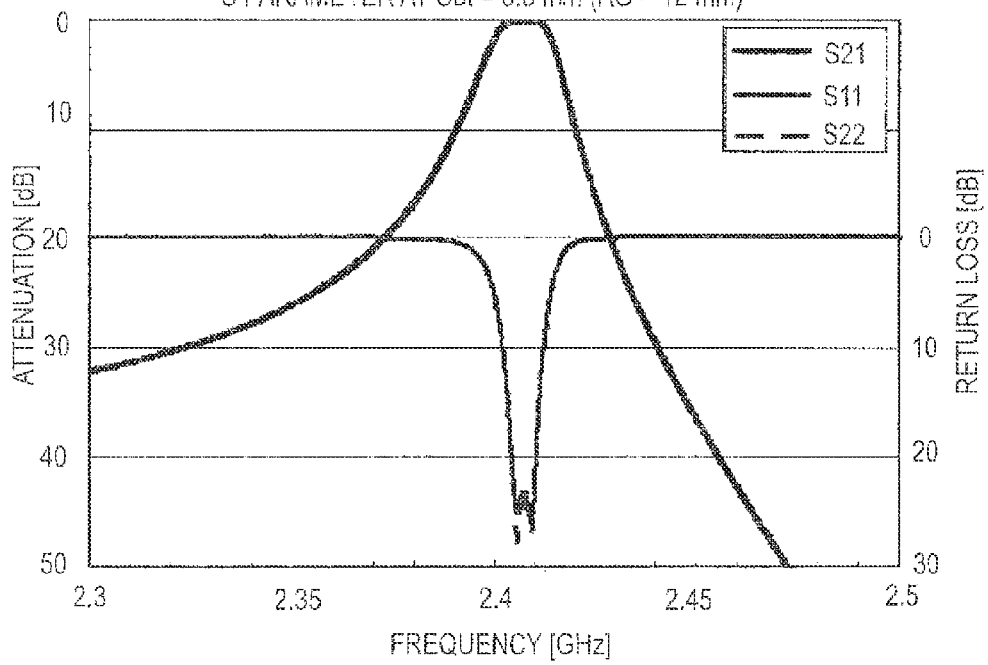
FIG. 10B A figure illustrates an S parameter in embodiment 2.
Figure 10C:
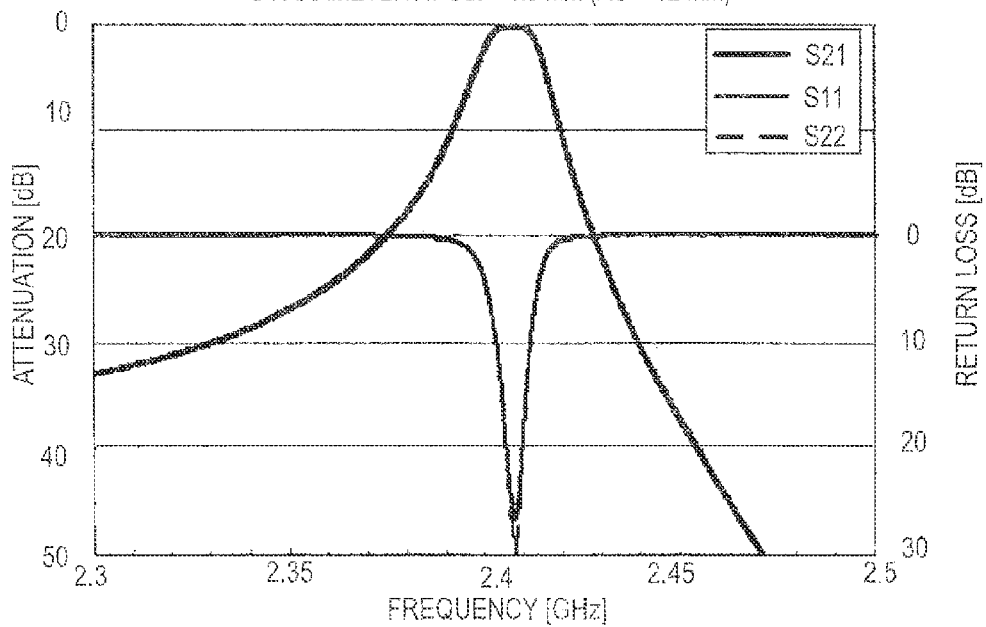
FIG. 10C A figure illustrates an S parameter in embodiment 2.

In Embodiment 1, regarding the axial position of the dielectric resonator with respect to the cylindrical waveguide, FIG. 10A illustrates an S parameter when two units in which the dielectric resonator is inserted 7.5 mm on the inside of the cylindrical waveguide are coaxially disposed and a gap (Cut) between the cylindrical waveguides is 0.5 mm. FIG. 10B illustrates an S parameter when a gap (AG) between the front end of the coaxial cable (that is, the front end of the excitation line) and the dielectric resonator is changed from 23 mm to 12 mm. This characteristic is a two-stage band pass filter in which a center frequency is 2.407 GHz, a bandwidth is about 6 MHz, and an insertion loss is about 0.2 dB (transmission efficiency is about 95%). Also, FIG. 10C illustrates an S parameter when a gap between the cylindrical waveguides is 1.0 mm. This characteristic is a two-stage band pass filter in which a center frequency is 2.4075 GHz, a bandwidth is about 5 MHz, and an insertion loss is about 0.2 dB (transmission efficiency is about 95%). The power transmission apparatus, in which the waveguide distance is 0.5 mm or 1.0 mm, can be applied for the purpose of reducing noise with low loss in a non-contact connector or a rotary joint of a waveguide.

Embodiment 3

The configuration of the apparatus of embodiment 3 is substantially the same as that of embodiment 1 and corresponds to that illustrated in FIG. 1.

However, in embodiment 3, a cylindrical dielectric resonator made of a dielectric ceramic material, of which a relative dielectric constant is 38, is used, and a TM02δ mode and a TM03δ mode designed around 2.45 GHz are used. In the dielectric resonator of the TM02δ mode, a diameter D is 55.6 mm, a length L is 16.0 mm, and a diameter d of a cylindrical waveguide is 100.1 mm. In the dielectric resonator of the TM03δ mode, a diameter D is 80.4 mm, a length L is 16.3 mm, and a diameter d of a cylindrical waveguide is 144.8 mm.

Figure 11:
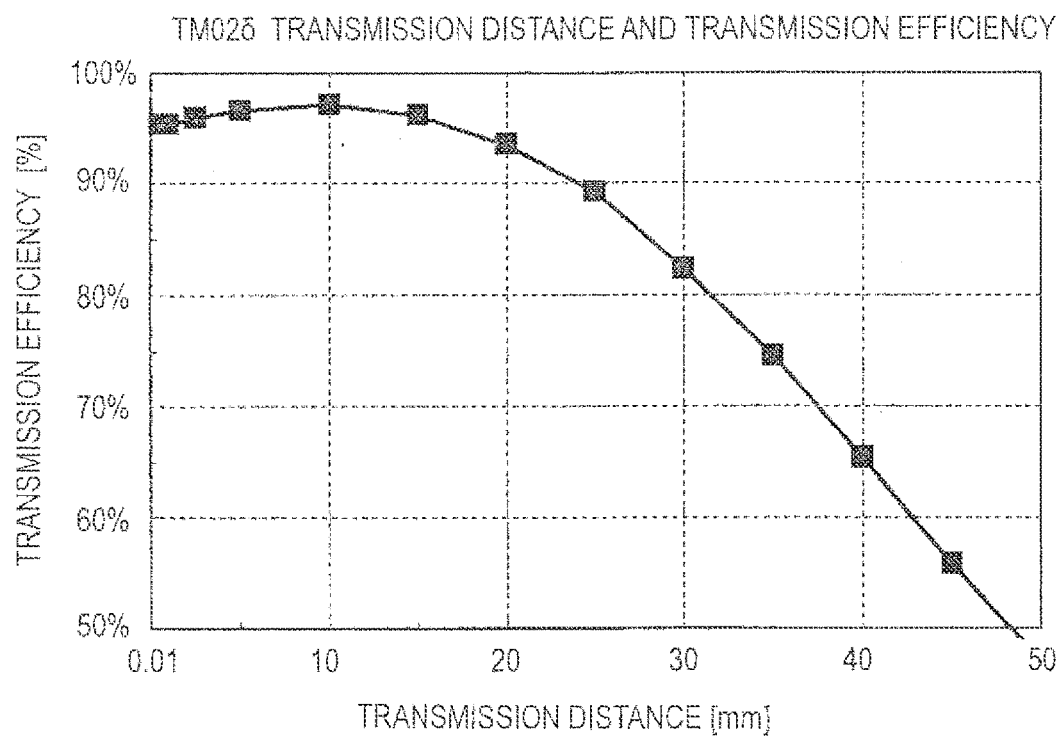
FIG. 11 A figure illustrates a relationship between a transmission distance and a transmission efficiency of a TM02δ mode in embodiment 3.
Figure 12:
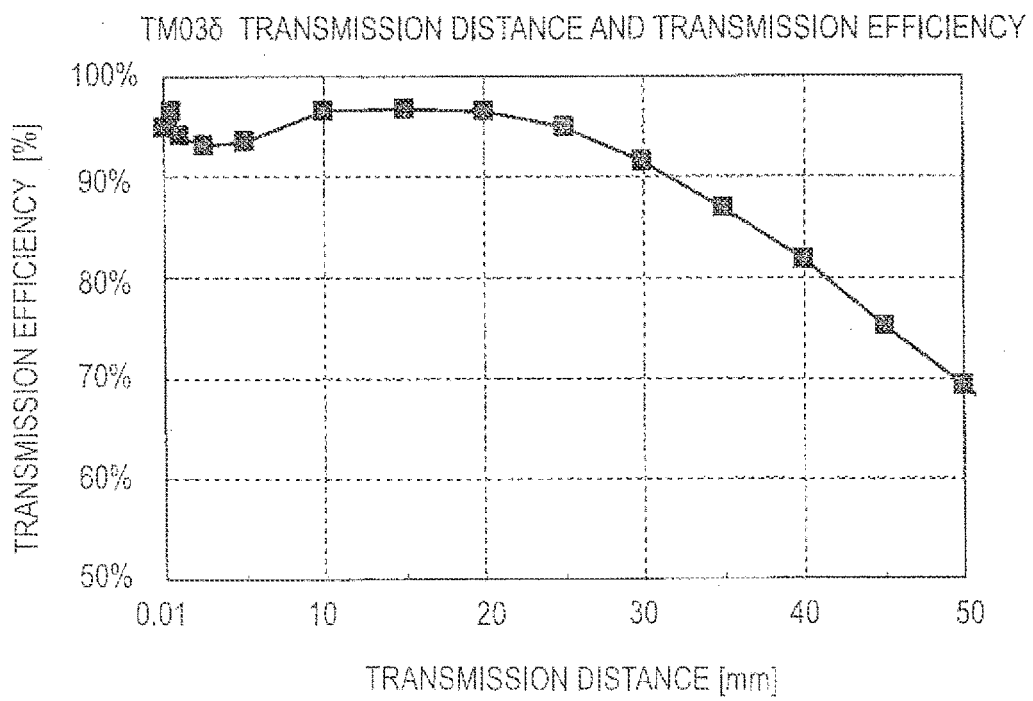
FIG. 12 A figure illustrates a relationship between a transmission distance and a transmission efficiency of a TM03δ mode in embodiment 3.

In embodiment 3, FIGS. 11 and 12 illustrate transmission characteristics (relationship between a transmission distance and a transmission efficiency) of a TM02δ mode and a TM03δ mode, respectively, which are measured by setting a distance between two cylindrical waveguides opposite to each other as a transmission distance and setting a ratio of output power to input power as a transmission efficiency. The transmission distance at which the transmission efficiency of the TM02δ mode is 50% is 48 mm, and the transmission distance is 0.40 times as long as the wavelength λ. It can be seen that the transmission distance is over 0.16 times as long as the wavelength λ that is the limit of the near field and reaches up to the far field. Similarly, the transmission distance at which the transmission efficiency of the TM03δ mode is 50% is 66 mm, and the transmission distance is 0.54 times as long as the wavelength λ. It can be seen that the transmission distance is over 0.16 times as long as the wavelength λ that is the limit of the near field and reaches up to the far field.

Figure 13:
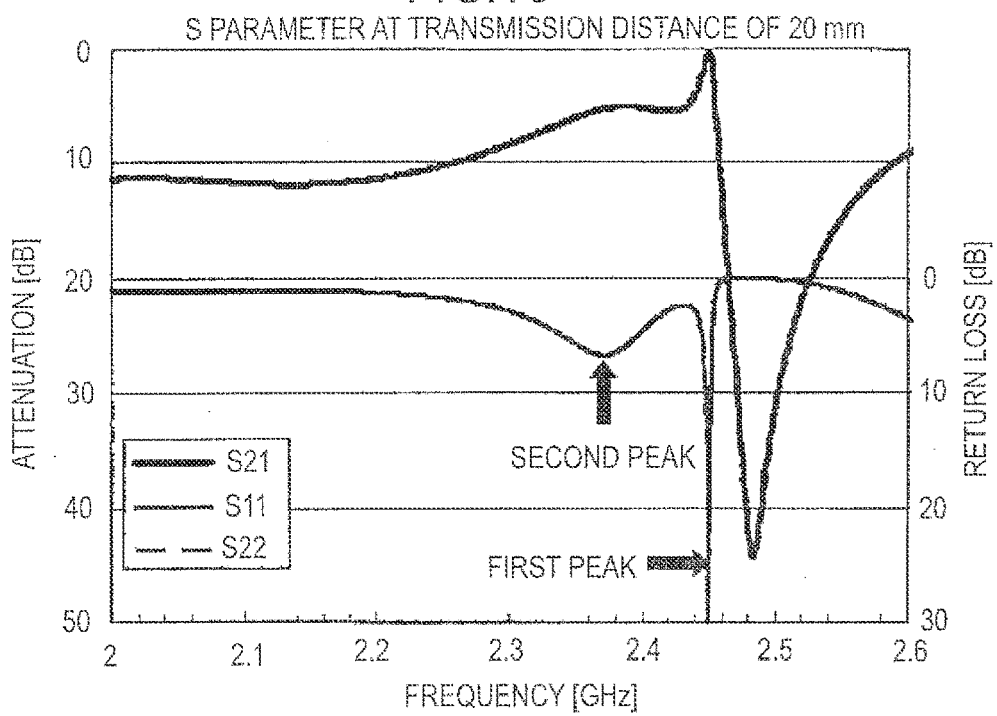
FIG. 13 A figure illustrates an S parameter of a TM02δ mode in embodiment 3.
Figure 14:
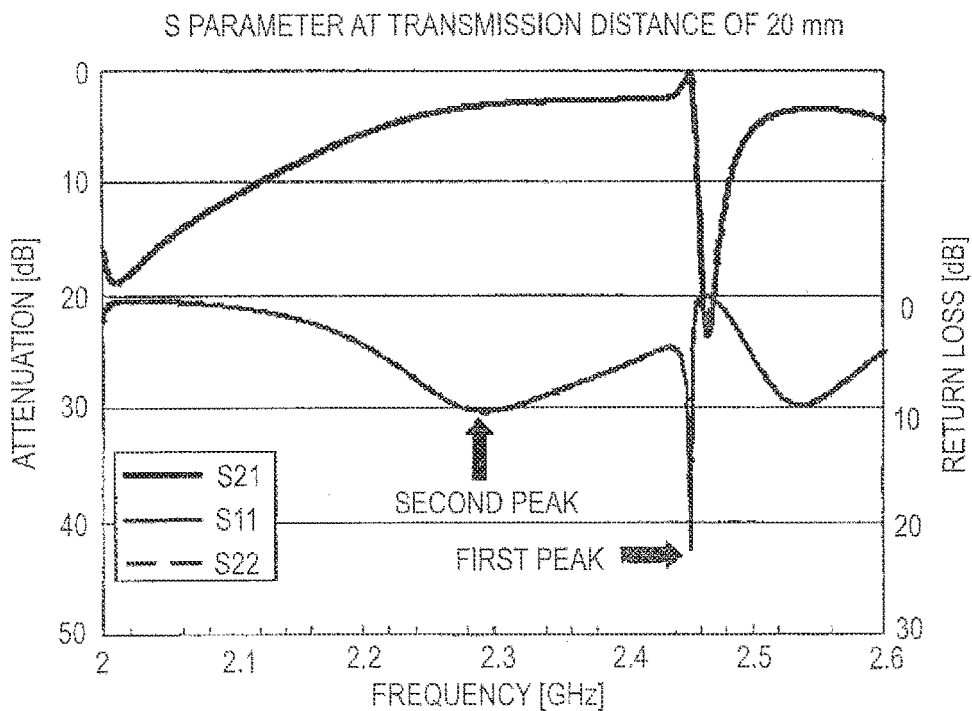
FIG. 14 A figure illustrates an S parameter of a TM03δ mode in embodiment 3.

Also, FIGS. 13 and 14 illustrate S parameters of the TM02δ mode and the TM03δ mode when the waveguide distance, namely the transmission distance, is 20 mm.

In the TM02δ mode, at a first peak, a frequency is 2.450 GHz, an attenuation of S21 is 0.53 dB, and a return loss of S11 is 50 dB. At a second peak, a frequency is 2.371 GHz, S21 is 5 dB, and S11 is 6.5 dB. The dielectric resonators opposite to each other are mainly electric-field-coupled, a coupling coefficient K is 0.0328, K×Q=327.7, and $(K \times Q)^2$ is 107,400.

Also, in the TM03δ mode, at a first peak, a frequency is 2.486 GHz, an attenuation of S21 is 0.35 dB, and a return loss of S11 is 37 dB. At a second peak, a frequency is 2.441 GHz, S21 is 9 dB, and S11 is 3 dB. The dielectric resonators opposite to each other are mainly electric-field-coupled, a coupling coefficient K is 0.0183, K×Q=182.7, and $(K \times Q)^2$ is 33,350.

Figure 15:
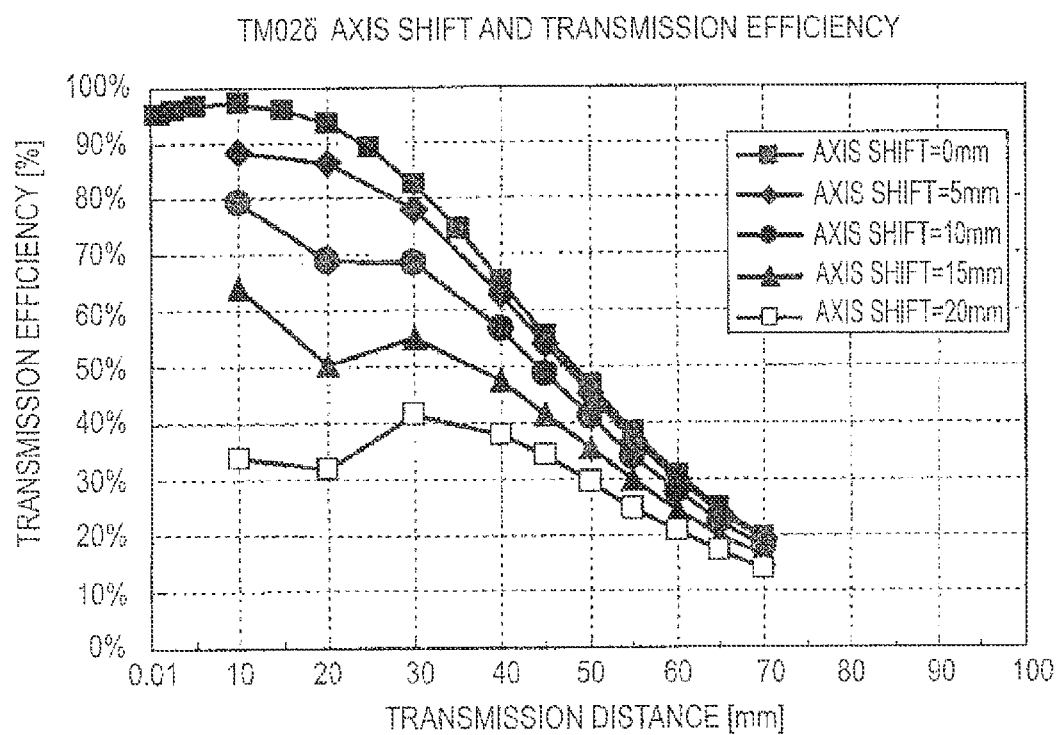
FIG. 15 A figure illustrates a relationship between a transmission distance and a transmission efficiency when axes of two units are shifted for a TM02δ mode in embodiment 3.
Figure 16:
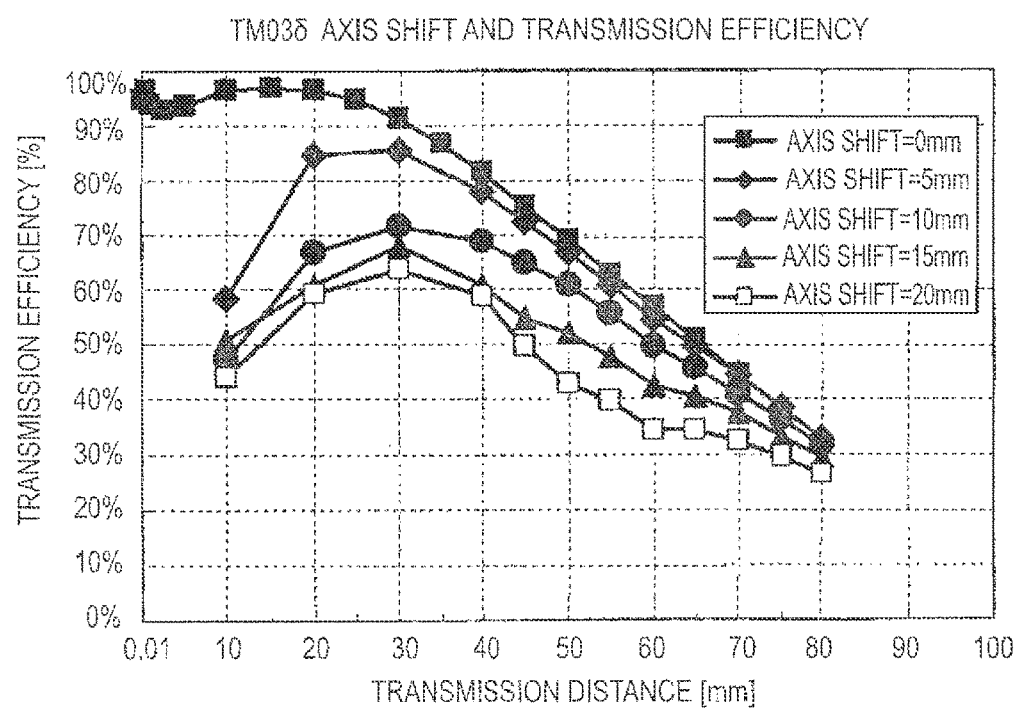
FIG. 16 A figure illustrates a relationship between a transmission distance and a transmission efficiency when axes of two units are shifted for a TM03δ mode in embodiment 3.

FIGS. 15 and 16 illustrate a relationship between a transmission distance and a transmission efficiency, respectively in the TM02δ mode and the TM03δ mode, when two units are changed to 5 mm, 10 mm, 15 mm, 20 mm, 25 mm, and 30 mm from the coaxial shape (that is, by shifting the axes). In the TM02δ mode, when the transmission distance is 30 mm, the transmission efficiency is reduced by several percent as compared with the case where the axis is not shifted 5 mm, and the transmission efficiency is maintained 50% or more even when the axis is shifted 15 mm. On the other hand, in the TM03δ mode, when the transmission distance is 30 mm, the transmission efficiency is reduced by several percent as compared with the case where the axis is not shifted 5 mm, and the transmission efficiency is maintained 50% or more even when the axis is shifted 20 mm.

Figure 17:
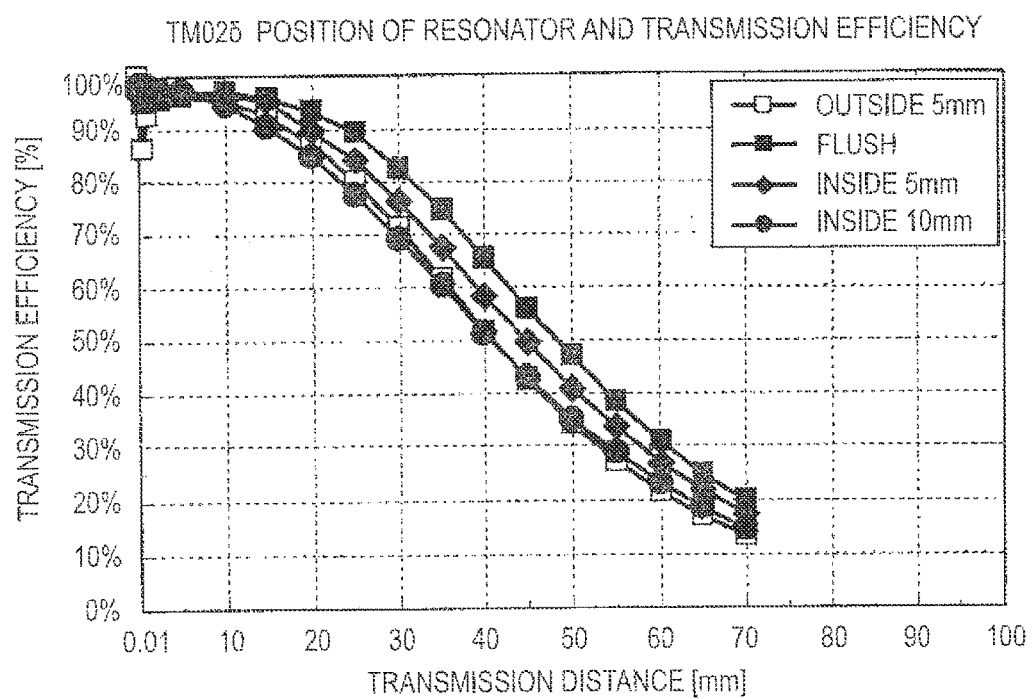
FIG. 17 A figure illustrates a relationship between a transmission distance and a transmission efficiency when an axial position of a dielectric resonator is set to the inside or the outside of a cylindrical waveguide from the flush with respect to the cylindrical waveguide for a TM02δ mode in embodiment 3.
Figure 18:
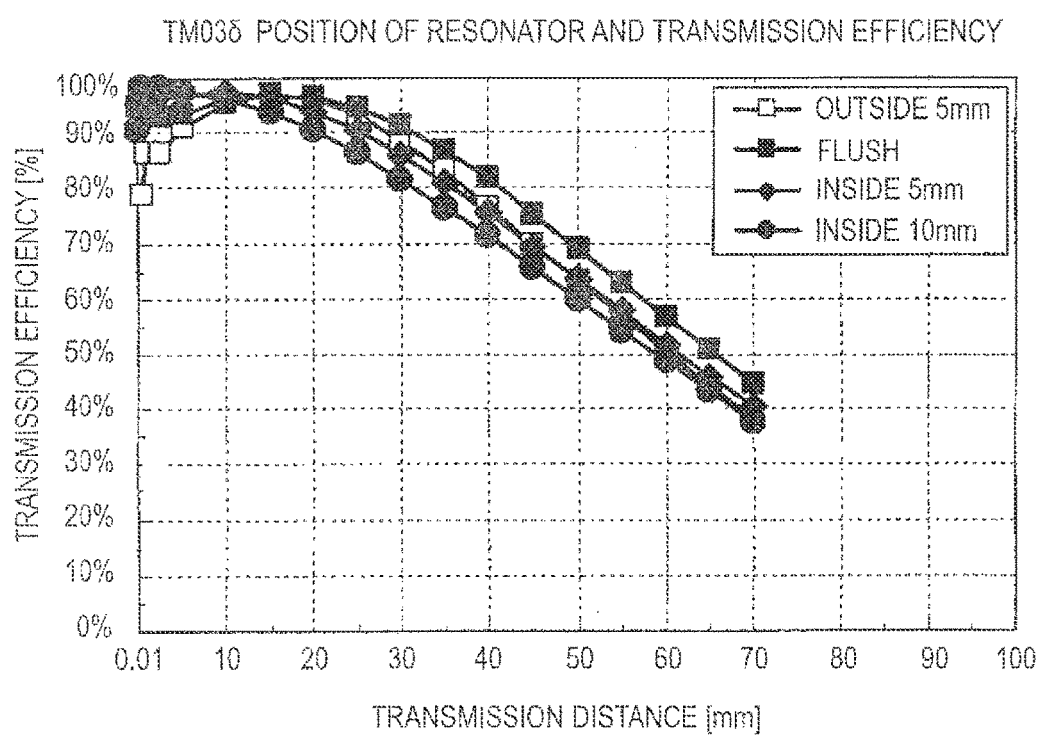
FIG. 18 A figure illustrates a relationship between a transmission distance and a transmission efficiency when an axial position of a dielectric resonator is set to the inside or the outside of a cylindrical waveguide from the flush with respect to the cylindrical waveguide for a TM03δ mode in embodiment 3.

Next, regarding the axial position of the dielectric resonator with respect to the cylindrical waveguide in each unit, FIGS. 17 and 18 illustrate a relationship between a transmission distance and a transmission efficiency, respectively in the TM02δ mode and the TM03δ mode, when the end surface of the dielectric resonator of the side opposite to the other unit is set to the inside or the outside of the cylindrical waveguide, instead of the position flush with the open end of the cylindrical waveguide. In the TM02δ mode, when the dielectric resonator is drawn 5 mm on the outside of the cylindrical waveguide at the transmission distance of 30 mm, the transmission efficiency is reduced by ten to twenty of %. The transmission efficiency is further reduced with an increase in the transmission distance. When the dielectric resonator is put into about 5 mm inside of the cylindrical waveguide from the flush, the transmission efficiency is reduced by several %. In the TM03δ mode, at the transmission distance of 30 mm, the transmission efficiency is reduced by several % in a range from 5 mm on the outside of the cylindrical waveguide to 5 mm on the inside of the cylindrical waveguide. When put about 10 mm, the transmission efficiency is further reduced by several 10%.

Figure 19:
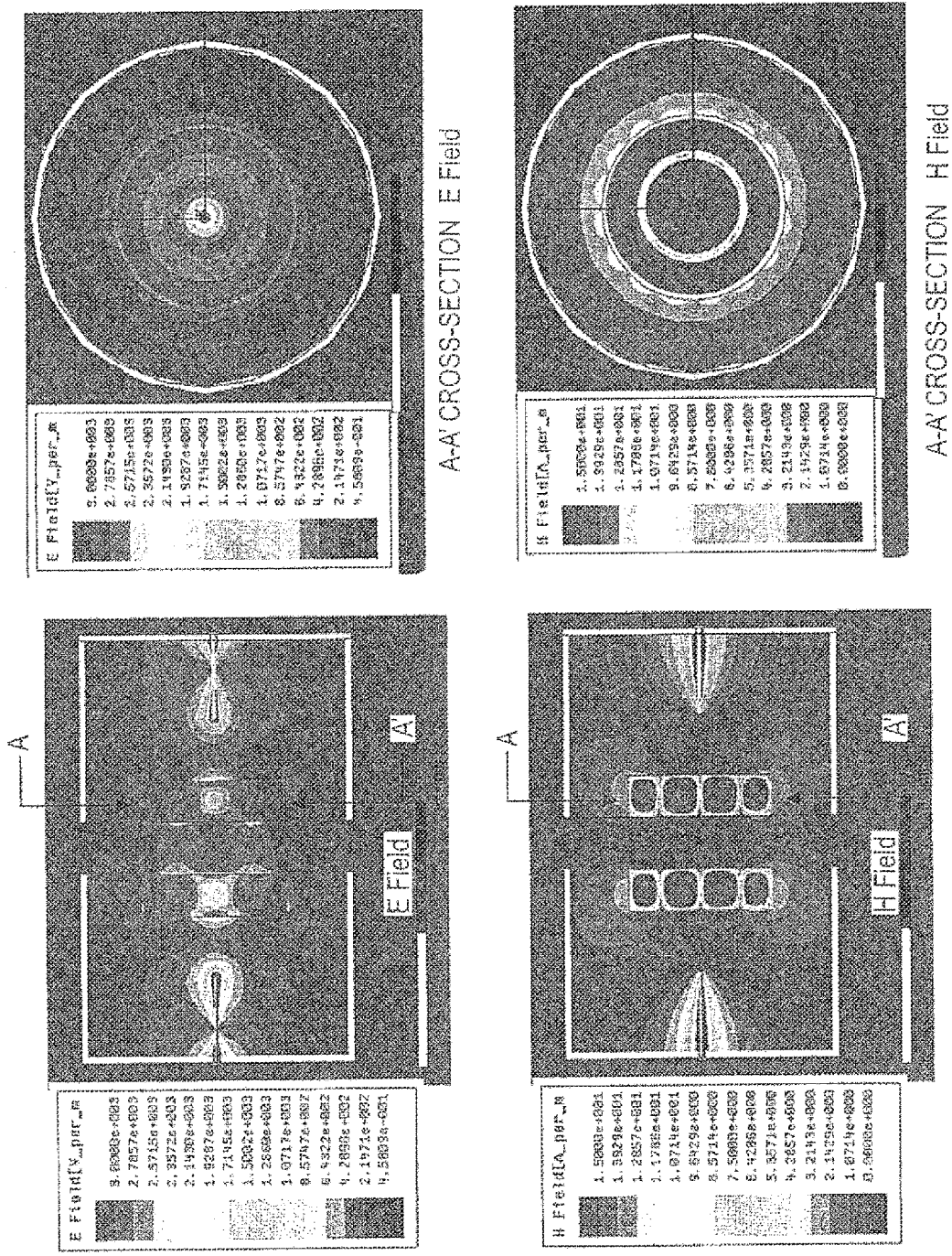
FIG. 19 A figure illustrates the result of electromagnetic field analysis by electromagnetic field simulation of a TM02δ mode in embodiment 3.

FIGS. 19 and 20 illustrate the result obtained when electromagnetic field analysis has been performed in electromagnetic field simulation, respectively in the TM02δ mode and the TM03δ mode. In the TM02δ mode, there is no electromagnetic field change in a circumferential direction, there are two electromagnetic field changes in a radial direction, and there is one electromagnetic field change in an axial direction. Thus, the mode of the dielectric resonator can be confirmed as being a TE02δ mode. Also, since an electric field between the waveguides is strong, the dielectric resonators can be confirmed as being mostly coupled by the electric field. In the TM03δ mode, there is no electromagnetic field change in a circumferential direction, there are three electromagnetic field changes in a radial direction, and there is one electromagnetic field change in an axial direction. Thus, the mode of the dielectric resonator can be confirmed as being a TE03δ mode. Also, since an electric field between the waveguides is strong, the dielectric resonators can be confirmed as being mostly coupled by the electric field.

In embodiment 3, since the cylindrical waveguide having a diameter of 100.1 mm is used as the TE02δ mode cylindrical waveguide, it is a condition of a frequency higher than a cutoff frequency in the TM01 and TE11 modes of the cylindrical waveguide mode being the same mode as the dielectric resonator. Since the cylindrical waveguide having a diameter of 144.8 mm is used as the TE03δ mode cylindrical waveguide, it is a condition of a frequency higher than a cutoff frequency in the TM01, TE11 mode and TE21 mode of the cylindrical waveguide mode being the same mode as the dielectric resonator.

Also, regarding the TM02δ mode, electromagnetic field analysis has been performed when a diameter D of the dielectric resonator is 60.6 mm, a length thereof is 14.0 mm, and a diameter d of the cylindrical waveguide is 109.1 mm (see Table 1).

Embodiment 4

The configuration of the apparatus of embodiment 4 is substantially the same as that of embodiment 1 and corresponds to that illustrated in FIG. 1.

However, in embodiment 4, a cylindrical dielectric resonator made of a dielectric ceramic material, of which a relative dielectric constant is 38, is used, and a TM012+δ mode designed around 2.45 GHz is used. In the dielectric resonator, a diameter D is 100.0 mm, a length L is 26.51 mm, and a diameter d of a cylindrical waveguide is 180 mm.

Figure 21:
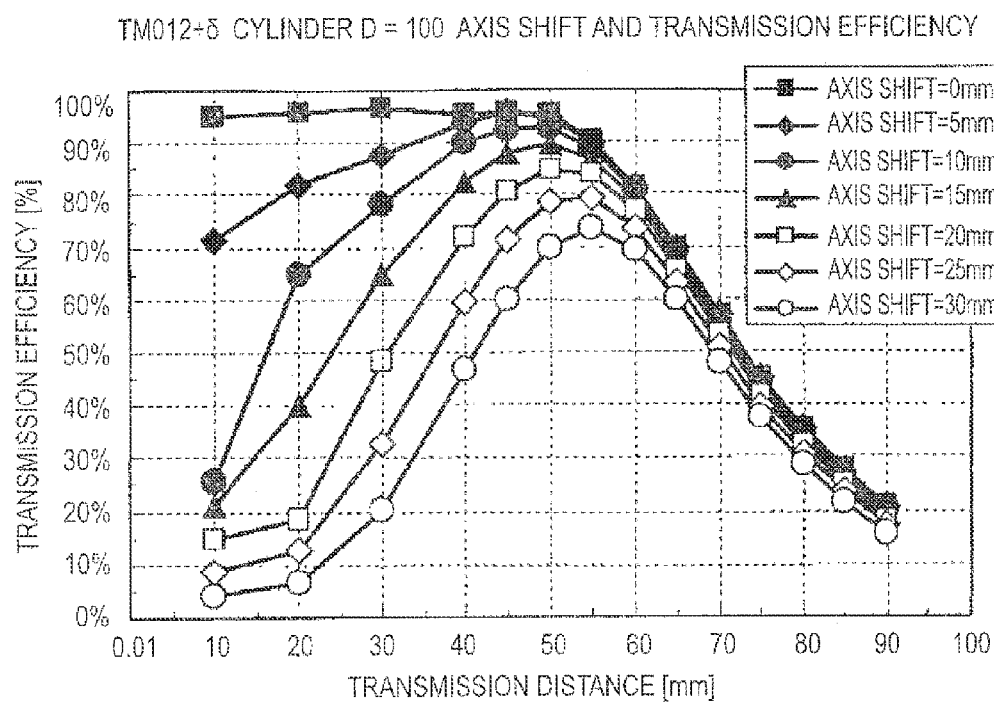
FIG. 21 A figure illustrates a relationship between a transmission distance and a transmission efficiency when axes of two units are shifted in embodiment 4.

At this time, FIG. 21 illustrates a transmission characteristic (relationship between a transmission distance and a transmission efficiency), which is measured by setting a distance between two cylindrical waveguides opposite to each other as a transmission distance and setting a ratio of output power to input power as a transmission efficiency, and a relationship between a transmission distance and a transmission efficiency when two units are changed from a coaxial shape (that is, axes are shifted). When the axes are not shifted, the transmission distance at which the transmission efficiency is 50% is 72.5 mm. The transmission distance is 0.59 times as long as the wavelength λ. It can be seen that the transmission distance is over 0.16 times as long as the wavelength λ that is the limit of the near field and reaches up to the far field. When there is an axis shift, the maximum transmission efficiency is shown at the transmission distance of around 50 mm. As the axis shift is increased, the transmission efficiency is reduced. However, even when the axis shift is 30 mm, the transmission efficiency of 50% can be maintained over the distance of around from 40 mm to 70 mm.

Figure 22:
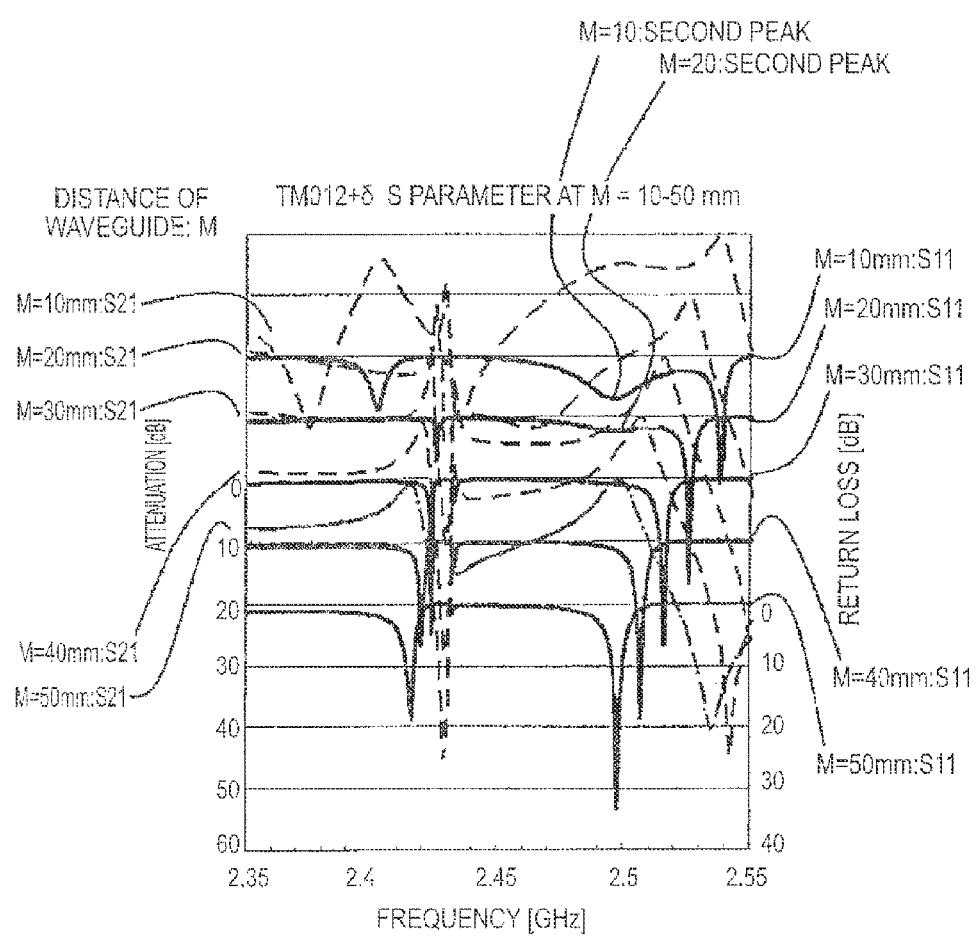
FIG. 22 A figure illustrates an S parameter when a waveguide distance is between 10 mm to 50 mm in embodiment 4.

FIG. 22 illustrates an S parameter when the waveguide distance is between 10 mm to 50 mm. At a first peak of S11, a frequency is lowered as the waveguide distance is increased. On the other hand, a second peak is slightly increased as the waveguide distance is increased. The second peak does not appear over the waveguide distance of 20 mm to 30 mm and is not observed at the waveguide distance of 40 mm or 50 mm. That is, the coupling coefficient is not observed in the vicinity exceeding 19 mm, which is 0.16 times as long as the wavelength λ that is the limit of the near field. Even when the coupling coefficient does not exist, power is transmitted.

Figure 23:
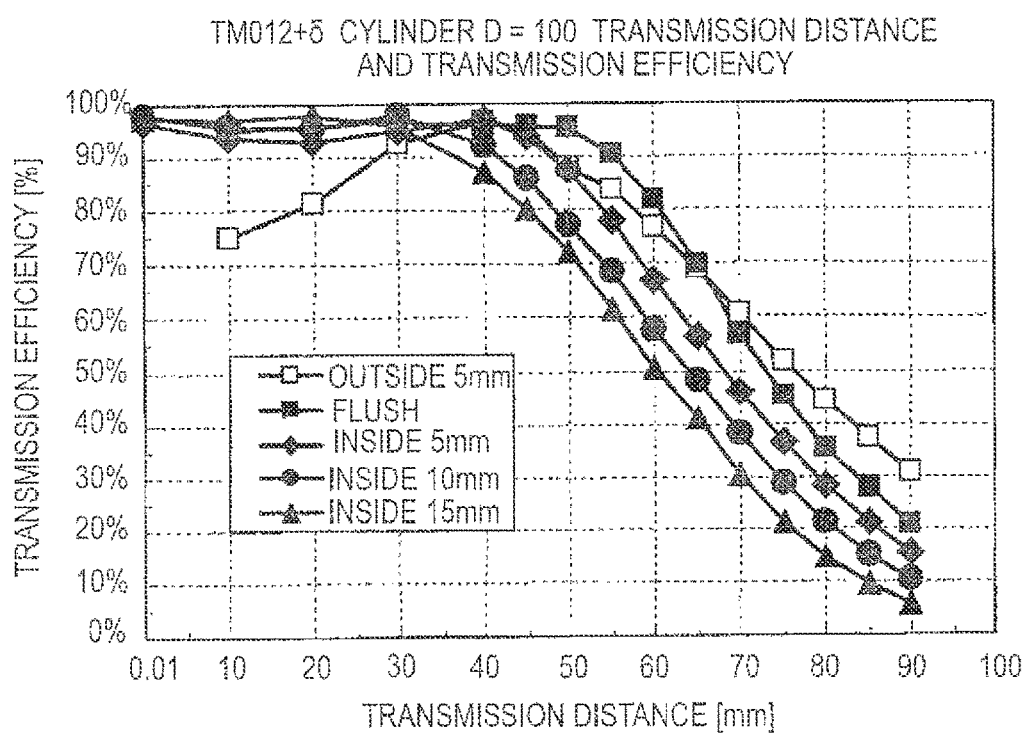
FIG. 23 A figure illustrates a relationship between a transmission distance and a transmission efficiency when an axial position of a dielectric resonator is set to the inside or the outside of a cylindrical waveguide from the flush with respect to the cylindrical waveguide in embodiment 4.

Next, regarding the axial position of the dielectric resonator with respect to the cylindrical waveguide in each unit, FIG. 23 illustrates a relationship between a transmission distance and a transmission efficiency when the end surface of the dielectric resonator of the side opposite to the other unit is set to the inside or the outside of the cylindrical waveguide, instead of the position flush with the open end of the cylindrical waveguide. Up to the transmission distance of 30 mm, the transmission efficiency maintains 90% or more, except for the case where the dielectric resonator is set to 5 mm on the outside of the cylindrical waveguide. At the transmission distance of 40 mm or more, the transmission efficiency is rapidly reduced in sequence from the side where the resonator is disposed on the inside from the open end of the waveguide. That is, in a case where the transmission distance (distance between the waveguides) is 60 mm, when the dielectric resonator is put into 0 mm, 5 mm, 10 mm, and 15 mm inside (the distance between the dielectric resonators is set to 60 mm, 65 mm, 70 mm, and 75 mm), the coupling between the dielectric resonators becomes small and the transmission efficiency is rapidly reduced. However, even when the resonator is disposed at 15 mm inward from the open end of the waveguide, the transmission efficiency is 50% or more up to the transmission distance of 60 mm.

FIG. 24 illustrates the result obtained when electromagnetic field analysis has been performed in electromagnetic field simulation. The mode of the dielectric resonator can be confirmed as being a TE012+δ mode because there is no electromagnetic field change in a circumferential direction, there is one electromagnetic change in a radial direction, and there are two electromagnetic field changes in an axial direction. Also, since an electric field between the waveguides is strong, the dielectric resonators can be confirmed as being mostly coupled by the electric field.

In embodiment 4, since the waveguide having a diameter d of 180 mm is used as the cylindrical waveguide, it is a condition of a cutoff frequency or more in the TM01 mode, the TM11 mode, the TE11 mode, TE21 mode, and TE01 mode being the same cylindrical waveguide mode as the dielectric resonator, and in PTL 2, the cutoff waveguide (constituting a filter at a cutoff frequency or less) is used. However, in the present embodiment of the present invention, a power transmission apparatus is realized which maintains a high transmission efficiency at a cutoff frequency or more in any mode.

Embodiment 5

The configuration of the apparatus of embodiment 5 is substantially the same as that of embodiment 1 and corresponds to that illustrated in FIG. 1.

Figure 25:
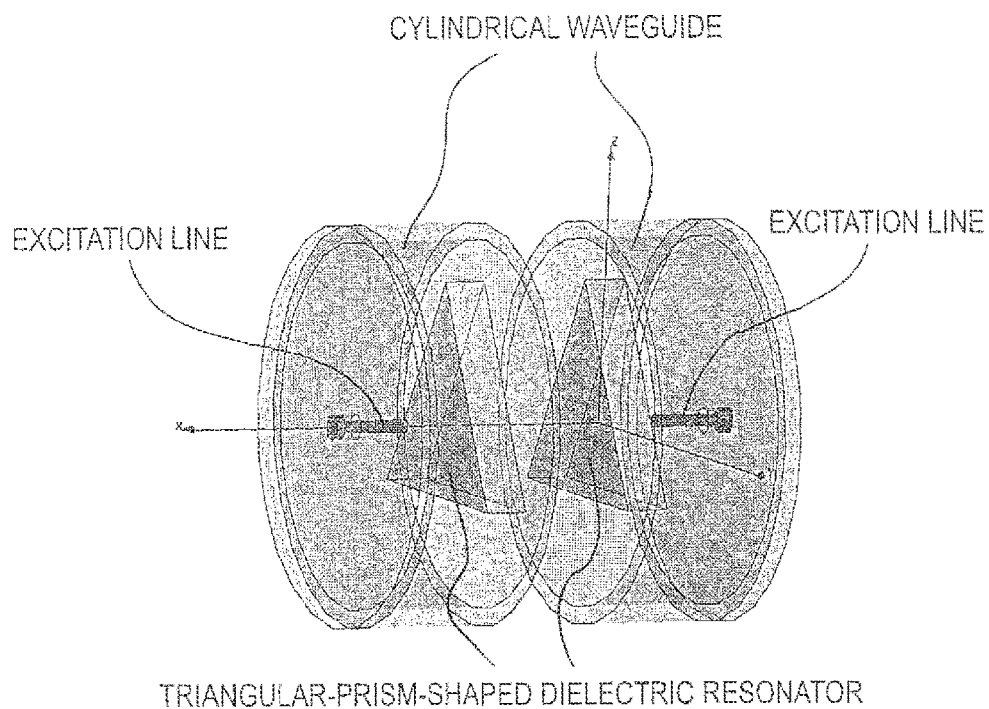
FIG. 25 A figure illustrates a schematic projection perspective view of a dielectric resonator having a regular triangular prism shape in embodiment 5 of a power transmission apparatus according to the present invention.
Figure 26:
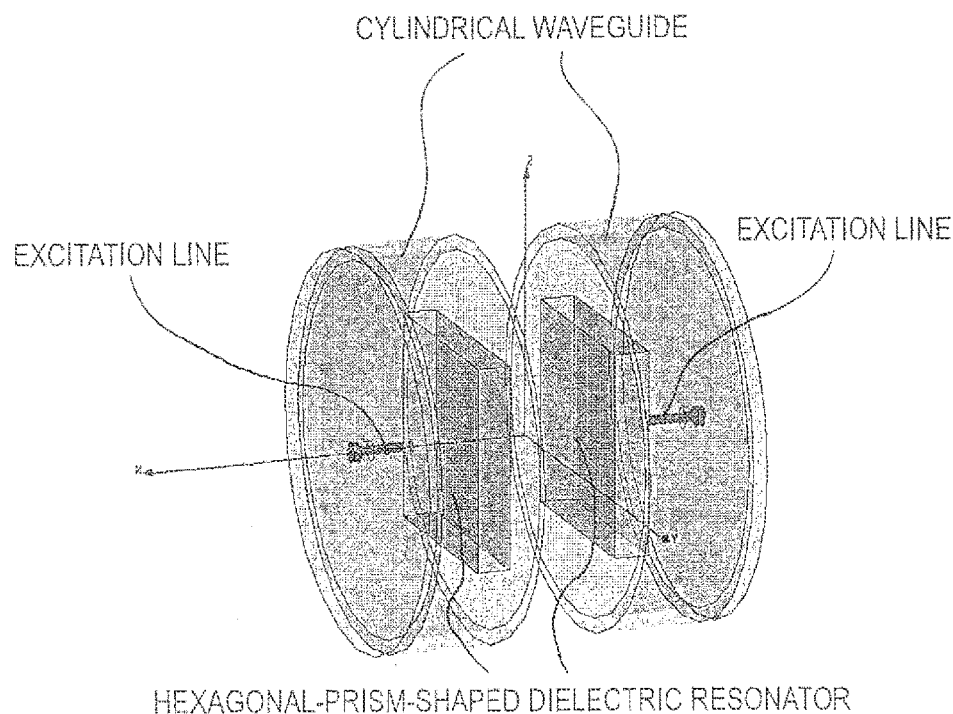
FIG. 26 A figure illustrates a schematic projection perspective view of a dielectric resonator having a square prism shape in embodiment 5 of a power transmission apparatus according to the present invention.
Figure 27:
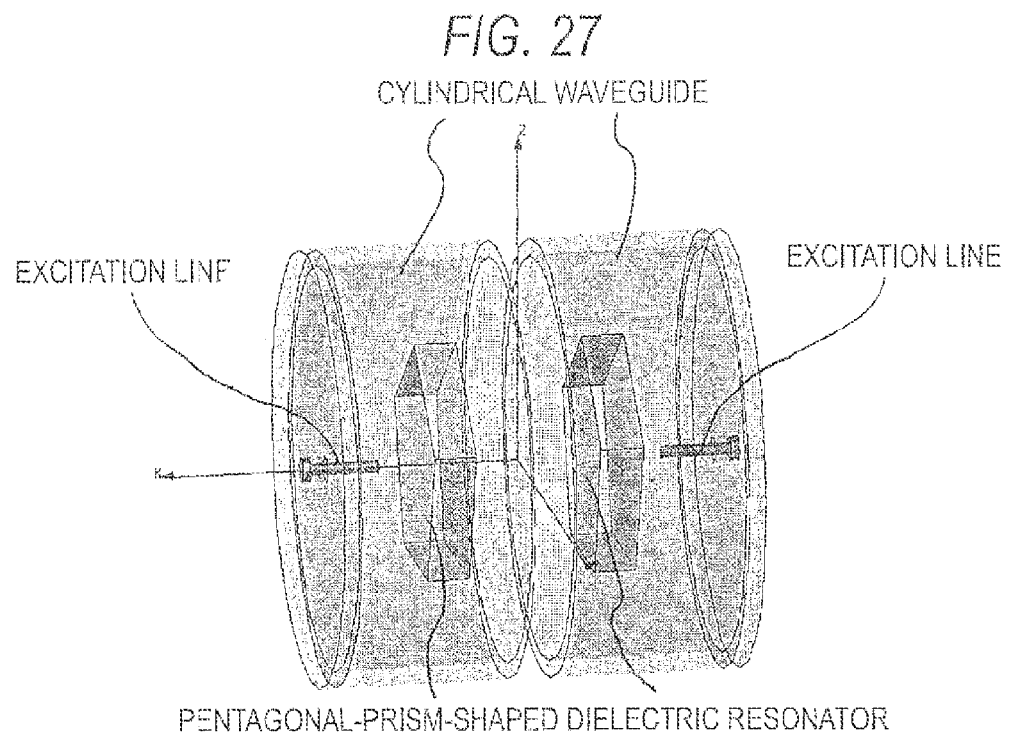
FIG. 27 A figure illustrates a schematic projection perspective view of a dielectric resonator having a regular pentagonal prism shape in embodiment 5 of a power transmission apparatus according to the present invention.
Figure 28:
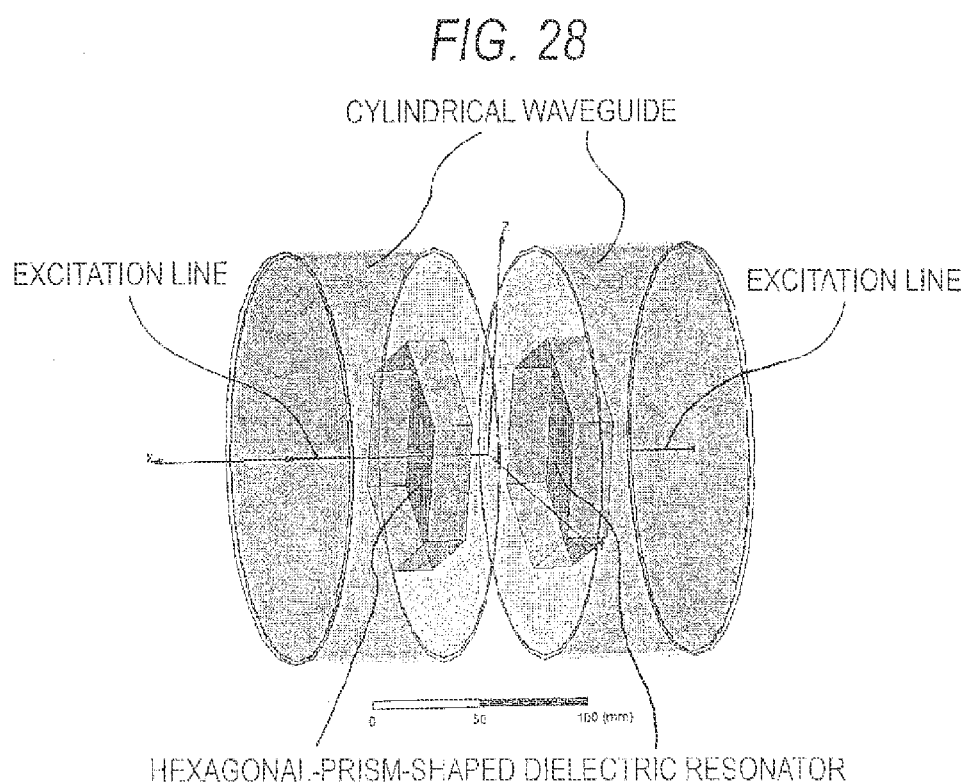
FIG. 28 A figure illustrates a schematic projection perspective view of a dielectric resonator having a regular hexagonal prism shape in embodiment 5 of a power transmission apparatus according to the present invention.

However, in embodiment 5, a polygonal-prism-shaped dielectric resonator made of a dielectric ceramic material, of which a relative dielectric constant is 38, is used, and a TM012+δ mode designed around 2.45 GHz is used. FIG. 25 illustrates a schematic projection perspective view of a case where a dielectric resonator has a regular triangular prism shape. FIG. 26 illustrates a schematic projection perspective view of a case where a dielectric resonator has a square prism shape. FIG. 27 illustrates a schematic projection perspective view of a case where a dielectric resonator has a regular pentagonal prism shape. FIG. 28 illustrates a schematic projection perspective view of a case where a dielectric resonator has a regular hexagonal prism shape. Dimensions of the dielectric resonators of the respective shapes are shown in Table 1, which is to be described below.

Figure 29:
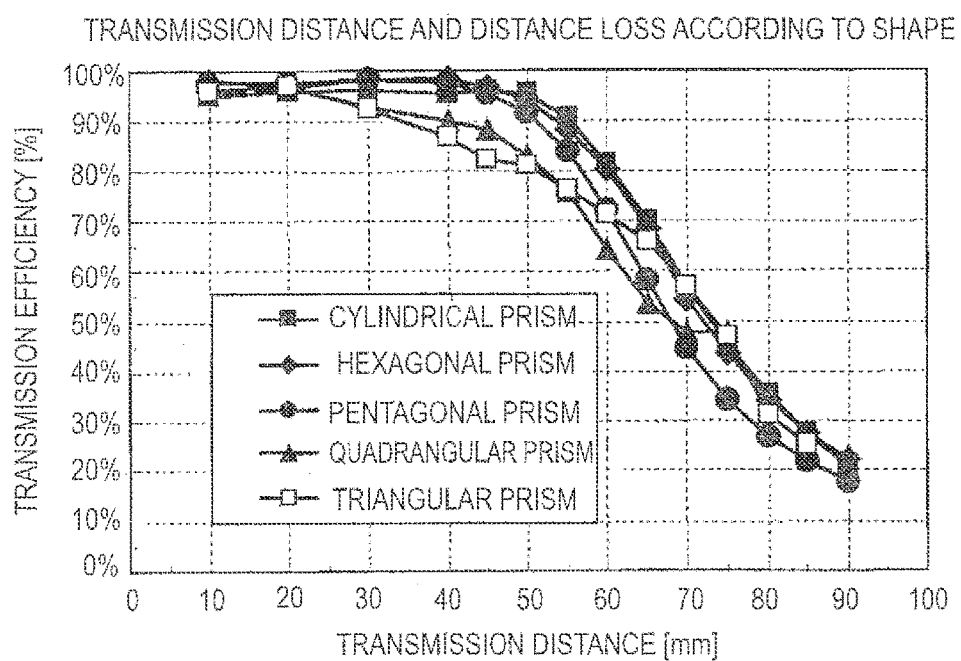
FIG. 29 A figure illustrates a relationship between a transmission distance and a transmission efficiency according to a shape of a dielectric resonator in embodiment 5.

FIG. 29 illustrates a relationship between a transmission distance and a transmission efficiency according to a shape of a dielectric resonator in the present embodiment. Herein, a cylindrical resonator shown for reference is shaped such that a diameter D of the resonator illustrated in embodiment 4 is 100 mm, a length L of the resonator is about 19 mm, and a diameter d of the cylindrical waveguide is 180 mm.

In a case where the dielectric resonators have a rectangular prism shape or a pentagonal prism shape, the transmission distance at which the transmission efficiency is 50% is 68 mm, and the transmission distance is 0.56 times as long as the wavelength λ. It can be seen that the transmission distance is over 0.16 times as long as the wavelength λ that is the limit of the near field and reaches up to the far field. In a case where the dielectric resonators have a triangular prism shape or a hexagonal prism shape, the transmission distance at which the transmission efficiency is 50% is 72 mm, and the transmission distance is 0.59 times as long as the wavelength λ. It can be seen that the transmission distance is over 0.16 times as long as the wavelength λ that is the limit of the near field and reaches up to the far field.

In a case where the shape of the dielectric resonator is a triangular prism shape, a rectangular prism shape, pentagonal prism shape, or a hexagonal prism shape, when an inscribed circle is designed to have a diameter of 100 mm, a resonance mode can be set to a TM012+δ mode. Similar to the cylindrical dielectric resonator, a loss to a transmission distance of 50 mm can be maintained at 90% or more. In the triangular prism or the rectangular prism, many modes occur or there are many regions that do not directly contribute to resonance. Since this region is close to an inner cylinder of the cylindrical waveguide, transmission loss is gradually decreased by a factor that degrades a Q value or the like. FIG. 30 illustrates the result obtained when electromagnetic field analysis has been performed in electromagnetic field simulation so as to confirm whether the dielectric resonator of the hexagonal prism shape resonates in the TM012+δ in a similar manner to embodiment 4. The mode of the dielectric resonator can be confirmed as being a TE012+δ mode because there is no magnetic field change in a circumferential direction, there is one magnetic field change in a radial direction, and there are two electromagnetic field changes in an axial direction. Also, since an electric field between the waveguides is strong, the dielectric resonators can be confirmed as being mostly coupled by the electric field.

Similar to embodiment 4, in an S parameter characteristic, when the transmission distance is around 20 to 30 mm, the coupling between the resonators is not observed.

In embodiment 5, since a waveguide having a diameter of 187 to 216 mm is used as the waveguide, it is a condition of a cutoff frequency or more in the TM01 mode, the TM11 mode, the TE11 mode, TE21 mode, and TE01 mode being the same cylindrical waveguide mode as the dielectric resonator, and in PTL 2, the cutoff waveguide (constituting a filter at a cutoff frequency or less) is used. However, in the present embodiment of the present invention, a power transmission apparatus is realized which maintains a high transmission efficiency at a cutoff frequency or more in any mode.

Embodiment 6

The configuration of the apparatus of embodiment 6 is substantially the same as that of embodiment 1 and corresponds to that illustrated in FIG. 1.

However, in embodiment 6, a cylindrical dielectric resonator made of a dielectric ceramic material, of which a relative dielectric constant is 20, is used, and a TM012+δ mode designed around 2.45 GHz is used. The dielectric resonator configured such that a diameter D is 100 mm, a length L is 26.51 mm, and a diameter d of a cylindrical waveguide is 180 mm, and a dielectric resonator configured such that a diameter D is 140 mm, a length L is 29.5 mm, and a diameter d of a cylindrical waveguide is 216 mm are used.

Figure 31:
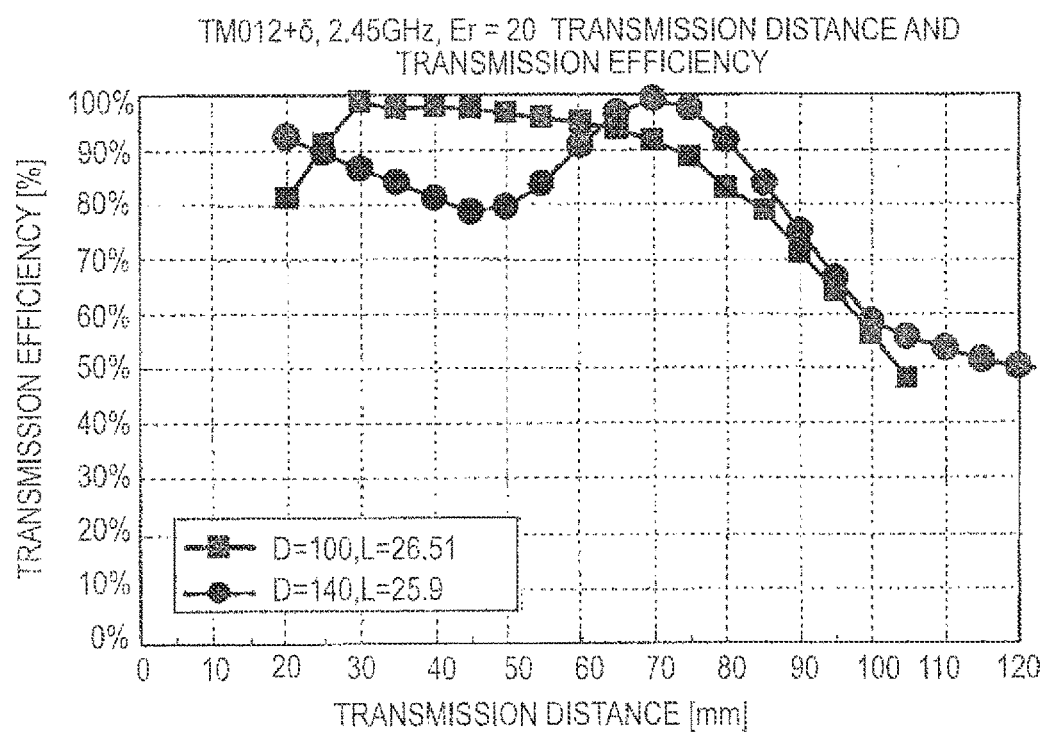
FIG. 31 A figure illustrates a relationship between a transmission distance and a transmission efficiency in embodiment 6.

FIG. 31 illustrates a relationship between a transmission distance and a transmission efficiency according to the present embodiment. In a case where the diameter of the dielectric resonator is 100 mm, the transmission efficiency is 50% when the transmission distance is 103 mm, and the transmission distance is 0.84 times as long as the wavelength λ. It can be seen that the transmission distance is over 0.16 times as long as the wavelength λ that is the limit of the near field and reaches up to the far field. In a case where the diameter of the dielectric resonator is 140 mm, the transmission efficiency is 50% when the transmission distance is 120 mm, and the transmission distance is 0.98 times as long as the wavelength λ. It can be seen that the transmission distance is over 0.16 times as long as the wavelength λ that is the limit of the near field and reaches up to the far field.

In embodiment 6, since a waveguide having a diameter of 216 mm is used as the waveguide, it is a condition of a cutoff frequency or more in the TM01 mode, the TM11 mode, the TE11 mode, TE21 mode, and TE01 mode being the same cylindrical waveguide mode as the dielectric resonator, and in PTL 2, the cutoff waveguide (constituting a filter at a cutoff frequency or less) is used. However, in the present embodiment of the present invention, a power transmission apparatus is realized which maintains a high transmission efficiency at a cutoff frequency or more in any mode.

FIGS. 32 to 34 illustrate the results obtained when electromagnetic field analysis has been performed in electromagnetic field simulation. FIG. 32 illustrates a resonance mode when a transmission distance is 50 mm in a dielectric resonator having a diameter D of 100 mm, FIG. 33 illustrates a resonance mode when a transmission distance is 20 mm in a dielectric resonator having a diameter D of 140 mm, and FIG. 34 illustrates a resonance mode when a transmission distance is 70 mm in a dielectric resonator having a diameter D of 140 mm. In the case of the dielectric resonator having the diameter D of 100 mm, the mode of the dielectric resonator can be confirmed as being a TE012+δ mode because there is no magnetic field change in a circumferential direction, there is one magnetic field change in a radial direction, and there are two electromagnetic field changes in an axial direction. In the case where the transmission distance is 20 mm in the dielectric resonator having the diameter D of 140 mm, the mode of the dielectric resonator can be confirmed as being a TE012+δ mode because there is no magnetic field change in a circumferential direction, there is one magnetic field change in a radial direction, and there are two electromagnetic field changes in an axial direction. In the case where the transmission distance is 70 mm in the dielectric resonator having the diameter D of 140 mm, the mode of the dielectric resonator can be confirmed as being a TE012+δ mode because, when a phase is 0 degrees, there is no magnetic field change in a circumferential direction, there is one magnetic field change in a radial direction, and there are two electromagnetic field changes in an axial direction. However, when the phase is around 90 degrees, there is no magnetic field change in a circumferential direction, there are four magnetic field changes in a radial direction, and there is one electromagnetic field change in an axial direction. Therefore, it can be seen that a resonance mode of a TE04δ mode also occurs and the mode of the dielectric resonator is a hybrid mode of the TE012+δ mode and the TE04δ mode.

Embodiment 7

The configuration of the apparatus of embodiment 7 is substantially the same as that of embodiment 1 and corresponds to that illustrated in FIG. 1.

Figure 35:
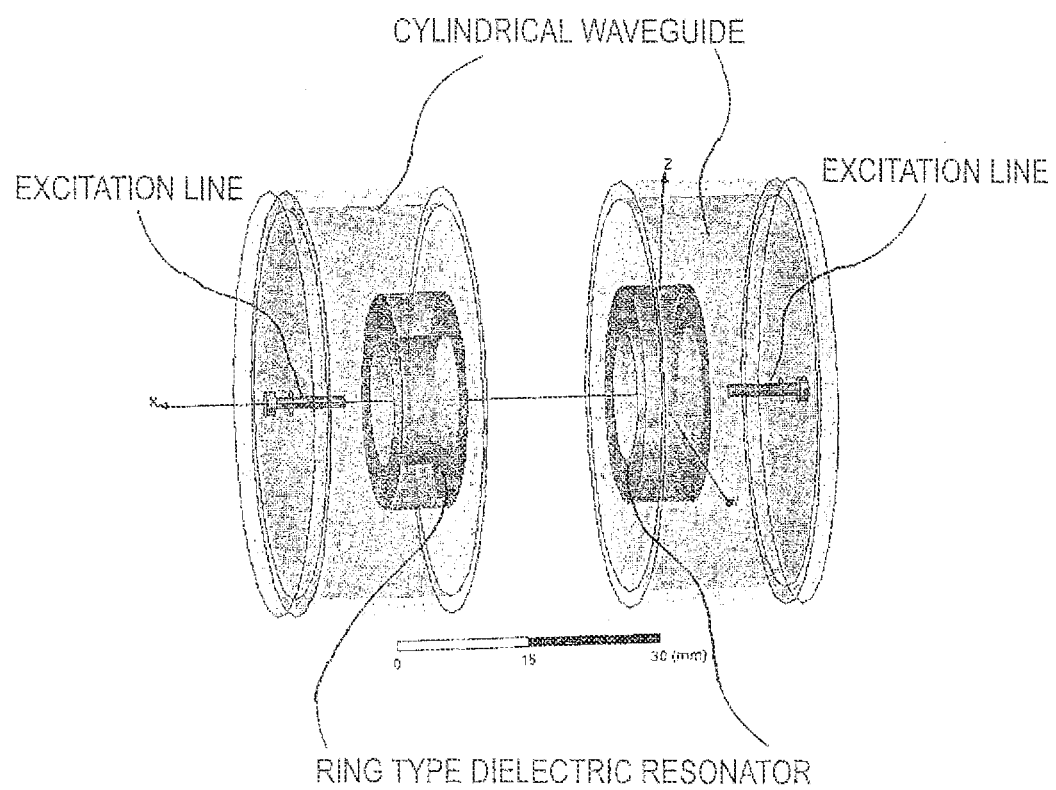
FIG. 35 A figure illustrates a schematic projection perspective view of embodiment 7 of a power transmission according to the present invention.

However, in embodiment 7, a cylindrical dielectric resonator made of a dielectric ceramic material, of which a relative dielectric constant is 24, is used, and a ring type TM012+δ mode designed around 12 GHz is used. The cylindrical dielectric resonator used herein was configured to have a diameter D of 25 mm, an inner hole diameter of 15 mm, and a length L of 7.6 mm. The cylindrical waveguide used herein was configured to have a diameter d of 45 mm. Also, the length of the excitation line was 6.25 mm (about ¼ of the wavelength of 12 GHz), and the distance (gap) between the front end of the center conductor of the coaxial cable and the dielectric resonator was kept and fixed to 4.5 mm. FIG. 35 illustrates a schematic projection perspective view of the apparatus of the present embodiment.

Figure 36:
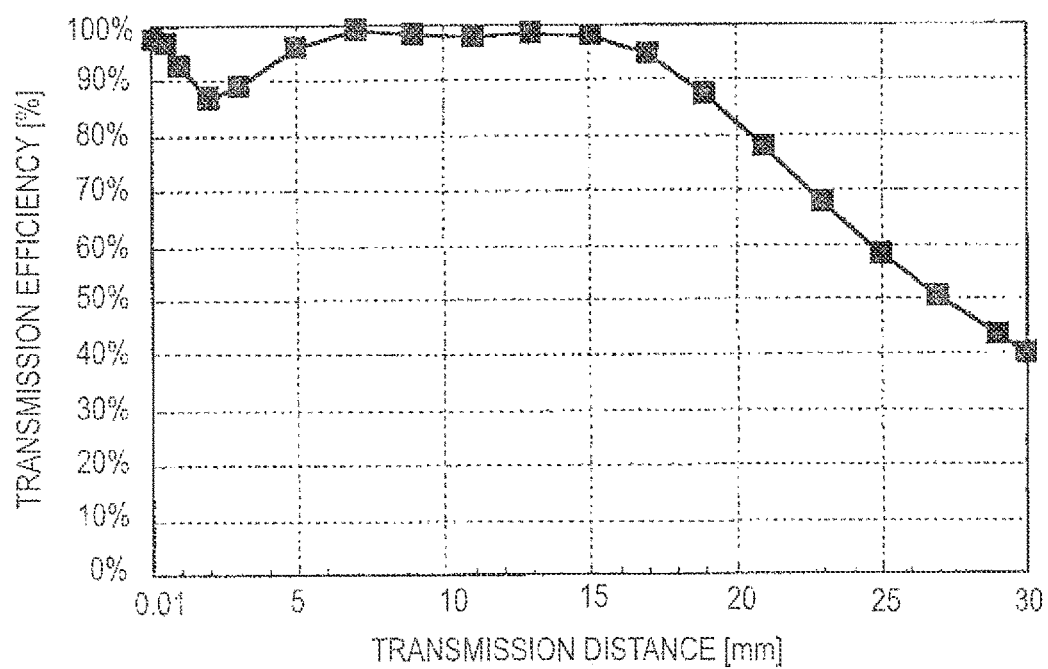
FIG. 36 A figure illustrates a relationship between a transmission distance and a transmission efficiency in embodiment 7.
Figure 37:
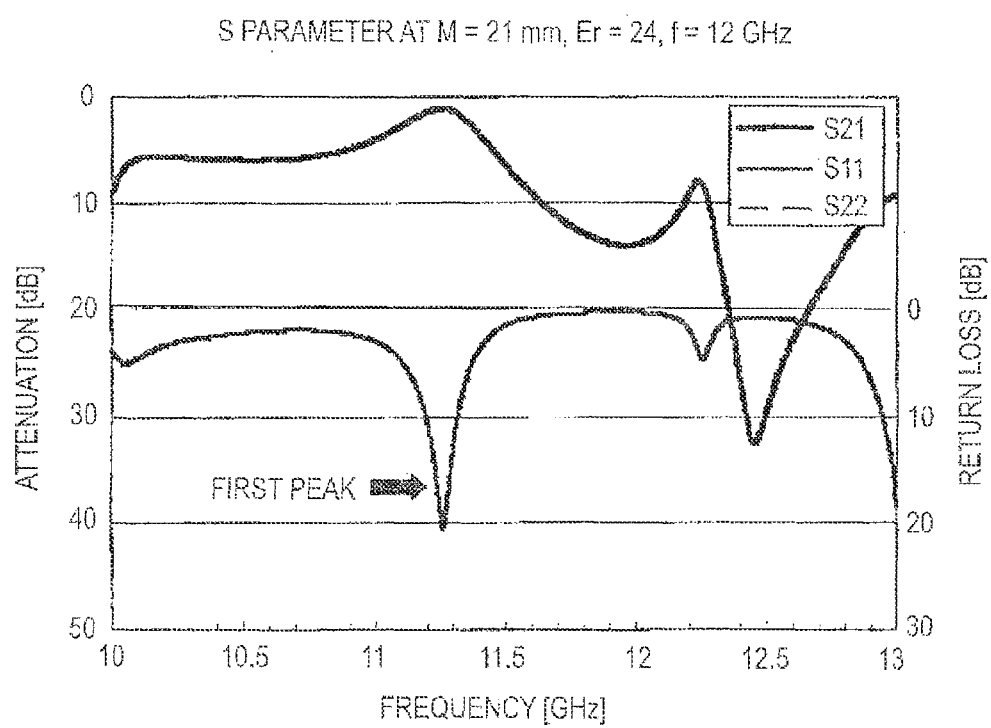
FIG. 37 A figure illustrates an S parameter in embodiment 7.

FIG. 36 illustrates a relationship between a transmission distance and a transmission efficiency according to the present embodiment. The transmission efficiency is 50% when the transmission distance is 27 mm, and the transmission distance is 1.08 times as long as the wavelength λ. It can be seen that the transmission distance is over 0.16 times as long as the wavelength λ that is the limit of the near field and sufficiently reaches up to the far field. The transmission efficiency is 80% when the transmission distance is 21 mm, and the transmission distance is 0.84 times as long as the wavelength λ. It can be seen that the transmission distance is over 0.16 times as long as the wavelength λ that is the limit of the near field and reaches up to the far field FIG. 37 illustrates an S parameter when the transmission distance is 21 mm. At a first peak, a frequency is 11.256 GHz, a value of S11 is 20 dB, and a value of S21 is 1.09 dB. 1.09 dB is 77.7% in the transmission efficiency. No second peak is observed. It is considered that this is because the transmission distance is far beyond 4 mm, which is 0.16 times as long as the wavelength λ that is the limit of the near field.

In embodiment 7, since a waveguide having a diameter d of 45 mm is used as the cylindrical waveguide, it is a condition of a cutoff frequency or more in the TM01 mode, the TM11 mode, the TE11 mode, TE21 mode, and TE01 mode being the same cylindrical waveguide mode as the dielectric resonator, and in PTL 2, the cutoff waveguide (constituting a filter at a cutoff frequency or less) is used. However, in the present embodiment of the present invention, a power transmission apparatus is realized which maintains a high transmission efficiency at a cutoff frequency or more in any mode.

FIG. 38 illustrates the result obtained when electromagnetic field analysis has been performed in electromagnetic field simulation. FIG. 38 illustrates an electromagnetic field distribution when the transmission distance is 21 mm. The mode of the dielectric resonator can be confirmed as being a TM02δ mode because there is no magnetic field change in a circumferential direction, there are two magnetic field changes in a radial direction, and there is one electromagnetic field change in an axial direction.

Embodiment 8

The configuration of the apparatus of embodiment 8 is substantially the same as that of embodiment 1, except for the excitation structure which is to be described below.

Figure 39:
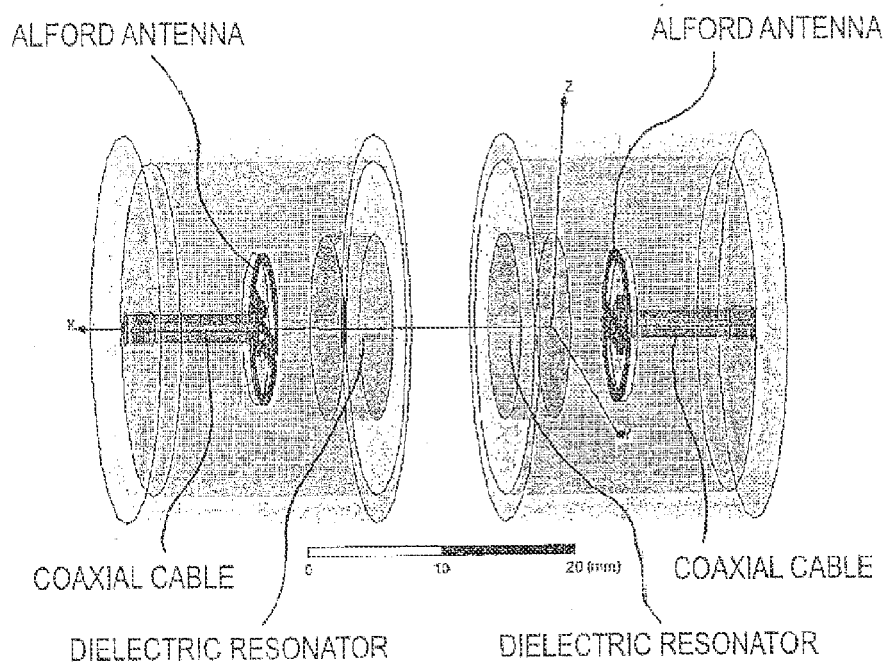
FIG. 39 A figure illustrates a schematic projection perspective view of embodiment 8 of a power transmission according to the present invention.

However, in embodiment 8, a cylindrical dielectric resonator made of a dielectric ceramic material, of which a relative dielectric constant is 24, is used, and a TE012+δ mode designed around 12 GHz is used. The cylindrical dielectric resonator used herein is configured to have a diameter D of 14 mm and a length L of 3.75 mm. The cylindrical waveguide used herein is configured to have a diameter d of 25.2 mm, and d/D=1.8. FIG. 39 illustrates a schematic projection perspective view of the apparatus of the present embodiment.

Figure 40:
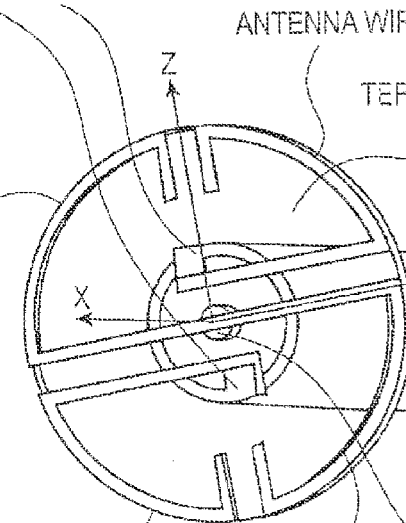
FIG. 40 A figure illustrates a schematic perspective view of an excitation structure in embodiment 8.

FIG. 40 illustrates a schematic perspective view of the excitation structure in the present embodiment. The excitation structure is provided for exciting the cylindrical dielectric resonator in the TE mode and is called an Alford antenna. The excitation structure is described in Literature: "Ultrahigh-frequency loop antenna", Alford, A. and Kandoian, AIEE Trance., 59, pp. 843-848 (1940). Currents in an axial direction are cancelled with each other, and the TE mode is efficiently excited within a cylindrical waveguide with a narrow space in order for excitation at a current in a circumferential direction.

One end of the cylindrical waveguide is short-circuited. In the vicinity of the open end of the waveguide, the cylindrical dielectric resonator is fixed to be coaxial with each other with respect to the cylindrical waveguide through a low-dielectric-loss insulator having a low relative dielectric constant and a low dielectric loss tangent, such as Styrofoam or Teflon (registered trademark). A coaxial cable is inserted into the short-circuited end of the cylindrical waveguide so as to be coaxial with the cylindrical waveguide and the cylindrical dielectric resonator. An external conductor of the coaxial cable is connected to the short-circuited end of the waveguide. An Alford antenna is attached to the front end of the coaxial cable, and a distance (gap) between the Alford antenna and the dielectric resonator is maintained and fixed to 3.0 mm. This is set as a unit (resonance device). Two units are manufactured. The open ends of the cylindrical waveguides are opposite to each other to have a coaxial shape, and an arbitrary distance is maintained. Power of about 12 GHz is supplied to the coaxial cable of one unit (first resonance device), and power is taken out from the coaxial cable of the other unit (second resonance device).

Figure 41:
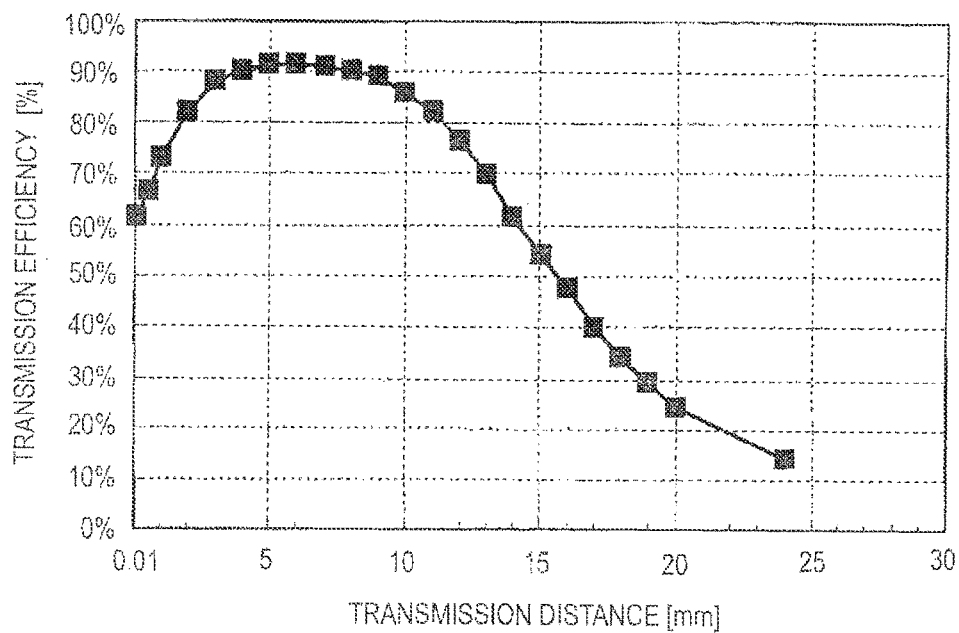
FIG. 41 A figure illustrates a relationship between a transmission distance and a transmission efficiency in embodiment 8.

FIG. 41 illustrates a relationship between a transmission distance and a transmission efficiency according to the present embodiment. The transmission efficiency becomes maximum, about 90%, in a transmission distance range of 3 mm to 9 mm, and the transmission efficiency is reduced even when the transmission distance is increased or decreased. A transmission distance at which the transmission efficiency is 50% is around about 15.5 mm. The transmission distance is 0.62 times as long as the wavelength $\lambda$. It can be seen that the transmission distance is over 0.16 times as long as the wavelength $\lambda$ that is the limit of the near field and reaches up to the far field.

Figure 42:
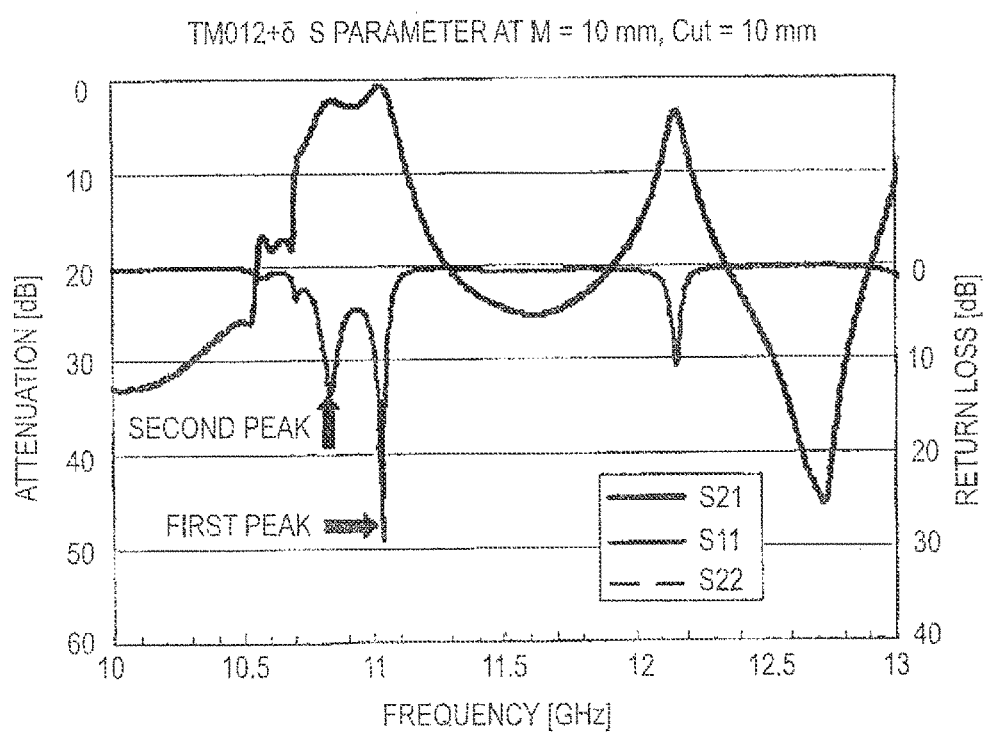
FIG. 42 A figure illustrates an S parameter in embodiment 8.

FIG. 42 illustrates an S parameter when the transmission distance is 105 mm. At a first peak, a frequency is 11.045 GHz, an attenuation of S21 is 0.86 dB, and a return loss of S11 is 29 dB. At a second peak, a frequency is 10.845 GHz, S21 is 2 dB, and S11 is 13 dB. The dielectric resonators opposite to each other are magnetic-field-coupled, and when the first peak and the second peak show a coupling, a coupling coefficient K is 0.0183. An unloaded Q value of the dielectric resonator is about 5,000, K×Q=91.4, and $(K \times Q)^2=8,300$.

Figure 43:
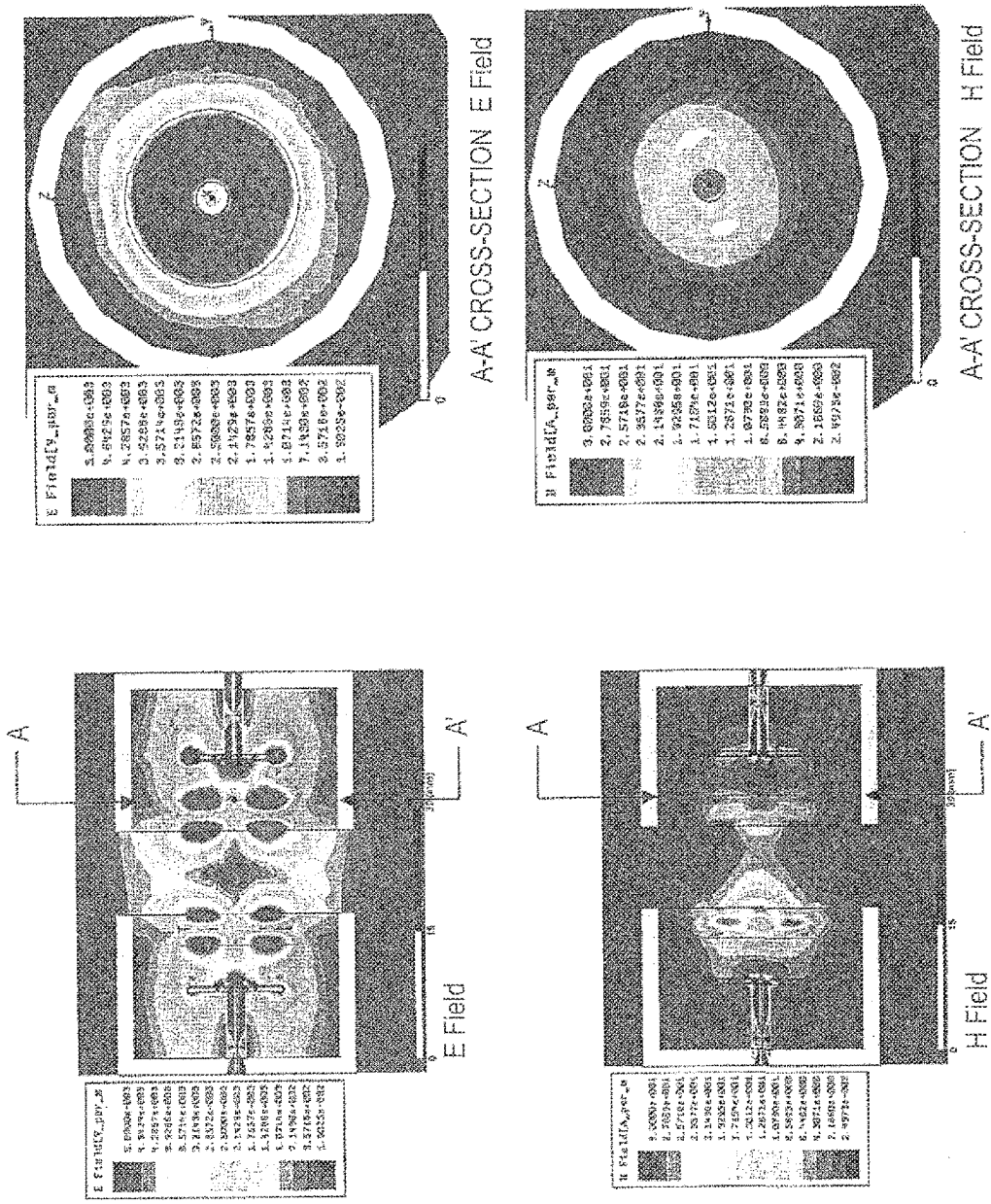
FIG. 43 A figure illustrates the result of electromagnetic field analysis by electromagnetic field simulation in embodiment 8.

FIG. 43 illustrates the result obtained when electromagnetic field analysis has been performed in electromagnetic field simulation. The mode of the dielectric resonator can be confirmed as being a TE012+δ mode because there is no electromagnetic field change in a circumferential direction, there is one electromagnetic change in a radial direction, and there is one electromagnetic field change in an axial direction. Also, since a magnetic field between the waveguides is strong, the dielectric resonators can be confirmed as being mostly coupled by the magnetic field.

In PTL 2, the dielectric resonator is inserted into the cutoff waveguide. However, in embodiment 8 of the present invention, the diameter of the cylindrical waveguide is 25.2 mm, and the cutoff frequency is 14.52 GHz when the diameter of the TE01 mode of the cylindrical waveguide being the same mode as the dielectric resonator is 25.2 mm. The cutoff frequency of the TE21 mode is 11.58 GHz, the cutoff frequency of the TE11 mode is 6.98 GHz, the cutoff frequency of the TM01 mode is 9.11 GHz, and the cutoff frequency of the TM11 mode is 14.52 GHz. Therefore, the frequency is the cutoff frequency or more in the TE01 mode of the waveguide in which the dielectric resonator of at least the TE012+δ mode becomes a leaky mode. In PTL 2, the cutoff waveguide (constituting a filter at a cutoff frequency or less) is used. However, in the present embodiment of the present invention, a power transmission apparatus is realized which maintains a high transmission efficiency at a cutoff frequency or more.

Other Embodiment 1

Figure 44:
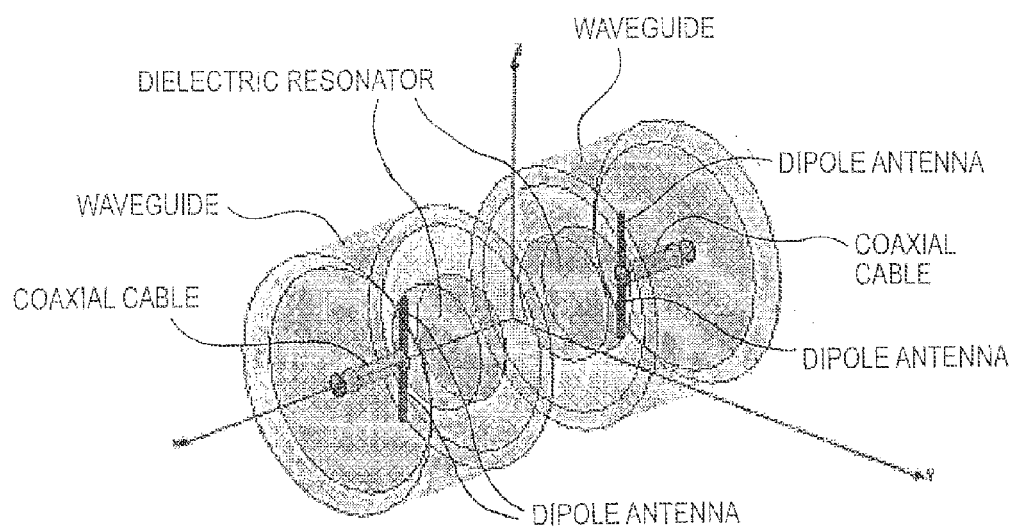
FIG. 44 A figure illustrates a schematic projection perspective view of another embodiment of a power transmission according to the present invention.

As illustrated in FIG. 44, as the excitation structure of the dielectric resonator, an excitation structure including a coaxial cable and a dipole antenna of ½ wavelength connected thereto may be used.

Figure 45:
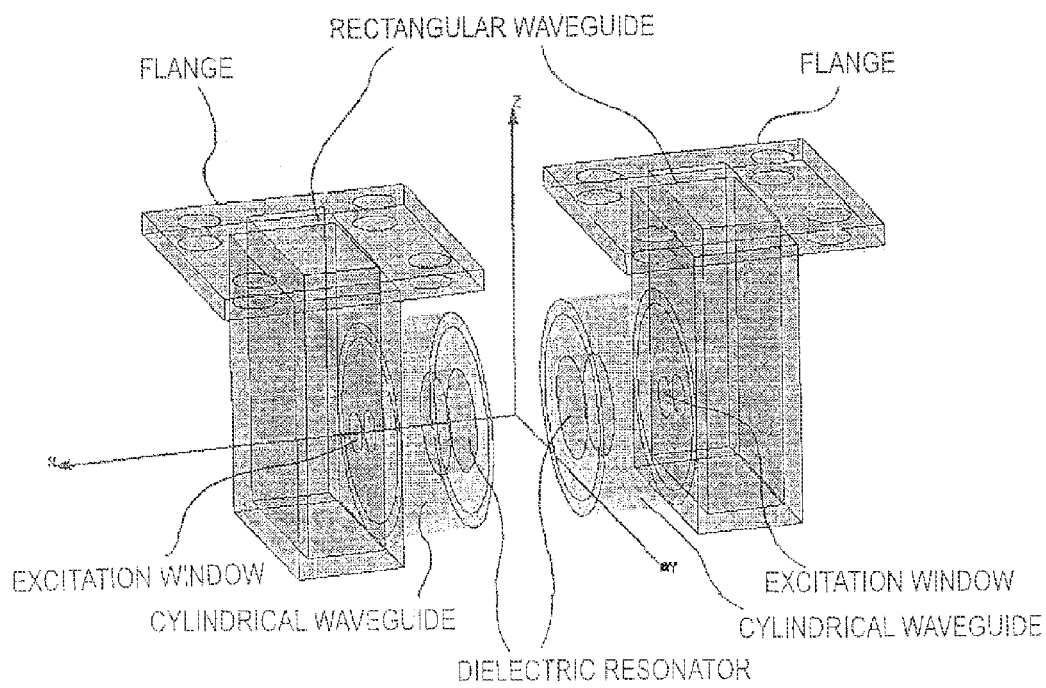
FIG. 45 A figure illustrates a schematic projection perspective view of another embodiment of a power transmission according to the present invention.

Also, as the excitation structure of the dielectric resonator, as illustrated in FIG. 45, an excitation structure that supplies power from a rectangular waveguide may be used. In this case, the resonator can be excited in the TM mode.

Figure 46:
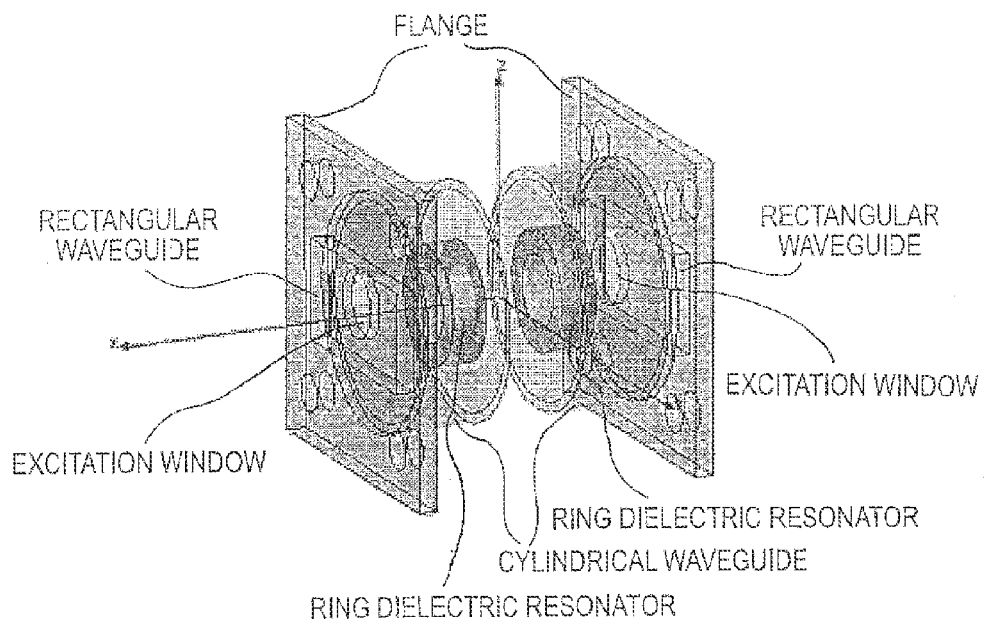
FIG. 46 A figure illustrates a schematic projection perspective view of another embodiment of a power transmission according to the present invention.

Also, as the excitation structure of the dielectric resonator, as illustrated in FIG. 46, an excitation structure that supplies power from a rectangular waveguide may be used. In this case, the resonator can be excited in the TE mode.

Figure 47:
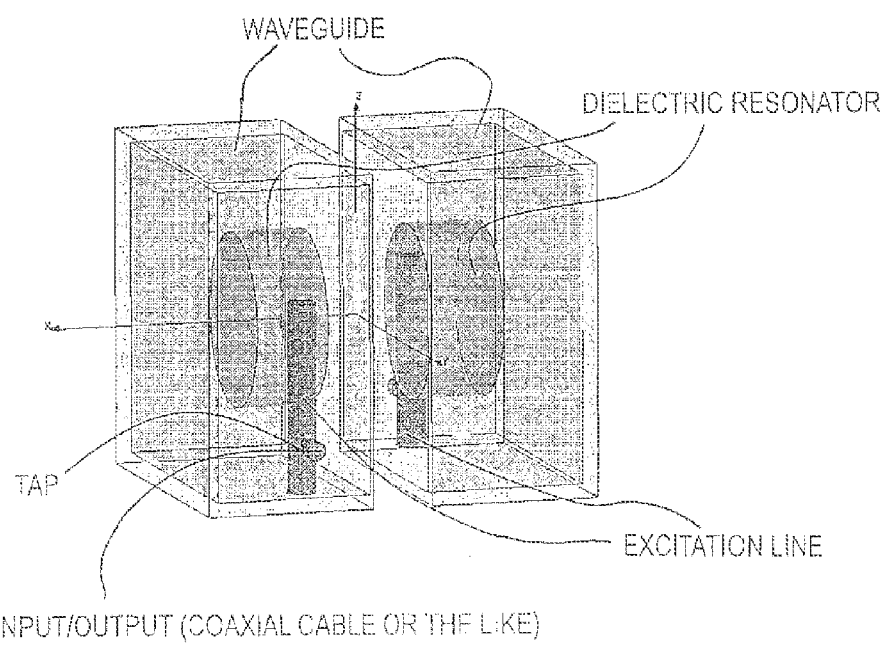
FIG. 47 A figure illustrates a schematic projection perspective view of another embodiment of a power transmission according to the present invention.

Also, as the excitation structure of the dielectric resonator, as illustrated in FIG. 47, an excitation structure that supplies power from the an intermediate tap of an excitation line when the excitation line of about ¼ wavelength extends from the internal surface of the waveguide in a direction perpendicular to a radial direction may be used. In this case, the resonator can be excited in the TE mode.

Figure 48:
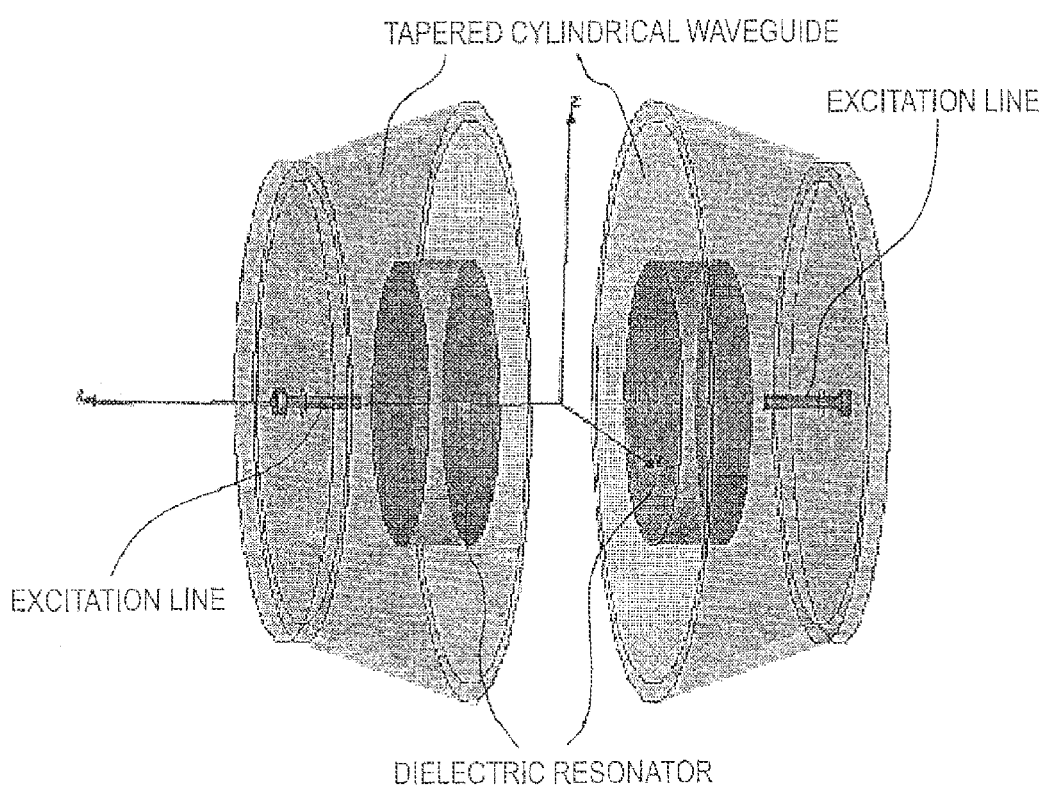
FIG. 48 A figure illustrates a schematic projection perspective view of another embodiment of a power transmission according to the present invention.

Also, as illustrated in FIG. 48, the first or second waveguide may have a tapered shape such that a cross-sectional area is gradually reduced from an open end to a short-circuited end.

In PTL 1, it is better as the relative dielectric constant of the dielectric resonator used in the resonator is larger. However, in the present invention, when comparing embodiment 4 and embodiment 6 in both of which the diameter D of the dielectric resonator is 100 mm and the resonance mode is the TE012+δ mode, the transmission distance at which the transmission efficiency is 50% is 72.5 mm in embodiment 4 when the relative dielectric constant is 38, but is 103 mm in embodiment 6 when the relative dielectric constant is 20. Thus, the transmission distance is larger when the relative dielectric constant is smaller. Also, as illustrated in two examples of embodiment 6, the larger diameter D of the dielectric resonator can further increase the transmission distance even when the dielectric resonators are in the same resonance mode and at the same relative dielectric constant.

FIG. 49 illustrates a graph that can calculate the diameter D and the length L of the dielectric resonator when the frequency and the resonance mode of the cylindrical dielectric resonator are set. The value of the diameter D is calculated by selecting the resonance mode, determining one point on the graph (straight line) corresponding to the selected mode, reading the vertical-axis value of this point, and determining the wavelength $\lambda$ and the value of the relative dielectric constant Er. On the other hand, the value of the length L is calculated by reading the horizontal-axis value of the point and using the calculated D value. Also, FIG. 49 illustrates a flowchart of examples shown in the embodiment.

As can be seen from these embodiments, in the electromagnetic resonance method, the resonators are electromagnetic-field-coupled before the electromagnetic field generated from the conductor, which is called a near field in the conventional art, becomes an electromagnetic wave state of a radio wave, and the transmission efficiency and the transmission distance are combined with each other by the coupling coefficient K and the Q value of the resonator. However, according to the present invention, there is provided the apparatus that continuously transmit power even at the distance greater than the minimum distance where the coupling is formed, that is, from the near field to the far field by using the parallel-plate type dielectric resonator in the resonance system. It is considered that this can be achieved because the surfaces of the dielectric resonators larger than the wavelength or the ½ wavelength are easily arranged opposite to each other by using the dielectric resonators. For example, when attempting to make the diameter of the loop antenna of 2.45 GHz having 122.5 mm of one wavelength in the coil, the coil being three times longer (length of which is three times longer than the wavelength) is used, and the transmission distance of about half wavelength is not expected by the loss of the coil and the radiation of the radio wave. However, in the dielectric resonator, the transmission distance of the half wavelength or more is obtained by inserting the dielectric resonator having a diameter of about 122.5 mm into the cylindrical waveguide. Also, the present invention is the apparatus that can transmit power continuously from the near field to the far field even when the waveguide as illustrated in PTL 2 is in the cutoff region or not. The present invention is the power transmission apparatus that can handle high power because the transmission efficiency is high.

the dimension of one end surface in the surface normal direction, namely the thickness L being the distance between the two end surfaces, is constant regardless of the radial position of the dielectric resonator. The dielectric resonator has a relative dielectric constant of 38, a diameter D of 105.3 mm, and a thickness L of 19.3 mm. The diameter of the short-circuited cylindrical waveguide (short-circuited wave-

TABLE 1

| Embodiment | Relative Dielectric Constant Er | Mode | Diameter of Resonator D (Inner Diameter) [mm] | Outer Shape of Resonator [mm] | Length L of Resonator [mm] | Diameter d of Cylindrical Waveguide [mm] | Length of Excitation Line [mm] |
|---|---|---|---|---|---|---|---|
| 1 | 38 | TM01δ | 28.1 | — | 18.7 | 50.6 | 30.6 |
| 3 | 38 | TM02δ | 55.6 | — | 16 | 100.1 | 30.6 |
| — | 38 | TM02δ | 60.6 | — | 14 | 109.1 | 30.6 |
| 3 | 38 | TM03δ | 80.4 | — | 16.3 | 144.8 | 30.6 |
| 4 | 38 | TM012 + δ | 100 | — | 19 | 180 | 30.6 |
| 5 | 38 | Hexagon | 95.3 | 110 | 19 | 187 | 30.6 |
| 5 | 38 | Pentagon | 99.4 | 110 | 19 | 209 | 30.6 |
| 5 | 38 | Rectangle | 110 | 155.5 | 18.75 | 209 | 30.6 |
| 5 | 38 | Triangle | 84 | 168 | 20 | 216 | 30.6 |
| 6 | 20 | TM012 + δ | 100 | — | 26.51 | 216 | 30.6 |
| 6 | 20 | TM012 + δ | 140 | — | 25.9 | 216 | 30.6 |
| 7 | 24 | Ring | 25 | 15 | 7.6 | 45 | 6.25 |
| 8 | 24 | TE012 + δ | 14 | — | 3.75 | 25.2 | — |

| Embodiment | Gap [mm] | Transmission Distance of 50% or more Transmission Efficiency | Wavelength ($\lambda\times$) | Resonance Frequency [GHz] | d/D | D/L | $(Er)^{1/2} \times (D/\lambda 0)$ |
|---|---|---|---|---|---|---|---|
| 1 | 23 | 24 | 0.196 | 2.45 | 1.8 | 1.5 | 1.42 |
| 3 | 23 | 48 | 0.392 | 2.45 | 1.8 | 3.48 | 2.83 |
| — | 23 | 50 | 0.408 | 2.45 | 1.8 | 4.33 | 3.11 |
| 3 | 23 | 66 | 0.539 | 2.45 | 1.8 | 4.93 | 4.08 |
| 4 | 23 | 72.5 | 0.592 | 2.45 | 1.8 | 5.26 | 5.22 |
| 5 | 23 | 72 | 0.588 | 2.45 | 1.96 | 5.02 | 5.26 |
| 5 | 23 | 68 | 0.555 | 2.45 | 2.1 | 5.23 | 4.02 |
| 5 | 23 | 68 | 0.555 | 2.45 | 1.9 | 5.87 | 5.71 |
| 5 | 23 | 72 | 0.588 | 2.45 | 2.57 | 4.2 | 5.09 |
| 6 | 23 | 103 | 0.841 | 2.45 | 2.16 | 3.77 | 5.2 |
| 6 | 23 | 120 | 0.98 | 2.45 | 1.54 | 5.41 | 7.24 |
| 7 | 4.5 | 27 | 1.08 | 12 | 1.8 | 3.29 | — |
| 8 | 3 | 15.5 | 0.62 | 12 | 1.8 | 3.73 | — |

Other Embodiment 2

In the above embodiment, two first end surfaces or two second end surfaces was made of single planes parallel to each other and substantially perpendicular to the wave guiding direction of the first waveguide or the wave guiding direction of the second waveguide. That is, in the above embodiment, the first end surface is the first parallel end surface and the second end surface is the second parallel end surface.

On the other hand, in other embodiment 2, the two first end surfaces or the two second end surfaces located such that the central portion is farther from the second dielectric resonator or the first dielectric resonator than the outer peripheral portion are indicated by assigning separate embodiment numbers below.

Embodiment A1

Figure 50A:
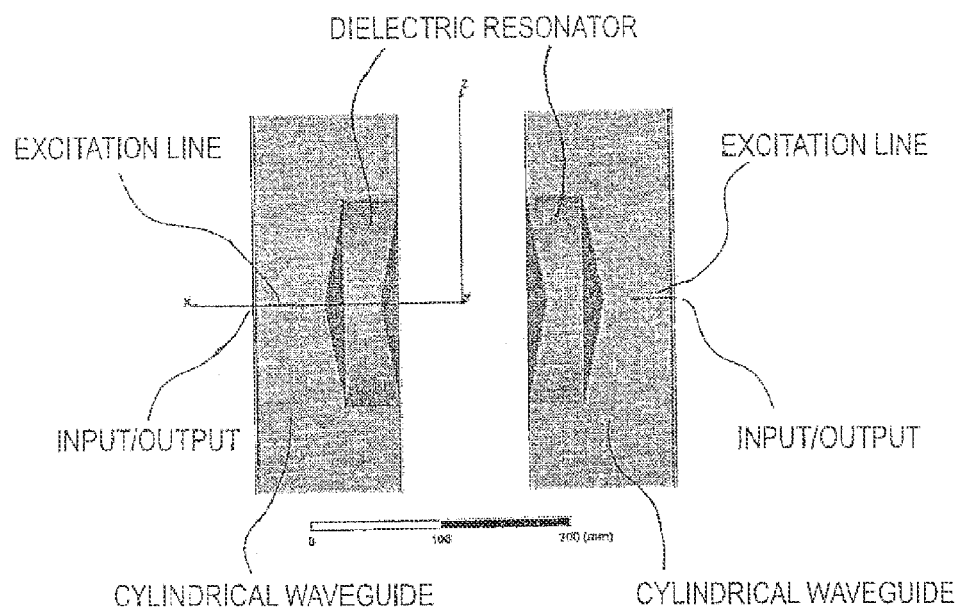
FIG. 50A A figure illustrates a schematic configuration diagram of embodiment 1A.
Figure 50B:
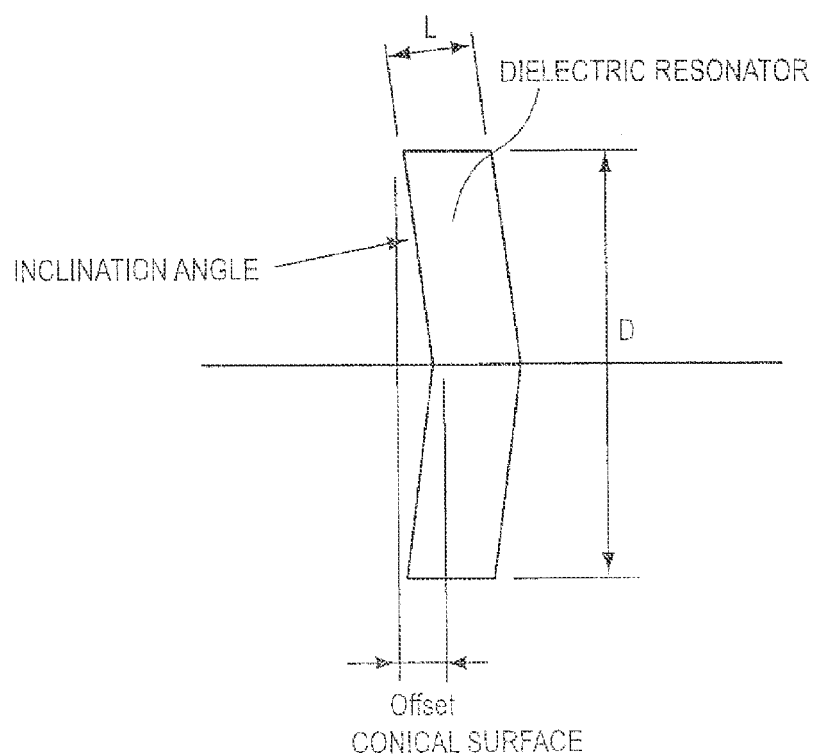
FIG. 50B A figure illustrates a schematic diagram of a dielectric resonator of embodiment 1A.
Figure 51:
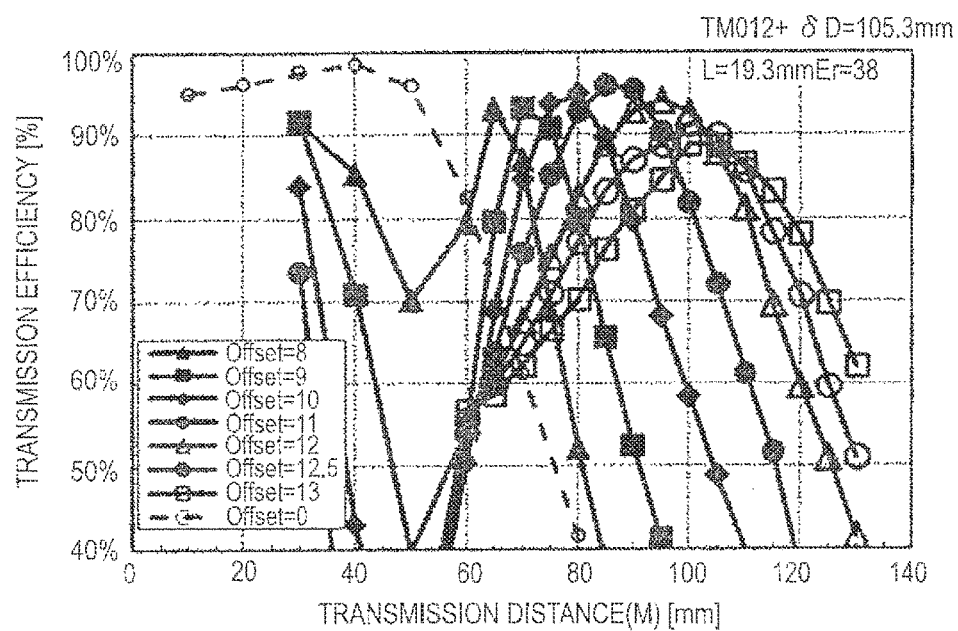
FIG. 51 A figure illustrates a relationship between a transmission distance and a transmission efficiency in embodiment 1A.

FIGS. 50A and 50B illustrate configuration diagrams of embodiment A1. Herein, in each dielectric resonator (the first dielectric resonator or the second dielectric resonator), one of the two end surfaces is a concave conical surface, and guide) is 1.8 times as long as the diameter D of the dielectric resonator which is 189.5 mm. The dielectric resonator is located at substantially the same axial position as the open side of the cylindrical waveguide. As the excitation line, the conductor having a length of about ¼ wavelength (30.6 mm) is located from the center of the open surface of the waveguide in the axial direction of the dielectric resonator, and the gap between the excitation line and the dielectric resonator is 23 mm. An arbitrary distance is maintained by matching the respective centers with the central axis of the dielectric resonator and arranging the open sides of the two cylindrical waveguides to be opposite to each other. The excitation line is attached to substantially the center of the short-circuited surface of the cylindrical waveguide, and the center conductor of the coaxial connector is connected to the excitation line. The microwave of about 2.45 GHz is supplied to the excitation line through one coaxial connector. The microwave power resonates one dielectric resonator from one excitation line and further resonates the other dielectric resonator maintained at an arbitrary distance, and the power transmitted to the other excitation line is taken out from the other coaxial connector. In this manner, the microwave power is transmitted from the connector of one cylindrical waveguide to the connector of the other cylindrical waveguide. FIG. 51 illustrates the transmission characteristic. The dielectric resonator operates as a two-stage filter that is resonated in the TM mode by the excitation line and the dielectric resonators are connected by the electric-field coupling.

The operation and function of the present embodiment will be described with reference to FIGS. 52A to 52E. FIGS. 52A to 52C illustrate a case where the distance between two dielectric resonators, namely the transmission distance M, is substantially the half of the diameter D of the dielectric resonator. In FIGS. 52A and 52B, since the end surface of the dielectric resonator is flat, the electromagnetic field generated from the outer peripheral portion, in particular the outer edge, of one dielectric resonator has a spreading portion D' spreading outward in radial direction. Therefore, the electromagnetic field portion that does not pass through the other dielectric resonator occurs. On the other hand, in FIG. 52C, since the mutually facing end surfaces of the two dielectric resonators are concave conical surfaces, the electromagnetic field generated from the outer peripheral portion, in particular the outer edge, of one dielectric resonator, as compared with the cases of FIGS. 52A and 52B, is not spread outward in the radial direction. Many portions including the spreading portion D' pass through the other dielectric resonator. FIGS. 52D to 52E illustrate a case where the distance between two dielectric resonators, namely the transmission distance M, is substantially the same as the diameter D of the dielectric resonator. In FIG. 52D, since the end surface of the dielectric resonator is flat, the electromagnetic field generated from the outer peripheral portion, in particular the outer edge, of one dielectric resonator has a diffusion portion D' diffusing even to the radial outer side. Therefore, the electromagnetic field portion that does not pass through the other dielectric resonator occurs. On the other hand, in FIG. 52E, since the mutually facing end surfaces of the two dielectric resonators are concave conical surfaces, the electromagnetic field generated from the outer peripheral portion, in particular the outer edge, of one dielectric resonator, as compared with the case of FIG. 52(*d*), is not spread outward in the radial direction. Many portions including the spreading portion D' pass through the other dielectric resonator.

In the present embodiment, in the dielectric resonator, the height of the corn, namely Offset, with respect to the radius of 105.3/2 mm is 11 mm, and the inclination angle of the conical surface with respect to the plane perpendicular to the axial direction is ATAN((105.3/2)/11)=11.8°. The transmission distance of 50% transmission efficiency reaches 115 mm. As compared with the case where the end surface is not inclined (the transmission distance of 75 mm), the transmission distance of even 40 mm is expanded.

Figure 50C:
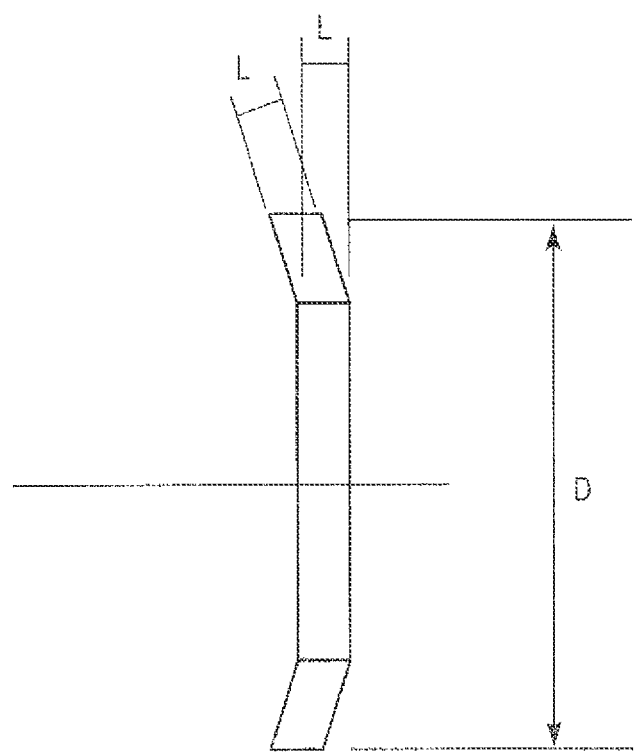
FIG. 50C A figure illustrates a schematic diagram of a dielectric resonator of a modification of embodiment 1A.

In the present embodiment, both end surfaces of the dielectric resonators are made up of the conical surfaces all over the radial region from the outer peripheral portion to the central portion. As one modification, as illustrated in FIG. 50C, the concave end surface can be configured as a truncated conical surface (conical dish surface) in which only the outer peripheral region is made up of a conical surface and the central region is made up of a plane perpendicular to the radial direction, and the end surface of the other side can be configured such that the thickness of the dielectric resonator becomes constant. At a boundary position between the outer peripheral region and the central region, the above operation and function can be appropriately set to be well exhibited.

Embodiment A2

Figure 53:
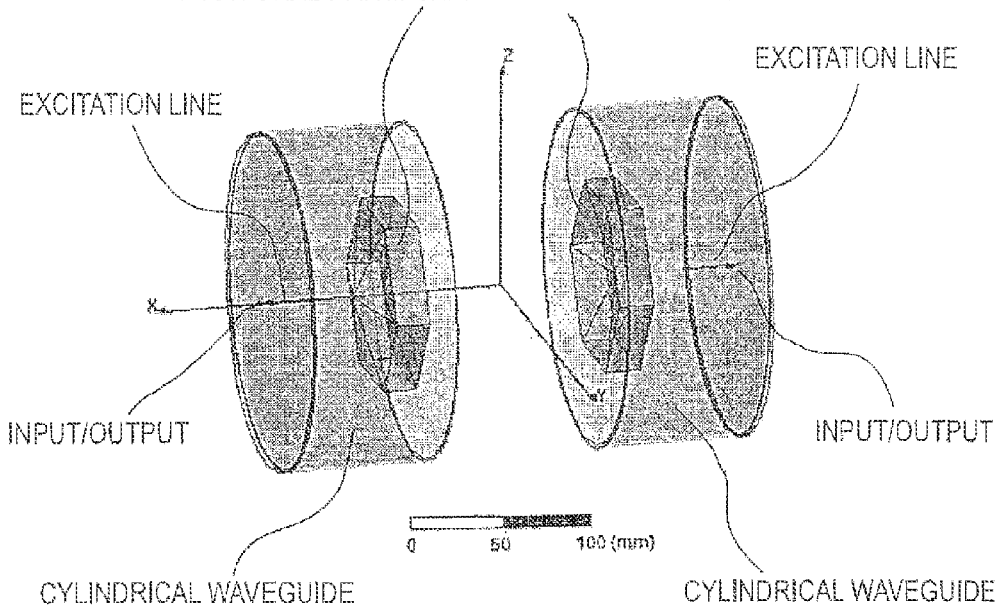
FIG. 53 A figure illustrates a schematic configuration diagram of embodiment 2A.
Figure 54:
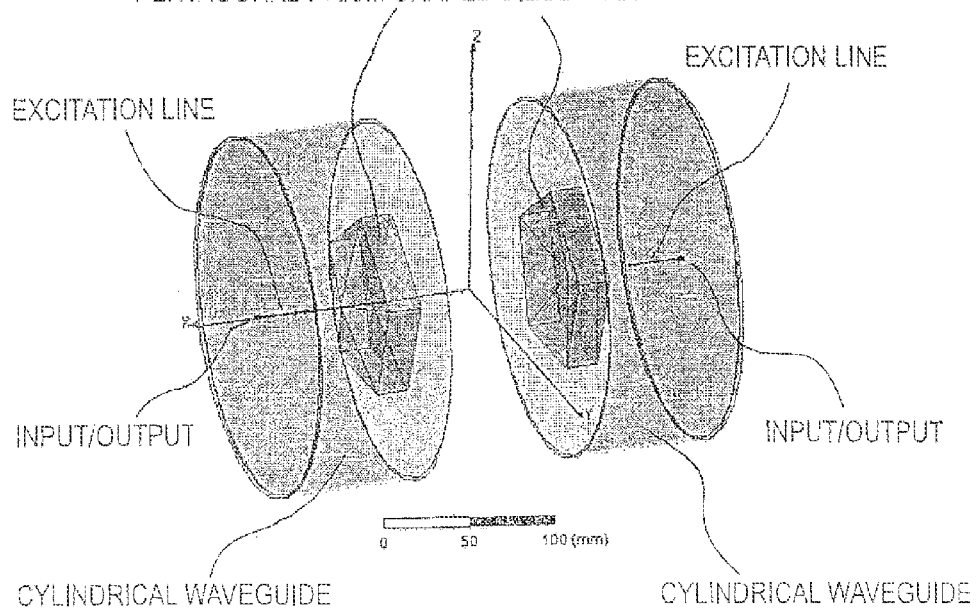
FIG. 54 A figure illustrates a schematic configuration diagram of embodiment 2A.
Figure 55:
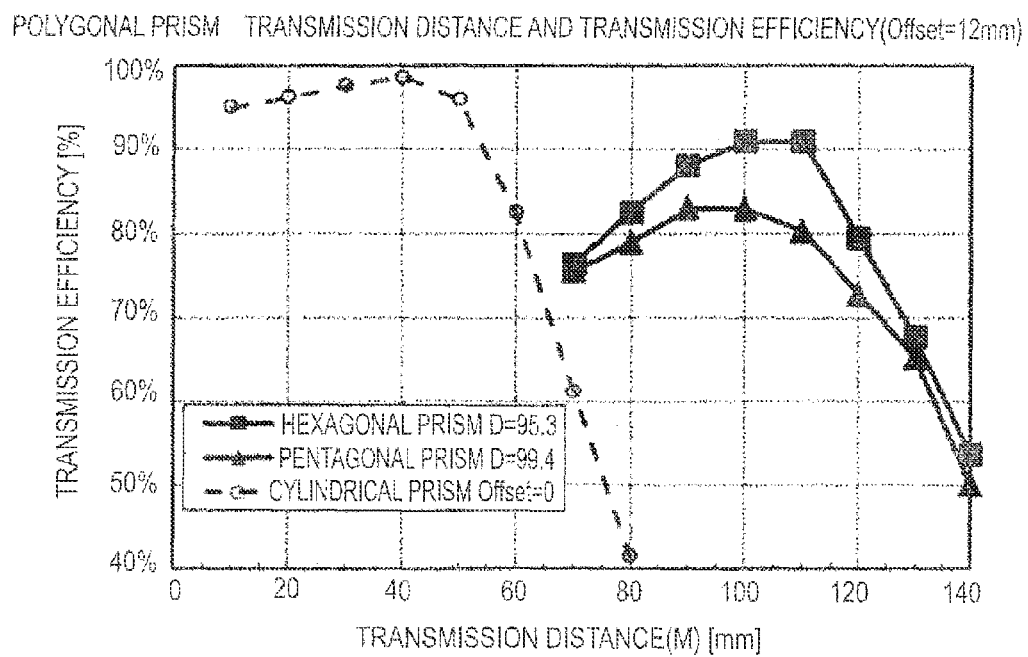
FIG. 55 A figure illustrates a relationship between a transmission distance and a transmission efficiency in embodiment 2A.

FIGS. 53 and 54 illustrate configuration diagrams of embodiment A2. In each dielectric resonator (the first dielectric resonator or the second dielectric resonator) in FIG. 53, the outer peripheral surface has a hexagonal pyramid shape, one of the two end surfaces is a concave hexagonal conical surface, and the dimension of one end surface in the surface normal direction, namely the thickness L being the distance between the two end surface, is constant regardless of the radial position of the dielectric resonator. In the dielectric resonator, a relative dielectric constant is 38, a diameter of a circumscribed circle of a hexagon of an outer peripheral surface shape is 110 mm, a diameter of an inscribed circle is 99.4 mm, a thickness L is 19 mm, and an inclination angle of a hexagonal pyramid surface with respect to a plane perpendicular to an axial direction is 12°. A diameter of the cylindrical waveguide is 209 mm. Similarly, in FIG. 54, in each dielectric resonator (the first dielectric resonator or the second dielectric resonator), the outer peripheral surface has a pentagonal prism shape, one of the two end surfaces is a concave pentagonal pyramid surface, and the dimension of one end surface in the surface normal direction, namely the thickness L being the distance between the two end surface, is constant regardless of the radial position of the dielectric resonator. In the dielectric resonator, a relative dielectric constant is 38, a diameter of a circumscribed circle of a pentagon of an outer peripheral surface shape is 110 mm, a diameter of an inscribed circle is 95.3 mm, a thickness L is 19 mm, and an inclination angle of a pentagonal pyramid surface with respect to a plane perpendicular to an axial direction is 12°. A diameter of the cylindrical waveguide is 187 mm. FIG. 55 illustrates a relationship between a transmission efficiency and a transmission distance. The transmission distance of 50% transmission efficiency is expanded by 65 mm, that is, from 75 mm of the cylindrical dielectric resonator to 140 mm.

In the present embodiment, the end surface of the dielectric resonator is made up of the pyramid surface (polygonal pyramid surface) all over the radial region from the outer peripheral portion to the central portion, but the pyramid is not limited to the pentagonal pyramid or the hexagonal pyramid. Furthermore, as one modification, only the outer peripheral region may be made up of the pyramid surface and the central region may be configured by a plane perpendicular to the axial direction. At a boundary position between the outer peripheral region and the central region, the operation and function described in embodiment A1 can be appropriately set to be well exhibited.

Embodiment A3

Figure 56A:
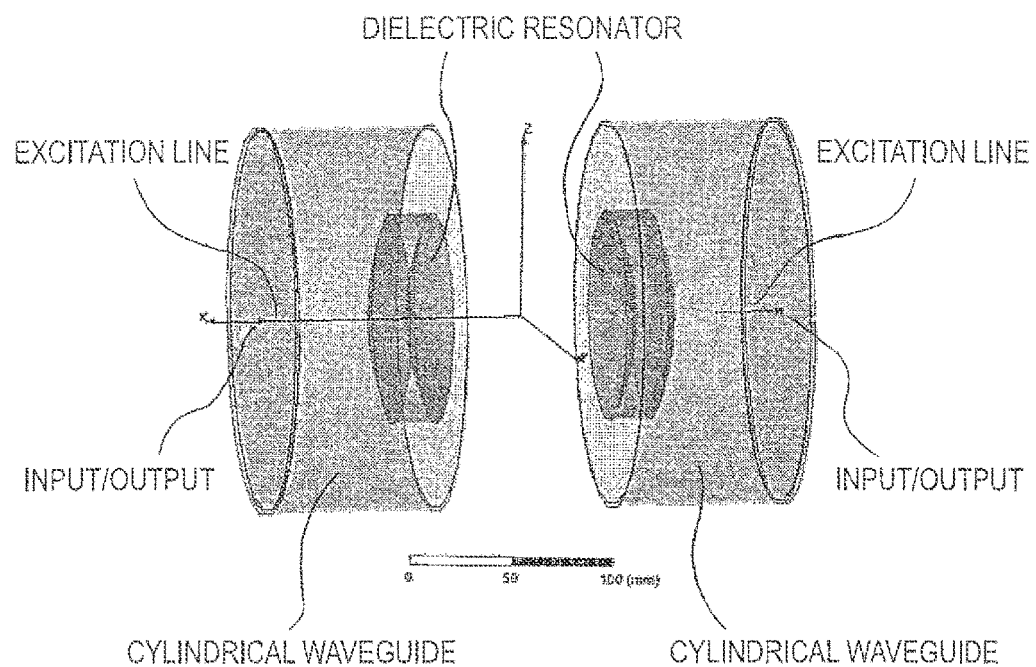
FIG. 56A A figure illustrates a schematic configuration diagram of embodiment 3A.
Figure 56B:
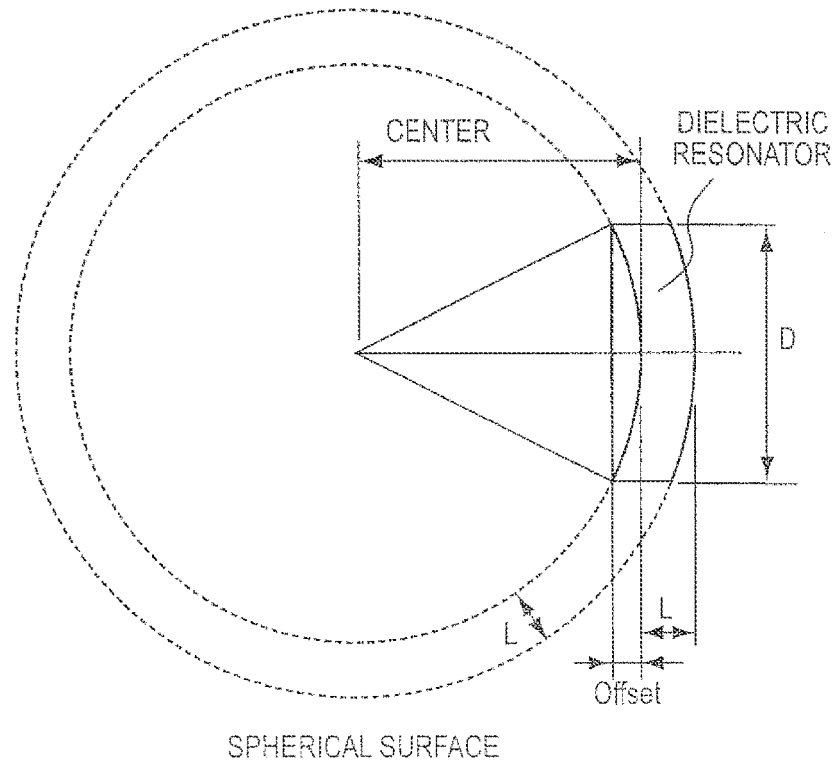
FIG. 56B A figure illustrates a schematic diagram of a dielectric resonator of embodiment 3A.
Figure 57:
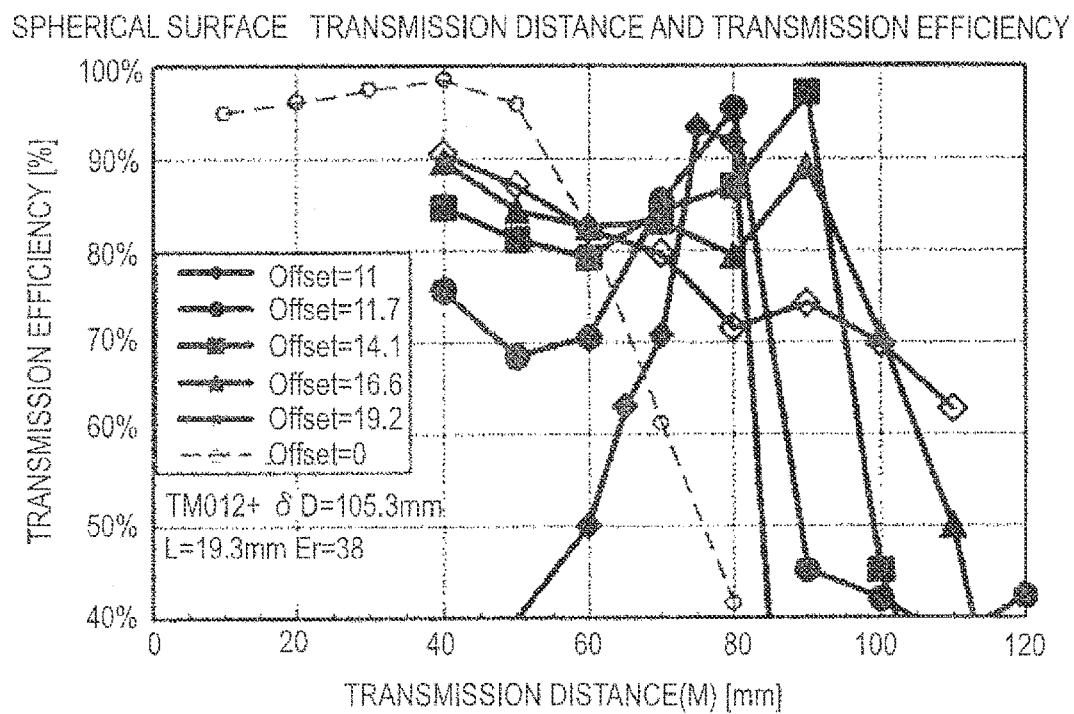
FIG. 57 A figure illustrates a relationship between a transmission distance and a transmission efficiency in embodiment 3A.

FIGS. 56A and 56B illustrate configuration diagrams of embodiment A3. In each dielectric resonator (the first dielectric resonator or the second dielectric resonator), both the two end surfaces are spherical surfaces, and the curvature radius of one end surface is greater than the curvature radius of the other end surface by the thickness L of the dielectric resonator. That is, the thickness L which is the distance between the two end surfaces is constant regardless of the radial position of the dielectric resonator. The dielectric resonator has a relative dielectric constant of 38, a diameter D of 105.3 mm, and a thickness L of 19 mm. A diameter of the cylindrical waveguide is 189.5 mm. FIG. 57 illustrates a relationship between a transmission efficiency and a transmission distance. At Offset=14.1 mm, the transmission distance of 50% transmission efficiency is expanded by 20 mm, that is, from 75 mm of Offset=0 (cylindrical dielectric resonator with no concave portion) to 95 mm.

In the present embodiment, the end surface of the dielectric resonator is made up of the spherical surface all over the radial region from the outer peripheral portion to the central portion, but, as one modification, only the outer peripheral region may be made up of the spherical surface and the central region may be configured by a plane perpendicular to the axial direction. At a boundary position between the outer peripheral region and the central region, the operation and function described in embodiment A1 can be appropriately set to be well exhibited.

Embodiment A4

Figure 58A:
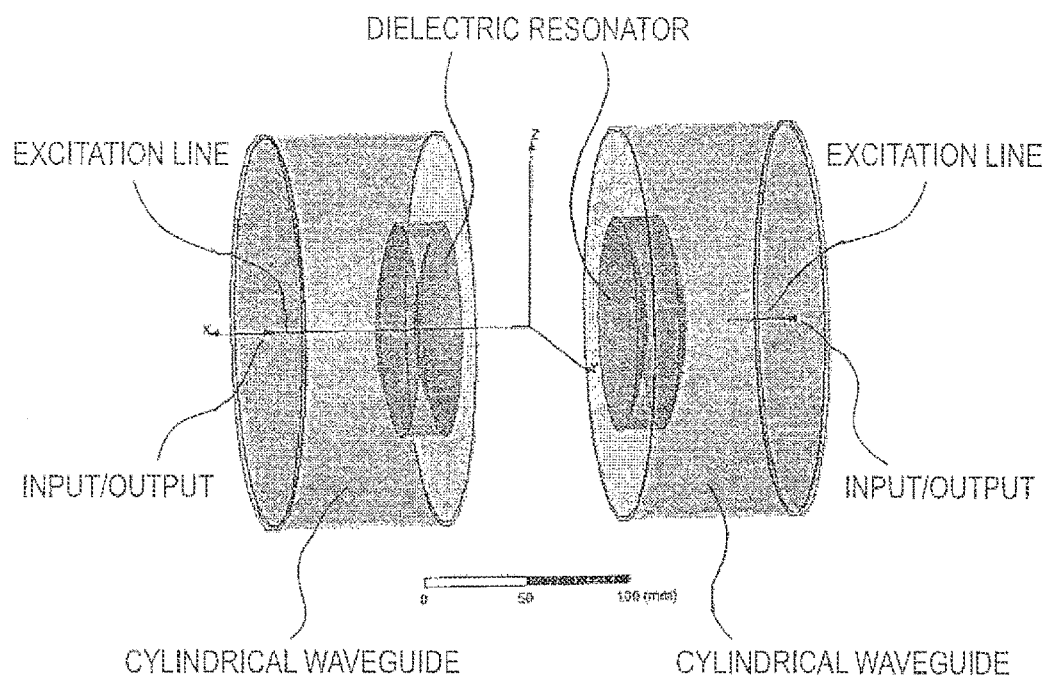
FIG. 58A A figure illustrates a schematic configuration diagram of embodiment 4A.
Figure 58B:
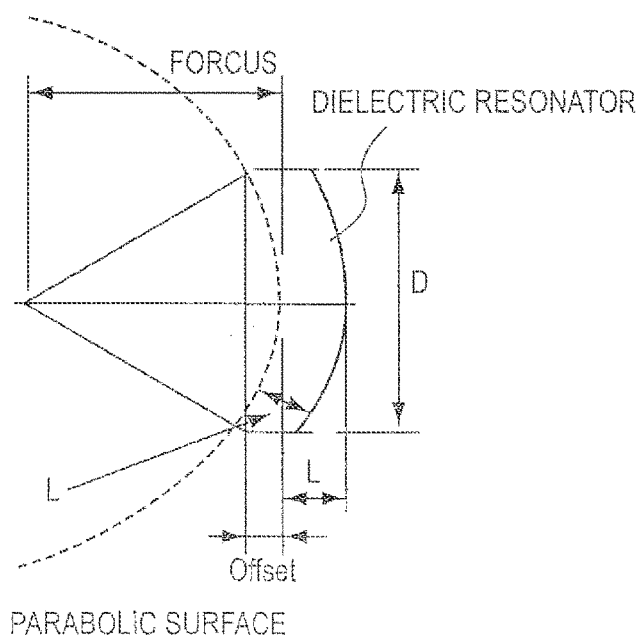
FIG. 58B A figure illustrates a schematic diagram of a dielectric resonator of embodiment 4A.
Figure 59:
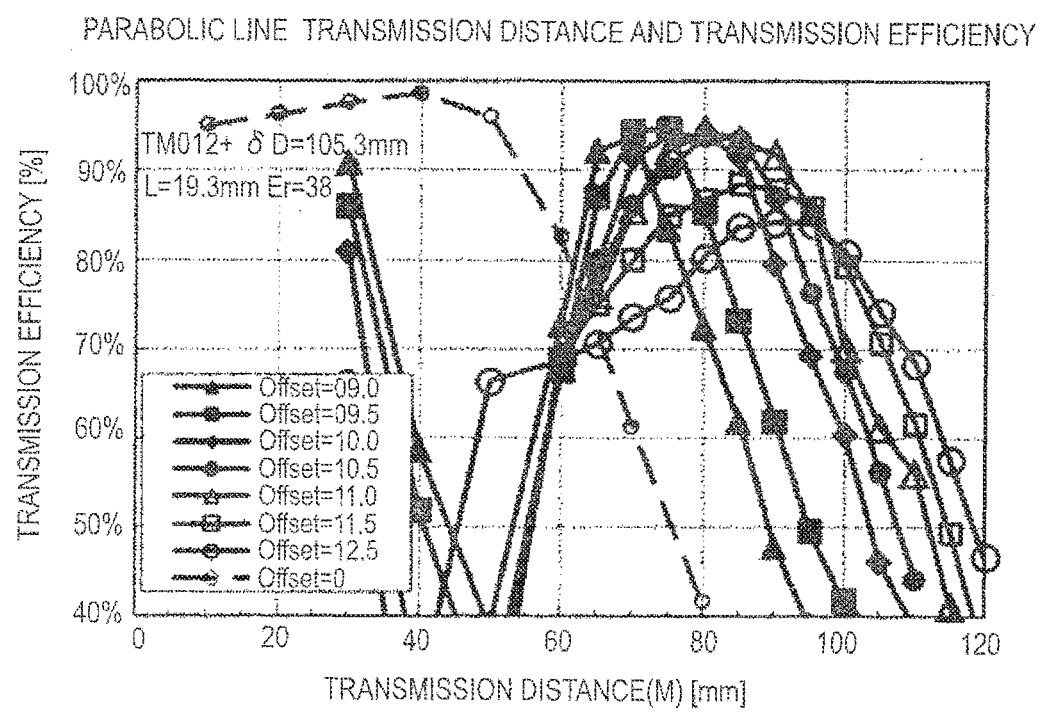
FIG. 59 A figure illustrates a relationship between a transmission distance and a transmission efficiency in embodiment 4A.

FIGS. 58A and 58B illustrate configuration diagrams of embodiment A4. In each dielectric resonator (the first dielectric resonator or the second dielectric resonator), one of the two end surfaces is a concave parabolic surface, and the dimension of one end surface in the surface normal direction, namely the thickness L being the distance between the two end surface, is constant regardless of the radial position of the dielectric resonator. The dielectric resonator has a relative dielectric constant of 38, a diameter D of 105.3 mm, and a thickness L of 19.3 mm. A diameter of the cylindrical waveguide is 189.5 mm. FIG. 59 illustrates a relationship between a transmission efficiency and a transmission distance. At Offset=10.5 mm, the transmission distance of 50% transmission efficiency is expanded by 30 mm, that is, from 75 mm of Offset=0 (cylindrical dielectric resonator with no concave portion) to 105 mm.

In the present embodiment, the end surface of the dielectric resonator is made up of the parabolic surface all over the radial region from the outer peripheral portion to the central portion, but, as one modification, only the outer peripheral region may be made up of the parabolic surface and the central region may be configured by a plane perpendicular to the axial direction. At a boundary position between the outer peripheral region and the central region, the operation and function described in embodiment A1 can be appropriately set to be well exhibited.

Embodiment A5

Figure 60:
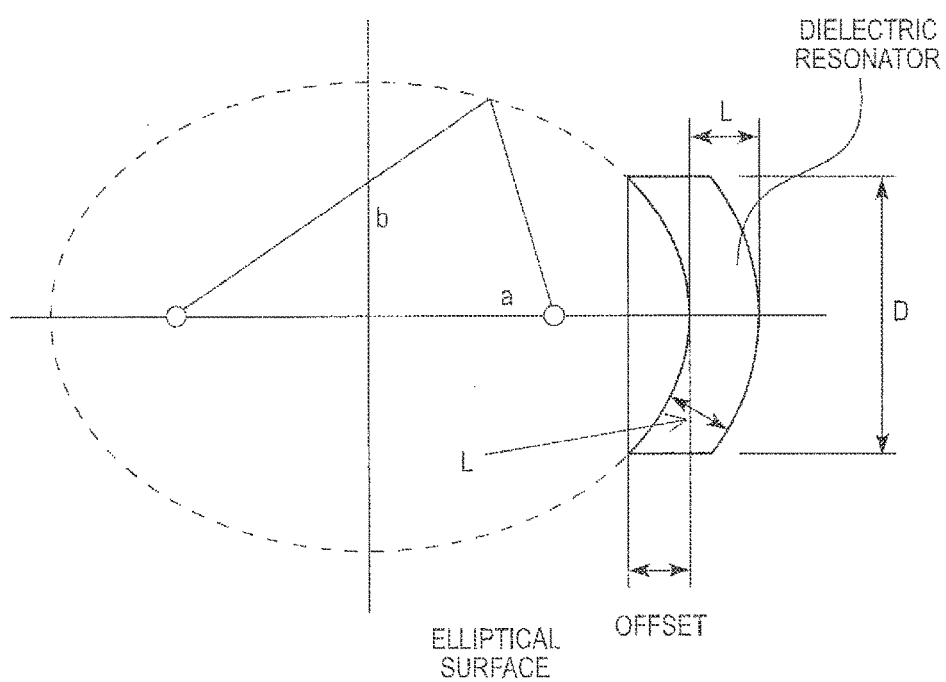
FIG. 60 A figure illustrates a schematic configuration diagram of embodiment 5A.
Figure 61:
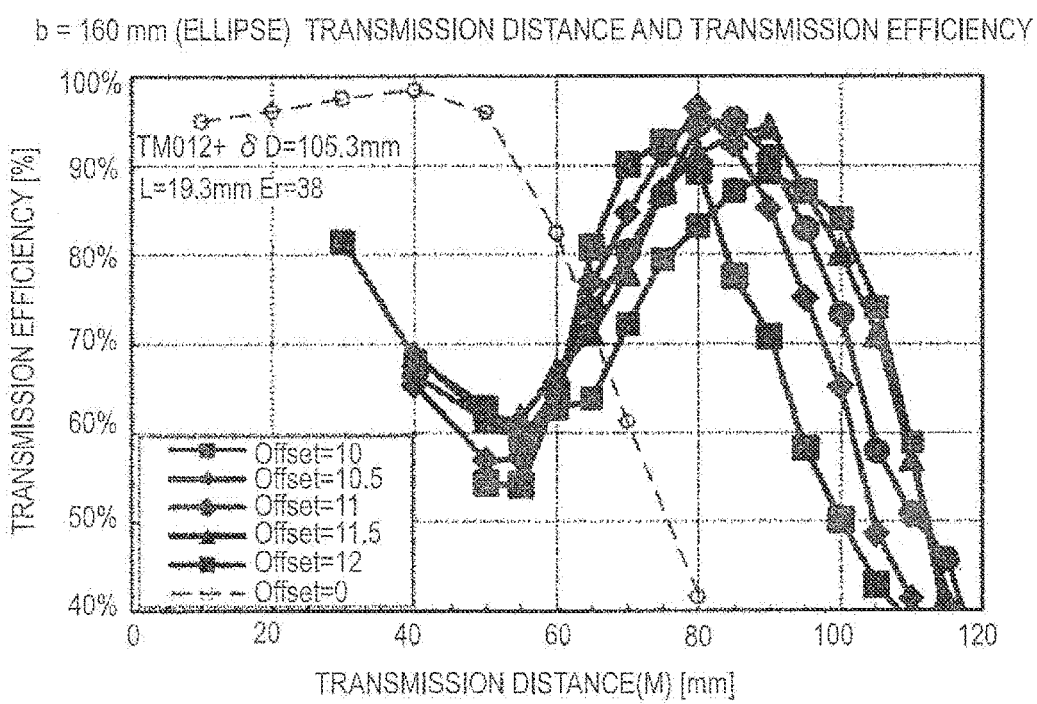
FIG. 61 A figure illustrates a relationship between a transmission distance and a transmission efficiency in embodiment 5A.
Figure 62:
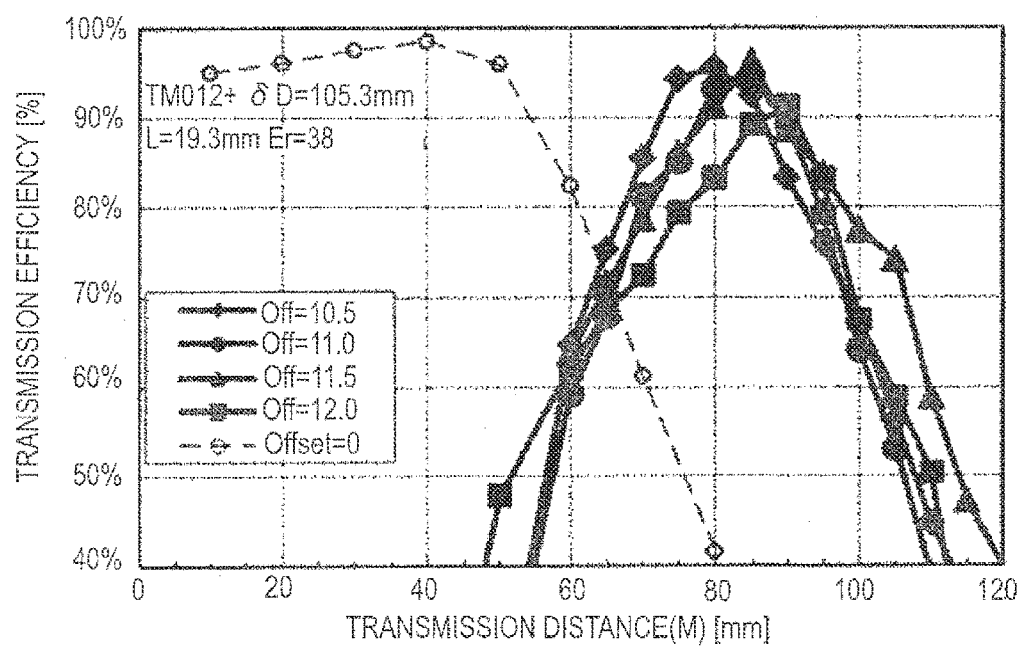
FIG. 62 A figure illustrates a relationship between a transmission distance and a transmission efficiency in embodiment 5A.
Figure 63:
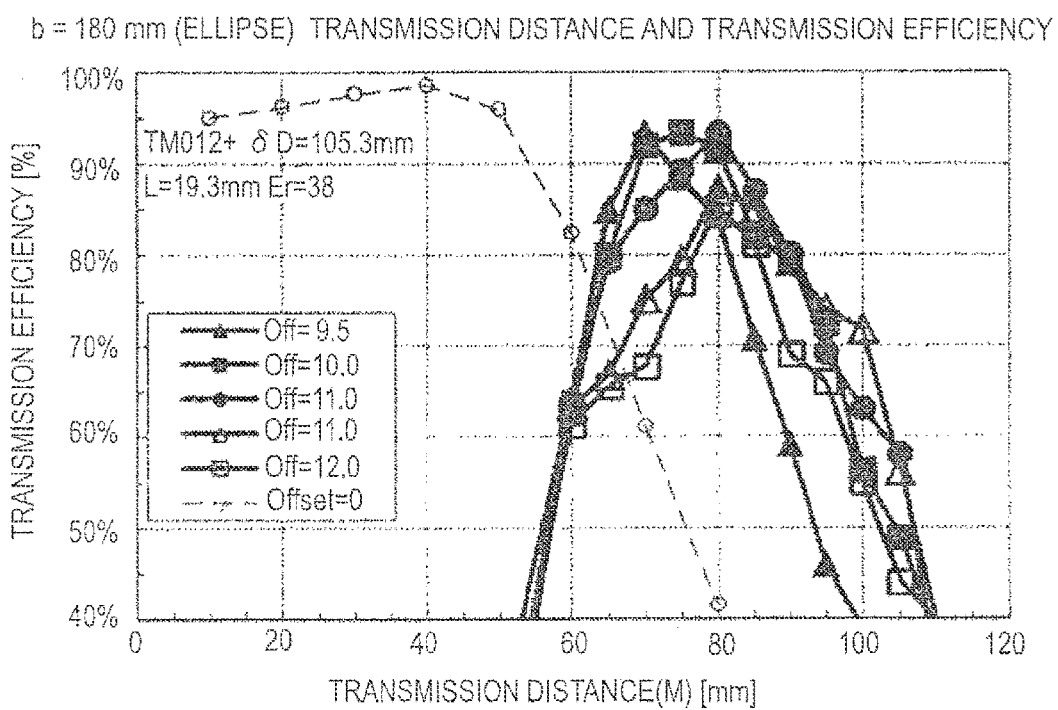
FIG. 63 A figure illustrates a relationship between a transmission distance and a transmission efficiency in embodiment 5A.

FIG. 60 illustrates a configuration diagram of embodiment A5. In each dielectric resonator (the first dielectric resonator or the second dielectric resonator), one of the two end surfaces is a concave elliptical surface, and the dimension of one end surface in the surface normal direction, namely the thickness L being the distance between the two end surface, is constant regardless of the radial position of the dielectric resonator. The dielectric resonator has a relative dielectric constant of 38, a diameter D of 105.3 mm, and a thickness L of 19.3 mm. A diameter of the cylindrical waveguide is 189.5 mm. Relationships between a transmission efficiency and a transmission distance are illustrated in FIG. 61 (length b of the minor axis of the ellipse is fixed to 160 mm), FIG. 62 (length b of the minor axis of the ellipse is fixed to 170 mm), and FIG. 63 (length b of the minor axis of the ellipse is fixed to 180 mm). For any length b of the minor axis of the ellipse, at Offset=10 to 11 mm, the transmission distance of 50% transmission efficiency is expanded by 30 mm, that is, from 75 mm of Offset=0 (cylindrical dielectric resonator with no concave portion) to 105 mm.

In the present embodiment, the end surface of the dielectric resonator is made up of the elliptical surface all over the radial region from the outer peripheral portion to the central portion, but, as one modification, only the outer peripheral region may be made up of the elliptical surface and the central region may be configured by a plane perpendicular to the axial direction. At a boundary position between the outer peripheral region and the central region, the operation and function described in embodiment A1 can be appropriately set to be well exhibited.

Other Embodiment 3

In the present invention, one of the first dielectric resonator and the second dielectric resonator may have the end surface of one of embodiments A1 to A5, and the other may have the different end surface of one of embodiments A1 to A5.

Furthermore, in the present invention, one of the first dielectric resonator and the second dielectric resonator may have the end surface of one of embodiments 1 to 8, and the other may have the end surface of one of embodiments A1 to A5.

The invention claimed is:

1. A power transmission apparatus comprising:
a first resonance device including a first waveguide, a first dielectric resonator disposed coaxial with the first waveguide, and a first excitation structure for exciting the first dielectric resonator; and
a second resonance device including a second waveguide, a second dielectric resonator disposed coaxial with the second waveguide, and a second excitation structure for exciting the second dielectric resonator,
the first waveguide having an open end as one end and a short-circuited end as the other end,
the first dielectric resonator having two first end surfaces disposed on opposite sides to each other, being insulated from the first waveguide in the vicinity of the open end of the first waveguide, and being disposed within the first waveguide, such that a thickness being a distance between the two first end surfaces is constant, regardless of a radial position of the first dielectric resonator,
the second waveguide having an open end as one end and a short-circuited end as the other end,
the second dielectric resonator having two first end surfaces disposed on opposite sides to each other, being insulated from the second waveguide in the vicinity of the open end of the second waveguide, and being disposed within the second waveguide, such that a thickness being a distance between the two second end surfaces is constant, regardless of a radial position of the second dielectric resonator, and
the first resonance device and the second resonance device being disposed such that the open end of the first waveguide and the open end of the second waveguide are opposite to each other, and power input to the first excitation structure being output from the second excitation structure.

2. The power transmission apparatus according to claim 1, wherein the two first end surfaces or the two second end surfaces are made of planes parallel to each other and substantially perpendicular to a wave guiding direction of the first waveguide or a wave guiding direction of the second waveguide.

3. The power transmission apparatus according to claim 1, wherein the two first end surfaces or the two second end surfaces are located such that a central portion is farther from the second dielectric resonator or the first dielectric resonator than an outer peripheral portion.

4. The power transmission apparatus according to claim 3, wherein at least one of the two first end surfaces or at least one of the two second end surfaces is made of at least a part of a conical surface, a pyramid surface, a spherical surface, a parabolic surface, or an elliptical surface, which has a symmetrical axis coaxial with the first waveguide or the second waveguide in at least the outer peripheral portion.

5. The power transmission apparatus according to claim 2, wherein a shape of the first dielectric resonator or the second dielectric resonator is a polygonal prism, a polygonal cylinder, a cylindrical prism, or a circular cylinder, which has the first end surface or the second end surface as both end surfaces.

6. The power transmission apparatus according to claim 1, wherein a cross-sectional shape of the first waveguide or the second waveguide is a polygonal cylinder or a circular cylinder.

7. The power transmission apparatus according to claim 1, wherein the first waveguide or the second waveguide has a tapered shape such that a cross-sectional area is gradually reduced from the open end to the short-circuited end.

8. The power transmission apparatus according to claim 1, wherein the first excitation structure or the second excitation structure is disposed to be insulated from the first waveguide or the second waveguide in the short-circuited end of the first waveguide or the short-circuited end of the second waveguide, and includes a conductor extending in a wave guiding direction within the first waveguide or the second waveguide.

9. A power transmission method, which wirelessly transmits power from a first resonance device to a second resonance device by using the power transmission apparatus according to claim 1, the power transmission method comprising:
disposing the first resonance device and the second resonance device so that the open end of the first waveguide and the open end of the second waveguide are opposite to each other;
inputting power to the first excitation structure; and
outputting the power from the second excitation structure.

10. A resonance device comprising:
a waveguide;
a dielectric resonator disposed coaxial with the waveguide; and
an excitation structure for exciting the dielectric resonator,
wherein one end of the waveguide is an open end and the other end of the waveguide is a short-circuited end, and
the dielectric resonator has two end surfaces disposed on opposite sides to each other, is insulated from the waveguide in the vicinity of the open end of the waveguide, and is disposed within the waveguide, such that a thickness being a distance between the two end surfaces is constant, regardless of a radial position of the dielectric resonator.

11. The resonance device according to claim 10, wherein the two end surfaces are made of planes parallel to each other and substantially perpendicular to a wave guiding direction of the waveguide.

12. The resonance device according to claim 10, wherein the two end surfaces are located such that a central portion is farther from the dielectric resonator than an outer peripheral portion.

13. The resonance device according to claim 12, wherein at least one of the two end surfaces is made of at least a part of a conical surface, a pyramid surface, a spherical surface, a parabolic surface, or an elliptical surface, which has a symmetrical axis coaxial with the waveguide in at least the outer peripheral portion.

14. The resonance device according to claim 11, wherein a shape of the dielectric resonator is a polygonal prism, a polygonal cylinder, a cylindrical prism, or a circular cylinder, which has the end surface as both end surfaces.

15. The resonance device according to claim 10, wherein a cross-sectional shape of the waveguide is a polygonal cylinder or a circular cylinder.

16. The resonance device according to claim 10, wherein the waveguide has a tapered shape such that a cross-sectional area is gradually reduced from the open end to the short-circuited end.

17. The resonance device according to claim 10, wherein the excitation structure is disposed to be insulated from the waveguide in the short-circuited end of the waveguide, and includes a conductor extending in a wave guiding direction within the waveguide.

* * * * *